(12) United States Patent
Ellingson et al.

(10) Patent No.: US 11,463,439 B2
(45) Date of Patent: *Oct. 4, 2022

(54) SYSTEMS AND METHODS FOR DEVICE AUTHENTICATION AND PROTECTION OF COMMUNICATION ON A SYSTEM ON CHIP

(71) Applicant: QWERX Inc., Vienna, VA (US)

(72) Inventors: John Ellingson, Haymarket, VA (US); Matthew Richardson, Arlington, VA (US)

(73) Assignee: Qwerx Inc., Vienna, VA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/671,121

(22) Filed: Oct. 31, 2019

(65) Prior Publication Data

US 2020/0067927 A1 Feb. 27, 2020

Related U.S. Application Data

(63) Continuation-in-part of application No. 16/038,908, filed on Jul. 18, 2018, now abandoned, and a
(Continued)

(51) Int. Cl.
| | |
|---|---|
| *H04L 9/40* | (2022.01) |
| *G06F 16/951* | (2019.01) |
| *G06F 21/44* | (2013.01) |

(52) U.S. Cl.
CPC .......... *H04L 63/101* (2013.01); *G06F 16/951* (2019.01); *G06F 21/44* (2013.01);
(Continued)

(58) Field of Classification Search
CPC ... H04L 63/101; H04L 63/0428; H04L 63/08; H04L 63/0861; G06F 16/951; G06F 21/44; G06F 2221/2129; G06F 21/76
See application file for complete search history.

(56) References Cited

U.S. PATENT DOCUMENTS

| | | |
|---|---|---|
| 4,405,829 A | 9/1983 | Rivest et al. |
| 4,649,233 A | 3/1987 | Bass et al. |

(Continued)

FOREIGN PATENT DOCUMENTS

| | | |
|---|---|---|
| KR | 2018-0108910 A | 10/2018 |
| WO | 2012089967 A1 | 7/2012 |

OTHER PUBLICATIONS

International Search Report and the Written Opinion of the International Searching Authority in International Application No. PCT/US2019/059369 dated Feb. 24, 2020.
(Continued)

*Primary Examiner* — J. Brant Murphy
(74) *Attorney, Agent, or Firm* — Gesmer Updegrove LLP

(57) ABSTRACT

Methods and computing devices configured to implement the methods for authenticating processing devices on a system on chip (SoC) for encrypted communication. An SoC may include a plurality of memories configured to store equivalent ephemeral shared data sets. A first processing device of the SoC may select first elements from a first ephemeral shared data set, generate a rule set indicating the first elements, send the rule set to a second processing device of the SoC, and generate a first result based on the first elements. The second processing device may receive the rule set, select second elements from a second ephemeral shared data set, generate a second result based on the second elements, and send the second result to the first processing device. The first processing device may receive the second result and authenticate the second processing device based on a comparison of the first and second results.

20 Claims, 27 Drawing Sheets

Related U.S. Application Data continuation-in-part of application No. 15/788,981, filed on Oct. 20, 2017, now Pat. No. 10,122,699, which is a continuation of application No. 15/493,572, filed on Apr. 21, 2017, now Pat. No. 10,057,269.

(60) Provisional application No. 62/754,846, filed on Nov. 2, 2018, provisional application No. 62/513,047, filed on May 31, 2017.

(52) U.S. Cl.
CPC .......... *H04L 63/0428* (2013.01); *H04L 63/08* (2013.01); *G06F 2221/2129* (2013.01)

(56) References Cited

U.S. PATENT DOCUMENTS

| | | | |
|---|---|---|---|
| 5,651,064 | A | 7/1997 | Newell |
| 5,729,608 | A | 3/1998 | Janson et al. |
| 6,055,637 | A | 4/2000 | Hudson et al. |
| 6,295,541 | B1 | 9/2001 | Bodnar et al. |
| 8,321,670 | B2 | 11/2012 | Lior et al. |
| 8,510,565 | B2 | 8/2013 | Tie et al. |
| 8,817,985 | B2 | 8/2014 | Fukuda |
| 8,855,312 | B1 | 10/2014 | Hodgman et al. |
| 8,964,947 | B1* | 2/2015 | Noolu ................ G06F 3/0482 379/88.01 |
| 9,021,269 | B2 | 4/2015 | Spilman |
| 9,432,198 | B2 | 8/2016 | Falk et al. |
| 9,722,803 | B1 | 8/2017 | Ellingson et al. |
| 9,813,245 | B2* | 11/2017 | Le Saint ................ H04L 9/14 |
| 9,980,140 | B1 | 5/2018 | Spencer et al. |
| 10,015,153 | B1 | 7/2018 | Dotan et al. |
| 10,021,100 | B2 | 7/2018 | Ellingson et al. |
| 10,057,269 | B1 | 8/2018 | Ellingson |
| 10,097,344 | B2 | 10/2018 | Davis |
| 10,122,699 | B1 | 11/2018 | Ellingson et al. |
| 10,149,156 | B1 | 12/2018 | Tiku et al. |
| 10,541,989 | B2 | 1/2020 | Ellingson et al. |
| 2001/0044786 | A1 | 11/2001 | Ishibashi |
| 2002/0138761 | A1 | 9/2002 | Kanemaki et al. |
| 2003/0084287 | A1 | 5/2003 | Wang et al. |
| 2003/0182327 | A1 | 9/2003 | Ramanujam et al. |
| 2004/0067736 | A1 | 4/2004 | Kamma |
| 2004/0131187 | A1 | 7/2004 | Takao et al. |
| 2004/0167804 | A1 | 8/2004 | Simpson et al. |
| 2004/0172300 | A1 | 9/2004 | Mihai et al. |
| 2004/0172423 | A1 | 9/2004 | Kaasten et al. |
| 2005/0187966 | A1 | 8/2005 | Iino |
| 2005/0208940 | A1 | 9/2005 | Takase et al. |
| 2005/0216769 | A1 | 9/2005 | Matsuoka et al. |
| 2006/0005985 | A1 | 1/2006 | L'Henaff et al. |
| 2006/0053285 | A1* | 3/2006 | Kimmel ................ H04L 9/3247 713/166 |
| 2006/0075234 | A1 | 4/2006 | You et al. |
| 2006/0087999 | A1 | 4/2006 | Gustave et al. |
| 2006/0133613 | A1 | 6/2006 | Ando et al. |
| 2006/0136702 | A1 | 6/2006 | Vantalon et al. |
| 2006/0147043 | A1 | 7/2006 | Mann et al. |
| 2006/0161775 | A1 | 7/2006 | O'Brien et al. |
| 2007/0022302 | A1 | 1/2007 | Richards, Jr. et al. |
| 2007/0186115 | A1 | 8/2007 | Gao et al. |
| 2007/0256118 | A1 | 11/2007 | Nomura et al. |
| 2008/0022091 | A1 | 1/2008 | Deshpande et al. |
| 2008/0086646 | A1 | 4/2008 | Pizano |
| 2008/0209214 | A1 | 8/2008 | Schrijen et al. |
| 2008/0235768 | A1 | 9/2008 | Walter et al. |
| 2008/0301228 | A1 | 12/2008 | Flavin |
| 2008/0313698 | A1 | 12/2008 | Zhao et al. |
| 2008/0313723 | A1 | 12/2008 | Naono et al. |
| 2009/0006850 | A1 | 1/2009 | Birger et al. |
| 2009/0135725 | A1* | 5/2009 | Tanaka ................ H04L 43/50 370/241 |
| 2009/0161876 | A1 | 6/2009 | Sherkin |
| 2009/0199009 | A1 | 8/2009 | Chia et al. |
| 2009/0282467 | A1 | 11/2009 | Schenk |
| 2009/0287921 | A1 | 11/2009 | Zhu et al. |
| 2010/0042833 | A1 | 2/2010 | Platt |
| 2010/0062758 | A1 | 3/2010 | Proctor, Jr. et al. |
| 2010/0104102 | A1 | 4/2010 | Brown et al. |
| 2010/0228981 | A1 | 9/2010 | Yao |
| 2010/0250952 | A1 | 9/2010 | Pang et al. |
| 2010/0279611 | A1 | 11/2010 | Kumazawa |
| 2010/0299308 | A1 | 11/2010 | Prasad et al. |
| 2011/0010543 | A1 | 1/2011 | Schmidt et al. |
| 2011/0138179 | A1 | 6/2011 | Jiang et al. |
| 2011/0154037 | A1 | 6/2011 | Orre et al. |
| 2011/0197064 | A1 | 8/2011 | Garcia Morchon et al. |
| 2011/0202755 | A1* | 8/2011 | Orsini ................ G06F 21/602 713/151 |
| 2012/0011360 | A1 | 1/2012 | Engels et al. |
| 2012/0093311 | A1 | 4/2012 | Nierzwick et al. |
| 2012/0106735 | A1 | 5/2012 | Fukuda |
| 2012/0167169 | A1* | 6/2012 | Ge ................ H04L 9/321 726/2 |
| 2012/0170751 | A1 | 7/2012 | Wurm |
| 2012/0243679 | A1 | 9/2012 | Obana |
| 2013/0035067 | A1 | 2/2013 | Zhang et al. |
| 2013/0046972 | A1 | 2/2013 | Campagna et al. |
| 2013/0097117 | A1* | 4/2013 | Lasky ................ G06F 11/1471 707/624 |
| 2013/0152160 | A1 | 6/2013 | Smith et al. |
| 2013/0182848 | A1 | 7/2013 | Sundaram et al. |
| 2013/0232551 | A1 | 9/2013 | Du et al. |
| 2013/0243194 | A1* | 9/2013 | Hawkes ................ H04W 12/041 380/270 |
| 2013/0276092 | A1 | 10/2013 | Sun et al. |
| 2014/0013108 | A1 | 1/2014 | Pellikka et al. |
| 2014/0057601 | A1 | 2/2014 | Michau et al. |
| 2014/0162601 | A1 | 6/2014 | Kim et al. |
| 2014/0164768 | A1* | 6/2014 | Kruglick ................ H04L 63/062 713/168 |
| 2014/0164776 | A1* | 6/2014 | Hook ................ H04L 9/3247 713/171 |
| 2015/0013015 | A1 | 1/2015 | Zheng et al. |
| 2015/0039651 | A1* | 2/2015 | Kinsely ................ G06F 16/254 707/779 |
| 2015/0101037 | A1 | 4/2015 | Yang et al. |
| 2015/0106898 | A1 | 4/2015 | Du et al. |
| 2015/0220726 | A1 | 8/2015 | Kumar |
| 2015/0222632 | A1 | 8/2015 | Ichijo et al. |
| 2015/0237026 | A1 | 8/2015 | Kumar |
| 2015/0281199 | A1 | 10/2015 | Sharma |
| 2015/0372811 | A1* | 12/2015 | Le Saint ................ G06Q 20/3227 705/76 |
| 2016/0063466 | A1 | 3/2016 | Sheridan et al. |
| 2016/0065370 | A1* | 3/2016 | Le Saint ................ H04L 63/061 713/155 |
| 2016/0099901 | A1 | 4/2016 | Allen et al. |
| 2016/0099922 | A1 | 4/2016 | Dover |
| 2016/0156614 | A1 | 6/2016 | Jain et al. |
| 2016/0182497 | A1 | 6/2016 | Smith |
| 2016/0197706 | A1 | 7/2016 | Lester et al. |
| 2016/0260169 | A1 | 9/2016 | Arnold et al. |
| 2016/0261690 | A1 | 9/2016 | Ford |
| 2016/0337326 | A1* | 11/2016 | O'Hare ................ G06F 21/606 |
| 2017/0201380 | A1* | 7/2017 | Schaap ................ H04W 12/04 |
| 2017/0243212 | A1 | 8/2017 | Castinado et al. |
| 2017/0324548 | A1* | 11/2017 | Anshel ................ H04L 9/0844 |
| 2018/0131526 | A1 | 5/2018 | Ellingson et al. |
| 2018/0343259 | A1 | 11/2018 | Ellingson |
| 2019/0149552 | A1 | 5/2019 | Ellingson |

OTHER PUBLICATIONS

International Search Report from the Korean Intellectual Property Office in International Application No. PCT/US2018/024521 dated Jul. 12, 2018, 11 pages.

Bocek, "Attack on Trust Threat Bulletin: Sony Breach Leaks Private Keys, Leaving Door Open", Venafi Blog, http://www.venafi.com/blog/attack-on-trust-threat-bulletin-sony-breach-leaks, 7 pages, (Jan. 19, 2017).

(56) References Cited

OTHER PUBLICATIONS

Cisco, "Dynamic Shared Secrets for the Cisco CMTS Routers", Cisco IOS CMTS Software Configuration Guide, 32 pages, (Feb. 14, 2008).
Juniper Networks, Inc., "Enabling IMS AAA Dynamic Authorization", 5 pages, (1999-2010).
Kwong, et al., "On the Feasibility and Efficacy of Protection Routing in IP Networks", University of Pennsylvania Scholarly Commons, Department of Electrical & Systems Engineering, 11 pages, (Dec. 10, 2009).
IBM Knowledge Center, "RSCS Dynamic Authorization Server Virtual Machine", 2 pages.
Stack Exchange, "What can an attacker do with a stolen SSL private key? What should the web admin do?", Information Security Stack Exchange, 2 pages, (Jan. 19, 2017).
Cnodder, et al., "RADIUS Dynamic Authorization Server MIB", Network Working Group, Request for Comments; 4673, 25 pages, (Sep. 2006).
Chiba, et al., "Dynamic Authorization Extensions to Remote Authentication Dial In User Service (RADIUS)" Network Working Group, Request for Comments: 5176, 35 pages, (Jan. 2008).
RSA, "Global Security Chiefs Over Five Recommendations to Overhaul Outdated Information Security Processes", http://www.rsa.com/en-us/company/newsroom/global-security-chiefs-offer-five-recommendations-to-overhaul, pp. 1-11, (Dec. 10, 2013).
DBIR, "2016 Data Breach Investigations Report—89% of breaches had a financial or espionage motive", Verizon 2016 Data Breach Investigations Report, pp. 1-85, (2016).
Grass, et al., "DRAFT NIST Special Publication 800-63B Digital Authentication Guideline, Authentication and Lifecycle Management", National Institute of Standards and Technology, U.S. Department of Commerce, pp. 1-48, (Nov. 18, 2015).
Wikipedia, "Man-in-the-middle attack", https://en.wikipedia.org/w/index.php?title=Man-in-the-middle_attack&oldid=753645501; 5 pages, (Dec. 8, 2016).
Pansa, et al., "Web Security Improving by using Dynamic Password Authentication", 2011 International Conference on Network and Electronics Engineering, pp. 32-36, (2011).
Amyx, "Managed PKI certificates: One step at a time toward securing the IoT", Unshackle the Internet of Things, TechBeacon, 14 pages, (2016).
Commission on Enhancing National Cybersecurity, "Report on Securing and Growing the Digital Economy", 100 pages, (Dec. 1, 2016).
Wikipedia, "Dynamic SLL", http://en.wikipedia.org/wiki/Dynamic_SLL, Dynamic SSL—Wikipedia, the free encyclopedia, pp. 1-4, (Aug. 25, 2016).
Glover, "PC1 3.1: Stop Using SSL and Outdated TLS Immediately", http://blog.securitymetrics.com/2015/04/pci-3-1-sss-and-tls.html; pp. 1-6, (Aug. 25, 2016).
Dierks, "The Transport Layer Security (TLS) Protocol Version 1.1", Network Working Group, https://tools.ietf.org/html/rfc4346?cm_mc_uid=55413578387314706858380&cm_mc_sid_50200000=1472153170, pp. 1-174, (Apr. 2006).
IBM, "The Secure Sockets Layer and Transport Layer Security", Verification of X.509 Public Key Certificates for Secure Communications, http://www.ibm.com/developerworks/library/ws-ssl-security, pp. 1-48, (Jun. 6, 2012).
RSA, "Two-Factor Authentication is a Must for Mobile", https://blogs.rsa.com/two-factor-authentication-is-a-must-for-mobile, www.rsa.com, pp. 1-7, (Aug. 24, 2016).
Jarmoc, "Transitive Trust and SSL/TLS Interception Proxies, SecureWorks", http://www.secureworks.com/research/transitive-trust, pp. 1-21, (Mar. 21, 2012).
Lim, et al., "A Dynamic Key Infrastructure for Grid", Information Security Group, pp. 1-10.
Levi, et al., "An efficient, dynamic and trust preserving public key infrastructure", IEEE.org, IEEE Xplore Digital Library, 3 pages, (Aug. 6, 2002).
Dr. Dobbs, "The Book Cipher Algorithm", http://www.drdobbs.com/security/the-book-cipher-algorithm/210603676, 5 pages, (Sep. 24, 2008).
Meyburgh, "Dynamic Distributed Key Infrastructure DDKI, Tunnel Project with GateKeeper and KeyVault", A00214314, (COMP 8045 & COMP 8046), 47 pages.
Salem, et al., "The Case for Dynamic Key Distribution for PKI-Based VANETs", International Journal of Computer Networks & Communications (IJCNC), vol. 6, No. 1, 18 pages, (Jan. 2014).
Palo Alto Networks, "Government Endpoint", Use Case, 6 pages.
Wnlabs, "One time pad security", http://www.wnlabs.com/solution.htm, 2 pages, (retrieved Jun. 13, 2017).
Whitenoise, "Unclassified story of Whitenoise Super Key Encryption and Dynamic Identity Verification and Authentication", 9 pages.
Hosseinkhani, et al., "Using image as cipher key in AES", IJCSI International Journal of Computer Science Issues, vol. 9, Issue 2, No. 2, ISSN (Online): 1694-0814, pp. 538-544, (Mar. 2012).
International Search Report and Written Opinion of the International Searching Authority for International Application No. PCT/US2018/027316 dated Aug. 30, 2018, 13 pages.
Moreau, "Why Should We Look for Alternatives to the Public Key Infrastructure (PKI) Model?" CONNOTECH Experts—conseils Inc., Aug. 1999, Quebec, Canada, 4 pages.
Salem, et al., "The Case for Dynamic Key Distribution for PKI-based Vanets" International Journal of Computer Networks & Communications (IJCNC) vol. 6, No. 1, pp. 61-78, Jan. 2014.
International Preliminary Report on Patentability received in related Application No. PCT/US2018/024521 dated Oct. 31, 2019.
Cremers, et al. "A family of multi-party authentication protocols." *First Benelux Workshop on Information and System Security (WISSec).* 2006.
Wang et al. "ID-Based Authenticated Multi-Party Key Agreement Protocol to Multimedia Applications Systems." 2008 International Conference on Computer Science and Software Engineering, IEEE Computer Society, DOI 10.1109/CSSE.2008.1565, pp. 1007-1010, 2008.

* cited by examiner

SYSTEMS AND METHODS FOR DEVICE AUTHENTICATION AND PROTECTION OF COMMUNICATION ON A SYSTEM ON CHIP

CROSS-REFERENCE TO RELATED APPLICATIONS

This application claims priority to U.S. Provisional Patent Application No. 62/754,846 entitled "Systems and Methods for Device Authentication and Protection of Communication on a System on Chip" filed on Nov. 2, 2018. This application is a continuation in part application of U.S. Pat. No. 10,122,699 entitled "Systems and Methods for Ephemeral Shared Data Set Management and Communication Protection" filed Oct. 20, 2017, which claims the benefit of priority to U.S. Provisional Application No. 62/513,047 entitled "Systems and Methods for Dynamic Shared Data Set Management and Communication Protection" filed May 31, 2017, the entire contents of all of which are hereby incorporated by reference. This application is a continuation in part application of U.S. patent application Ser. No. 16/038,908 entitled "Systems and Methods for Device Verification and Authentication" filed on Jul. 18, 2018, which claims the benefit of priority to U.S. Pat. No. 10,057,269 entitled "Systems and Methods for Device Verification and Authentication" filed on Apr. 21, 2017, the entire contents of all of which are hereby incorporated by reference.

BACKGROUND

The development of the digital environment has enabled a vast expansion in rapid communication and information transactions, among other things. However, the security paradigm from the past used in this new environment has inherent vulnerabilities: the concept of shared secrets and the concomitant trust. The paradigm of the shared secret has been incorporated into the digital environment in numerous ways—from usernames and passwords, to secure communications between users and systems. For example, this concept is foundational to the Secure Socket Layer, Certificate Authority, Public Key Information security infrastructure.

However, the digital environment is one in which secrets are difficult to keep for more than a short period of time, and once secrecy is lost the formerly secret information may be proliferated rapidly and with complete fidelity. The digital environment is also one in which shared secrets and credentials have become a primary target of "hacking" that has transformed many "secrets" (e.g., passwords, digital certificates, private information and other types of authentication data) into a commodity freely traded on the gray and black markets, destroying the benefit of such secrets for securing digital exchanges. Yet, the underlying security mechanism of the digital environment remains dependent upon the safe operation of this false assumption that the secret is still secret.

Authentication of a processing device is a critical aspect of numerous electronic communications. However, the vulnerability of shared secrets, as well as the vulnerability of communications in transmission, dramatically undermines the reliability and security of digital certificates or other similar information for trusted device identity verification.

SUMMARY

Various embodiments provide methods and computing devices configured to implement the methods for authenticating processing devices on a system on chip (SoC). Various embodiments may include a system on a chip (SoC) that may include a first memory configured to store a first ephemeral shared data set, a first processing device coupled to the first memory, a second memory configured to store a second ephemeral shared data set, wherein the first ephemeral shared data set is equal to the second ephemeral shared data set, and a second processing device coupled to the second memory and coupled to the first processing device. In some embodiments, first processing device may be configured with processor-executable instructions to perform operations including selecting first elements from the first ephemeral shared data set, generating a first rule set indicating the first elements, sending the first rule set to the second processing device, and generating a first result based on the first elements. In some embodiments, the second processing device may be configured with processor-executable instructions to perform operations including receiving the first rule set from the first processing device, extracting second elements from the second ephemeral shared data set based on the first rule set, generating a second result based on the second elements, and sending the second result to the first processing device. In some embodiments, the first processing device may be configured with processor-executable instructions to perform operations further including receiving the second result from the second processing device, and authenticating the second processing device based on a comparison of the first result and the second result.

In some embodiments, the processing device may be configured with processor-executable instructions to perform operations further including enabling communication with the second processing device in response to authenticating the second processing device. In some embodiments, the second processing device may be configured with processor-executable instructions to perform operations further including selecting third elements from the second ephemeral shared data set, generating a second rule set indicating the third elements, sending the second rule set to the first processing device, and generating a third result based on the second elements, and the first processing device may be configured with processor-executable instructions to perform operations further including receiving the second rule set from the second processing device, extracting fourth elements from the first ephemeral shared data set based on the second rule set, generating a fourth result based on the second elements, and sending the fourth result to the second processing device. In such embodiments, the second processing device may be configured with processor-executable instructions to perform operations further including receiving the fourth result from the first processing device, and authenticating the first processing device based on a comparison of the third result and the fourth result.

Various embodiments may include system on a chip (SoC), including a first memory configured to store a first ephemeral shared data set, and a first processing device coupled to the first memory. In some embodiments, the first processing device may be configured with processor-executable instructions to perform operations including selecting first elements from an ephemeral shared data set stored in the first memory, wherein the ephemeral shared data set is also stored in a second memory associated with a second processing device, generating a first rule set indicating the first elements, sending the first rule set to the second processing device, generating a result based on elements from the ephemeral shared data set stored in the first memory, and performing encrypted communication with the second processing device using the result.

In some embodiments, the second processing device may be coupled to the second memory and coupled to the first processing device, and the first processing device may be configured with processor-executable instructions to perform operations such that generating a result based on elements from the ephemeral shared data set stored in the first memory may include generating a first result based on the first elements. In such embodiments, performing encrypted communication with the second processing device using the result may include receiving an encrypted first message from the second processing device, attempting to decrypt the encrypted first message using the first result, and determining whether the attempted decryption of the first encrypted message was successful. In such embodiments, the second processing device may be configured with processor-executable instructions to perform operations including the first rule set from the first processing device, selecting second elements from the ephemeral shared data set stored in the second memory based on the first rule set, generating a second result based on the second elements, encrypting a first message using the second result, and sending the encrypted first message to the first processing device.

In some embodiments, the first processing device may be configured with processor-executable instructions to perform operations further including sending extraction instructions for extracting elements from the ephemeral data set to the second processing device, and extracting third elements from the ephemeral shared data set stored in the first memory. In such embodiments, selecting first elements from an ephemeral shared data set stored in the first memory may include selecting the first elements from the third elements. In such embodiments, the second processing device may be configured with processor-executable instructions to perform operations further including receiving the extraction instructions from the first processing device, and extracting fourth elements from the ephemeral shared data set stored in the second memory, wherein selecting second elements from the ephemeral shared data set stored in the second memory based on the first rule set may include selecting the second elements from the fourth elements.

In some embodiments, the second processing device may be configured with processor-executable instructions to perform operations further including selecting third elements from an ephemeral shared data set stored in the second memory, generating a second rule set indicating the third elements, sending the second rule set to the first processing device, generating a third result based on the third elements, and combining the second result and the third result producing a first combined result, wherein encrypting a first message using the second result may include encrypting the first message using the first combined result. In such embodiments, the first processing device may be configured with processor-executable instructions to perform operations further including receiving the second rule set from the second processing device, selecting fourth elements from the ephemeral shared data set stored in the first memory based on the second rule set, generating a fourth result based on the fourth elements, and combining the first result and the fourth result producing a second combined result, wherein attempting to decrypt the encrypted first message using the first result may include attempting to decrypt the encrypted first message using the second combined result.

Some embodiments may further include the second processing device coupled to the second memory and coupled to the first processing device, wherein the second processing device may be configured with processor-executable instructions to perform operations including selecting second elements from an ephemeral shared data set stored in the second memory, generating a second rule set indicating the second elements, sending the second rule set to the first processing device, receiving the first rule set from the first processing device, combining the first rule set and the second rule set producing a first combined rule set; selecting third elements from the ephemeral shared data set stored in the second memory based on the first combined rule set, generating a first result based on the third elements, encrypting a first message using the first result, and sending an encrypted first message to the first processing device. In such embodiments, the first processing device may be configured with processor-executable instructions to perform operations further including receiving the second rule set from the second processing device, combining the first rule set and the second rule set producing a second combined rule set, and selecting fourth elements from the ephemeral shared data set stored in the first memory based on the second combined rule set, wherein generating a result based on elements from the ephemeral shared data set stored in the first memory may include generating a second result based on the fourth elements. In such embodiments, the first processing device may be configured with processor-executable instructions to perform operations such that performing encrypted communication with the second processing device using the result includes receiving the encrypted first message from the second processing device, attempting to decrypt the encrypted first message using the second result, and determining whether the attempted decryption of the first encrypted message was successful.

Some embodiments may further include the second processing device coupled to the second memory and coupled to the first processing device, wherein the first processing device may be configured with processor-executable instructions to perform operations such that generating a result based on elements from the ephemeral shared data set stored in the first memory includes generating a first result based on the first elements, and performing encrypted communication with the second processing device using the result includes encrypting a first message using the first result, sending the encrypted first message to the second processing device, and determining whether an acknowledgement of the encrypted first message is received from the second processing device. In such embodiments, the second processing device may be configured with processor-executable instructions to perform operations including receiving the first rule set from the first processing device, selecting second elements from the ephemeral shared data set stored in the second memory based on the first rule set, generating a second result based on the second elements, receiving the encrypted first message from the first processing device, attempting to decrypt the encrypted first message using the second result, determining whether the attempted decryption of the first encrypted message was successful, and sending the acknowledgement of the encrypted first message to the second processing device in response to successful decryption of the first encrypted communication.

Some embodiments may further include the second processing device coupled to the second memory and coupled to the first processing device, wherein the first processing device may be configured with processor-executable instructions to perform operations such that generating a result based on elements from the ephemeral shared data set stored in the first memory includes generating a first result based on the first elements, and performing encrypted communication with the second processing device using the result includes encrypting a first communication using the first result; sending the encrypted first communication to the second processing device, and determining whether an acknowledgement of the encrypted first communication is received from the second processing device. In such embodiments, the second processing device may be configured with processor-executable instructions to perform operations including receiving the first rule set from the first processing device, selecting second elements from the ephemeral shared data set stored in the second memory based on the first rule set, generating a second result based on the second elements, receiving the encrypted first communication from the first processing device, attempting to decrypt the encrypted first communication using the second result, determining whether the attempted decryption of the first encrypted communication was successful, and sending the acknowledgement of the encrypted first communication to the second processing device in response to successful decryption of the first encrypted communication.

Further embodiments may include methods of implementing operations of any of the systems and/or devices summarized above. Further aspects may include a non-transitory processor-readable storage medium having stored thereon processor-executable software instructions configured to cause a processor to perform operations of any of the systems and/or devices summarized above. Further aspects may include a processing device for use in an SoC and configured to perform of any of the systems and/or devices summarized above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
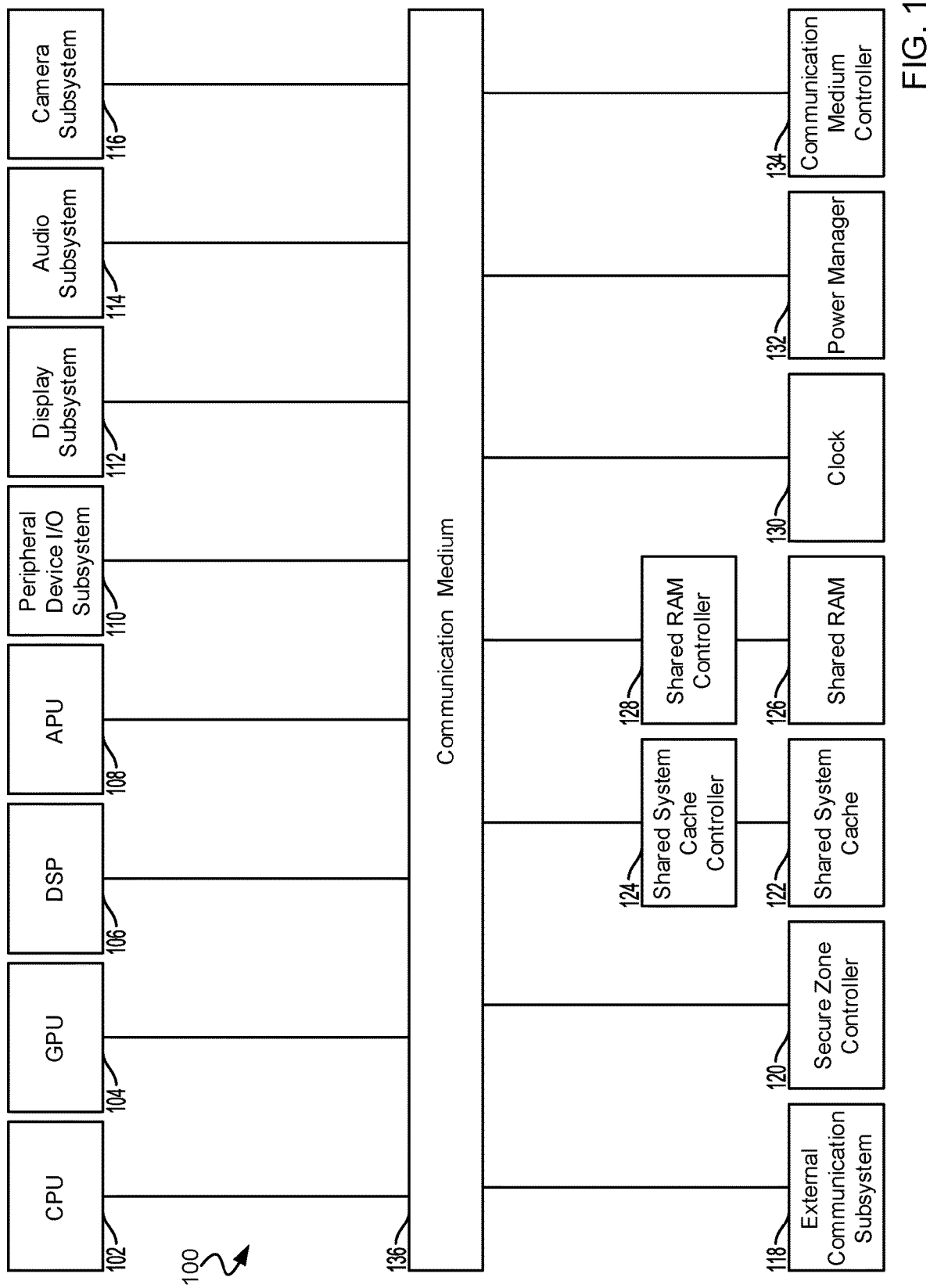
FIG. 1 is a component block diagram of a system on chip 100 suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods, and computing devices (or other digital or programmable devices) configured to implement the methods, that enable the management of a shared data set, authentication of processing devices on a system on a chip (SoC), and dynamic encryption of inter-processing device communication on the SoC. In various embodiments, the shared data set may be stored at two or more processing devices. In some embodiments, the shared data set may be dynamic, and may be altered from time to time. In various embodiments, the shared data set may be ephemeral, and may be altered after a relatively short period of time. In some embodiments, the dynamically-altered shared data set may provide a vast amount of complex random data using a relatively small starting data set. In various embodiments, the ephemeral shared data set may be used by two or more processing devices to generate a dynamic value. In some embodiments, the dynamically-generated value may be used to protect a communication between the two or more processing devices.

In various embodiments, the communication system may employ the dynamically-changing shared data and the dynamically generated value to protect the communication in a manner that does not rely on the paradigm of shared secrets and static information.

Because the ephemeral shared data set may be changed dynamically from time to time (e.g., upon the occurrence of a trigger event, periodically, aperiodically, etc.), and the dynamically generated value may be based on the dynamically changing ephemeral shared data set, various embodiments improve the security function of any communication network or any electronic communication system by improving the security of communications. Various embodiments also improve the security function of any communication network or system by using an ephemeral (dynamically changing) shared data set and a dynamically generated value, without relying on easily compromised static identification information, such as a shared secret (e.g., a shared certificate for a shared key, such as may be used in the public key infrastructure (PKI)) that may be vulnerable to attack by access and/or copying. Various embodiments also improve the security function of any communication network or system because the dynamic shared data set is not transmitted from one processing device to another. Various embodiments also improve the security function of any communication network or system because the dynamically generated value is not transmitted from one processing device to another.

The term "computing device" refers to any programmable computer or processor that can be configured with programmable instructions to perform various embodiment methods. A computing device may include one or all of personal computers, laptop computers, tablet computers, cellular telephones, smartphones, Internet enabled cellular telephones, Wi-Fi enabled electronic devices, personal data assistants (PDAs), wearable computing devices (including smart watches, necklaces, medallions, and any computing device configured to be worn, attached to a wearable item, or embedded in a wearable item), wireless accessory devices, memory sticks, dongles, wireless peripheral devices, Internet of Things (IoT) devices, autonomous vehicles, semiautonomous vehicles, and remotely directed vehicles, smart firearms, network elements such as servers, routers, gateways, and the like (including so-called "cloud" computing devices), and similar electronic devices equipped with a short-range radio (e.g., a Bluetooth, Peanut, ZigBee, and/or Wi-Fi radio, etc.) and/or a wide area network connection (e.g., using one or more cellular radio access technologies to communicate using a wireless wide area network transceiver, or a wired connection to a communication network).

The terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "system-on-chip" (SoC) is used herein to refer to a set of interconnected electronic circuits typically, but not exclusively, including a processing device, a memory, and a communication interface. A processing device may include a variety of different types of processors and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

Various embodiments disclosed in this application address the security vulnerability of digital systems and improve electronic security for inter-processing device communication on an SoC. Various embodiments provide computer-implemented methods to provide for continuous refreshing and changing of an ephemeral shared data set. Various embodiments provide computer-implemented methods to provide for the dynamic generation of a value that may be used to authenticate a processing device on an SoC based on the dynamically changed ephemeral shared data set. Various embodiments provide computer-implemented methods to provide for the dynamic generation of a value that may be used to protect a communication based on the dynamically changed ephemeral shared data set. Various embodiments incorporate the assumption that trusted systems ultimately are demonstrably insecure, because such systems are penetrable and vulnerable. Various embodiments provide a digital communication system that assumes no trust among various network elements, for at least the reason that the digital environment is inherently untrustworthy.

Various embodiments enable the generation of a vast amount of random data from a relatively small initial information set. Various embodiments enable the dynamic alteration of the data set such that the data set is altered unpredictably. In some embodiments, the dynamically altered data set, or a subset thereof, may be provided to or obtained by two or more processing devices on an SoC, such that the two or more processing devices each store an ephemeral shared data set. In some embodiments, the ephemeral shared data set of the two or more processing devices may be dynamically altered. In some embodiments, alterations of the ephemeral shared data set may be synchronized such that the altered data set remained shared by the two or more processing devices.

Various embodiments enable the generation of a dynamic value by the two or more processing devices on an SoC. In some embodiments, the dynamic value is generated based on the ephemeral shared data set. In some embodiments, the dynamic value may be used to encrypt a communication of the two or more processing devices.

Various embodiments also improve the security function of any communication network or system because the dynamic shared data set is not transmitted from one processing device to another. Various embodiments also improve the security function of any communication network or system because the dynamically generated value is not transmitted from one processing device to another.

Since a common threat vector is typically theft of credentials such as certificates and key information, rather than use of processing power to decrypt encoded authenticating information, various embodiments improve the security of communications in a communication network. In some embodiments, the dynamic shared data set may exist in one state for a relatively short period of time, which may be minutes, seconds, or even fractions of a second. In some embodiments, the dynamic value may be usable to encrypt and decrypt only one communication. This contrasts with the effective duration of certificates from a conventional certifying authority (CA), which may have a duration of up to decades in some cases. The relatively short useful duration and the inherent complexity of the ephemeral shared data set and the dynamic value reduces by orders of magnitude the possibility of such information being guessed, accessed, or "hacked" and then used as a means of attacking the system.

Further details relevant to various embodiments are disclosed in U.S. Pat. No. 9,722,803 entitled "Systems and Methods for Device Authentication" issued Aug. 1, 2017, U.S. Pat. No. 10,057,269 entitled "Systems and Methods for Device Verification and Authentication" issued Aug. 21, 2018, and U.S. Pat. No. 10,122,699 entitled "Systems and Methods for Ephemeral Shared Data Set Management and Communication Protection" issued Nov. 8, 2018, all of which are incorporated by reference herein in their entirety.

Various embodiments include systems and methods for managing an ephemeral shared data set stored by two or more processing devices. In various embodiments, the two or more processing devices may include any two processing devices on a SoC. The ephemeral shared data set may be preloaded to a memory accessible by the processing device or compiled over time, and may be changed by a processing device occasionally, periodically, and/or upon the occurrence of a triggering event. Changing or altering the ephemeral shared data set may include reordering one or more portions of the data set, adding information to the data set, subtracting information from the data set, and/or transforming one or more portions of the ephemeral shared data set. The ephemeral shared data set may include two or more portions. Each portion of the data set may include two or more elements. In some embodiments, a processing device may determine a relationship between two or more elements of an ephemeral shared data set. The relationship between the two or more elements may include a comparative difference between the two or more elements, such as a value difference, a time difference, a location difference, a positional difference, a color difference, a pitch difference, a frequency difference, or another difference.

In some embodiments, a communication medium controller may dynamically generate one or more instructions to alter the ephemeral shared data set. In some embodiments, the instructions may include an instruction to replace the ephemeral shared data set. In some embodiments, the instruction may include an instruction to add a new data set portion. In some embodiments, the instruction may include an instruction to subtract a portion of the ephemeral shared data set. In some embodiments, the instruction may include an instruction to reorder the ephemeral shared data set. In some embodiments, the instruction may include an instruction to transform the ephemeral shared data set.

In various embodiments, performing one or more transformations to the ephemeral shared data set enables the generation of a very large number of unpredictable element values and relationships among data elements from a relatively small number of portions. In various embodiments, simple computations, or computations that are not processor intensive, may generate vast complexity from a relatively small and/or simple starting data set. In contrast to conventional secret information (such as a PKI certificate, which is representative of one-dimensional, linear computations), the dynamic data set may be multidimensional (n-dimensional), and may provide vastly greater complexity and conventional secret information by several orders of magnitude. Further, various embodiments may determine relationships between and among elements of the ephemeral shared data set. Performing a transformation on the data set may change the various relationships between and among the data elements. As but one example, and image file may include a number of pixels, and each pixel may be associated with a number of different values, such as location information within the image file, color, hue, saturation, black and white value, and other such pixel information. Even without transformation, the image file may contain a unique set of information. A processor then may perform the transform on one or more of the image files, thereby changing not only the values of the various pixels in the transformed image files, but also numerous relationships among the data elements of the transformed image files and other portions of the data set.

In some embodiments, one of the processing devices (a first processing device) may send an indication to the communication medium controller that the processing device has a communication to send to a second processing device. In response to the indication from the first processing device, the communication medium controller may generate instructions to extract one or more elements from the ephemeral shared data set, and may send the extraction instructions to the first and second processing device. According to the instructions, the first and second processing devices may extract the elements from the ephemeral shared data set. In some embodiments, the extraction instructions may include an indication of the element(s) to be extracted. In some embodiments, the extraction instructions may include a rule set that enables each of the first and second processing devices to identify the element(s) of the ephemeral shared data set to be extracted. In some embodiments, the extraction instructions may include an instruction to perform a transformation operation on one or more of the extracted elements. In various embodiments, the extraction instructions may enable the first processing device and the second processing device to dynamically generate a unique set of elements that are shared by the first processing device and the second processing device (i.e., the extracted elements are stored at each of the first processing device and the second processing device), based on elements in the ephemeral shared data set.

In some embodiments, the first processing device may select elements from among the extracted elements. In some embodiments, the first processing device may generate a rule set indicating the selected elements. The rule set may identify the selected elements from among the extracted data elements of the ephemeral shared data set. In some embodiments, the processing device may generate the rule set based on one or more relationships between or among the selected data elements. In some embodiments, the rule set may identify a first element and one or more relationships among the first element and other data elements that enable a processing device to select the elements from the extracted elements based on the identity of the first element and the one or more relationships to the other data elements. The first processing device may send the generated rule set to the second processing device.

As one example, an ephemeral shared data set may include two or more image files, and each image file may include numerous pixels (picture elements). Each image file may be associated with additional data, such as a time stamp or other time information, location information and/or geolocation information where the image was obtained, weather information, and the like. Each pixel may be associated with a large number of information elements, such as a coordinate location in an image, color, intensity, luminosity, and the like. Each pixel may also be associated with the information of its respective image file. Thus, each pixel may be associated with a large number of information elements, which may be considered variables. In some embodiments, the rule set may include information identifying one or more pixels of the ephemeral shared data set. In some embodiments, the rule set may include information identifying one pixel of the ephemeral shared data set, and relationship information that enables the identification of one or more other pixels using the identified first pixel and the relationship information.

The ephemeral shared data set is not limited to image files, and a shared data set may be generated or compiled using data that may include identifiable data elements, and/or in which relationships between or among two or more data elements may be determined. Examples of such data include video files, audio files, biometric samples, location data (e.g., Global Positioning Satellite system data), and the like. Further, a rule set may include information identifying one or more data elements of a component of the ephemeral shared data set. In some embodiments, the rule set may include information identifying one data element and relationship information that enables the identification of one or more other data elements in a data set (e.g., elements selected from the extracted data elements).

In some embodiments, the first processing device may generate a first result based on the selected elements. In some embodiments, the generated result may include a string of data. In some embodiments, the generated result may include a value based on information in the elements selected from the extracted elements of the ephemeral shared data set. In some embodiments, the first processing device may perform a transform of the information of the selected elements, such as generating a hash of values of the information. In some embodiments, the first processing device may generate a data string based on the information of the selected elements and may perform a transform (e.g., generate a hash) of the information of the selected elements to generate the first result.

In various embodiments, a second processing device having the elements extracted from the ephemeral shared data set may receive the rule set from the first processing device, and may use the rule set and the extracted elements of the ephemeral shared data set to select the elements from the extracted elements. For example, the second processing device may apply the rule set to its stored extracted data elements to identify, e.g., pixels and their associated location, order in the data set, numerical values for color, density, etc. In some embodiments, the second processing device may create a data string from the application of the rule set.

In some embodiments, the second processing device may generate a second result based on the selected elements. In some embodiments, the generated result may include a string of data. In some embodiments, the generated result may include a value based on the information in the selected elements of the ephemeral shared data set. In some embodiments, the second processing device may perform a transform of the information of the selected elements, such as generating a hash of values of the information. In some embodiments, the second processing device may generate a data string based on the information of or within the selected elements and may perform a transform (e.g., generate a hash) of the data string to generate the second result.

In some embodiments, the second processing device may encrypt a message using the second result, and the second processing device may send the encrypted message to the first processing device. In some embodiments, the message may include a very small amount of data. In some embodiments, the encrypted message may function as a test message for sending to the first processing device, to enable the first processing device to determine whether the second result generated by the second processing device matches the first result generated by the first processing device.

In some embodiments, the first processing device may receive the encrypted message from the second device, and may attempt to decrypt the message using the first result. For example, the first processing device may initiate a decryption process of the message. The first processing device may determine whether the decryption was successful. In some embodiments, in response to determining that the decryption was not successful, the first processing device may determine that the second processing device is not authenticated. In some embodiments, in response to determining that the decryption was not successful, the first processing device may send a synchronization query to the communication medium controller. In some embodiments, in response to the synchronization query, the communication medium controller may then generate new extraction instructions and send the new extraction instructions to the first and second processing devices. In some embodiments, in response to synchronization query, the communication medium controller, as well as the first and second processing devices, may perform synchronization operations to synchronize the ephemeral shared data set.

In various embodiments, each of the first processing device and the second processing device may select elements from among the extracted elements, and each of the first processing device and the second processing device may generate a rule set. In some embodiments, the elements selected by the first processing device may be different than the elements selected by the second processing device. For example, in some embodiments, the first processing device may generate a first rule set indicating the elements selected by the first processing device. In some embodiments, the second processing device may generate a second rule set indicating the elements selected by the second processing device. In some embodiments, the first processing device may send the first rule set to the second processing device, and the second processing device may send the second rule set to the first processing device.

In some embodiments, the first and/or second rule sets may include instructions/rules for how to combine the selected elements (i.e., elements selected by each device and the elements selected using the rule set from the other processing device) to generate a combined set of selected elements.

In some embodiments, the first processing device may generate a first result based on the elements selected by the first processing device. In some embodiments, the first processing device may select elements from among the extracted elements using the second rule set (from the second processing device). The first processing device may generate a second result from the elements selected using the second rule set. In some embodiments, the first processing device may combine the first result and the second result to generate a combined result.

In some embodiments, the second processing device may generate a third result based on the elements selected by the second processing device. In some embodiments, the first processing device may select elements from among the extracted elements using the first rule set (from the first processing device). The second processing device may generate a fourth result from the elements selected using the first rule set. In some embodiments, the second processing device may combine the third result and the fourth result to generate a combined result. In various embodiments, the combined results generated by each of the first processing device and the second processing device are the same.

In some embodiments, the first and/or second rule sets may include instructions/rules for combining the first and second rule sets to generate a combined rule set. Each processing device may then use the combined rule set to select the elements from among the extracted elements, and may use the selected elements to generate the combined result.

In some embodiments, the second processing device may encrypt a message using the combined result generated by the second processing device, and the second processing device may send the encrypted message to the first processing device. In some embodiments, the first processing device may receive the encrypted message from the second device, and may attempt to decrypt the message using the combined result generated by the first processing device. In response to determining that the decryption was successful, the first processing device may encrypt a communication using the combined result, and may send the encrypted communication to the second processing device. The second processing device may decrypt the communication using the combined result.

In some embodiments, an SoC may include a first memory configured to store a first ephemeral shared data set, a first processing device coupled to the first memory, a second memory configured to store a second ephemeral shared data set equal to the first ephemeral shared data set, and a second processing device coupled to the second memory and coupled to the first processing device. The first processing device configured with processor-executable instructions to perform operations including selecting first elements from the first ephemeral shared data set, generating a rule set indicating the selected elements, sending the generated rule set to the second processing device, and generating a first result based on the selected first elements. The second processing device configured with processor-executable instructions to perform operations including receiving the generated rule set from the first processing device, selecting second elements from the second ephemeral shared data set, generating a second result based on the selected second elements, and sending the generated second result to the first processing device. The first processing device configured with processor-executable instructions to perform operations further including receiving the generated second result from the second processing device, and authenticating the second processing device based on a comparison of the generated first result and the generated second result.

Various embodiments may be implemented within a variety of SoCs 100, an example of which is illustrated in FIG. 1. The SoC 100 may include any number and combination of components, examples of which may include a central processing unit (CPU) 102, a graphics processing unit (GPU) 104, digital signal processor (DSP) 106, custom hardware accelerator 108, peripheral device input/output (I/O) subsystem 110, display subsystem 112, audio subsystem 114, camera subsystem 116, external communication subsystem 118, secure zone controller 120, shared system cache 122, shared system cache controller 124, shared random access memory (RAM) 126, shared RAM controller 128, clock 130, power manager 132, communication medium controller 134, and communication medium 136. Herein, any components of the SoC 100 that may be configured to implement processing of a computer code instruction, data, or other electronic signals, may be referred to as a "processing device." Processing devices may be configured to read, receive, write, send, interpret, execute, manipulate, and/or generate computer code instructions, data, and/or other electrical signals. Processing devices may be configured to communicate with other processing devices on the SoC 100 by sending and/or receiving electronic signals that may be configured to represent an address location of a processing device and/or a memory location, data used for executing and/or resulting from executing processing device functions, and/or control signals for indicating request instructions, acknowledgements, data transfer information and/or parameters, etc. In various embodiments, the components of the SoC 100 may be processing devices and/or include processing devices, such as additional processors and controllers (not shown). The SoC 100 illustrated in FIG. 1 is meant to provide an example configuration of an SoC, and does not limit the scope of the claims and description. An SoC may include any combination of more, fewer, and/or different components, including processing devices.

The CPU 102, the GPU 104, the DSP 106, and the custom hardware accelerator 108, may each be configured for specific purposes that may be the same as or different from other processing devices of the SoC 100. One or more of the CPU 102, the GPU 104, the DSP 106, and the custom hardware accelerator 108 and their processor cores of the same or different configurations may be grouped together. A group of CPUs 102, GPUs 104, DSPs 106, and custom hardware accelerators 108 or their processor cores may be referred to as a multi-processor cluster.

Various subsystems of the SoC 100, such as the peripheral device output I/O subsystem 110, the display subsystem 112, the audio subsystem 114, the camera subsystem 116, and the external communication subsystem 118 may include further components (not shown) configured to support the specific purpose of the subsystem. For example, a subsystem may include any number or combination of a processing device, a memory, a sensor, and/or a communication component configured for use to implement the specific purpose of the sub system. In various embodiments, the peripheral device I/O subsystem 110 may be configured for the purpose of communication between a peripheral device, communicatively connected to a computing device housing the SoC 100, and the SoC 100. In various embodiments, the display subsystem 112 may be configured for the purpose of translating and communicating data and signals between a display of the computing device and the SoC 100 in order to generate an image on the display and respond to user interactions with the display. In various embodiments, the audio subsystem 114 may be configured for the purpose of translating and communicating data and signals between a speaker and/or microphone of the computing device and the SoC 100 in order to generate audible outputs, such as via a connected speaker, and receive audible inputs, such as via a microphone. In various embodiments, the camera subsystem 116 may be configured for the purpose of translating and communicating data and signals between a camera/light sensor of the computing device and the SoC 100 in order to receive, process, and store data input to the camera/light sensor. In various embodiments, the external communication subsystem 118 may be configured for the purpose of translating and communicating data and signals between a communication access point, such as a physical communication port or a wireless antenna, of the computing device and the SoC 100 in order to receive and output communication messages to other computing devices.

The secure zone controller 120 may be configured to allow or deny access to components of the SoC 100 that are designated as secure. In various embodiments, complete and/or portions of a component may be designated as secure. For example, all of and/or a partition of the shared system cache 122 and/or the shared RAM 126 of the SoC 100 may be designated as secure, and the secure zone controller 120 may control access to the secure parts of the shared system cache 122 and/or the shared RAM 126 by the processing devices of the SoC 100. For further example, a processor, processor core, cache, and/or cache partition of a processing device of the SoC 100 may be designated as secure, and the secure zone controller 120 may control access to the secure parts of the processor, processor core, cache, and/or cache partition of a processing device by the processing devices of the SoC 100.

The shared system cache 122 and the shared RAM 126 of the SoC 100 may be volatile memories configured for storing data and processor-executable code for access by the processing devices of the SoC 100. The SoC 100 may include one or more shared system caches 122 and shared RAMs 126 configured for various purposes. The shared system caches 122 and shared RAMs may be configured to temporarily hold a limited amount of data received from a data sensor (not shown) or subsystem 112, 114, 116, 118, 120 having a data sensor, data and/or processor-executable code instructions that are requested from a non-volatile memory communicatively connected to the SoC 100, loaded to the shared system cache 122 and the shared RAM 126 from the non-volatile memory in anticipation of future access based on a variety of factors, and/or intermediary processing data and/or processor-executable code instructions produced by a processing device and temporarily stored for future quick access without being stored in the non-volatile memory.

The shared system cache controller 124 and the shared RAM controller 128 of the SoC 100 may be configured manage access to the shared system cache 122 and the shared RAM 126 by other processing devices of the SoC 100. The shared system cache controller 124 and the shared RAM controller 128 may receive read and/or write requests for addresses of the shared system cache 122 and the shared RAM 126 from other processing devices. The shared system cache controller 124 and the shared RAM controller 128 may allow or deny the read and/or write requests depending on access privileges for the requesting processing devices, availability of the shared system cache 122 and the shared RAM 126, and/or status or availability of the data stored at the addresses of the requests. The shared system cache controller 124 and the shared RAM controller 128 may further be configured to manage and maintain the data stored in the shared system cache 122 and the shared RAM 126 by implementing memory management policies and memory maintenance operations, in order, for example, to maintain data coherency and memory availability and performance.

The clock 130 may include a clock controller configured to control the clock mode, such as an oscillating frequency of a crystal oscillator and/or gate signal, provided to the processing devices of the SoC 100. The clock controller may be configured to provide the processing devices of the SoC 100 with an oscillating signal configured to coordinate executions by circuits of the processing devices of the SoC 100. In some embodiments, the clock controller may be implemented as a separate circuit component on the SoC 100, such as a special purpose circuit, a dedicated processor configured with firmware and/or software, or a combination of dedicated circuitry and a dedicated processor configured with firmware and/or software.

The power manager 132 may be configured to control the distribution and amount of power to any of the components of the SoC 100, including the processing devices on the SoC 100. The power manager 132 may be configured to control a power state of any of the components of the SoC 100. In some embodiments, the power manager 132 may be implemented as a separate circuit component on the SoC 100, such as a special purpose circuit, a dedicated processor configured with firmware and/or software, or a combination of dedicated circuitry and a dedicated processor configured with firmware and/or software.

The communication medium 136 may be configured to facilitate communication between the processing devices of the SoC 100. The communication medium 136 may be a physical communication bus, including electrical conduits to transmit and receive electrical signals, a wireless radio frequency communication medium, including radio frequency antennas to transmit and receive radio frequency signals through the air, and/or a light transmission communication medium, including light emitters and sensors to transmit and receive light signals through the air and/or via light transmitting conduits. The communication medium 136 may facilitate direct communication between processing devices in direct connection with each other via the communication medium 136. The communication medium 136 may facilitate indirect communication between processing devices that are connected via a common communication medium 136 connecting more than two of the processing devices.

The communication medium controller 134 may be configured to control when communication between processing devices occurs and to direct communications between the processing devices so that they reach the intended destination. The communication medium controller 134 may control the use of the bandwidth of the communication medium 136 by the processing devices by controlling which processing device may transmit signals on the communication medium 136 at various times. The communication medium controller 134 may receive the signals sent by a first processing device, including an address of a second processing device as a destination for the signals, and redirect the received signals to the destination address of the second processing device.

Figure 2:
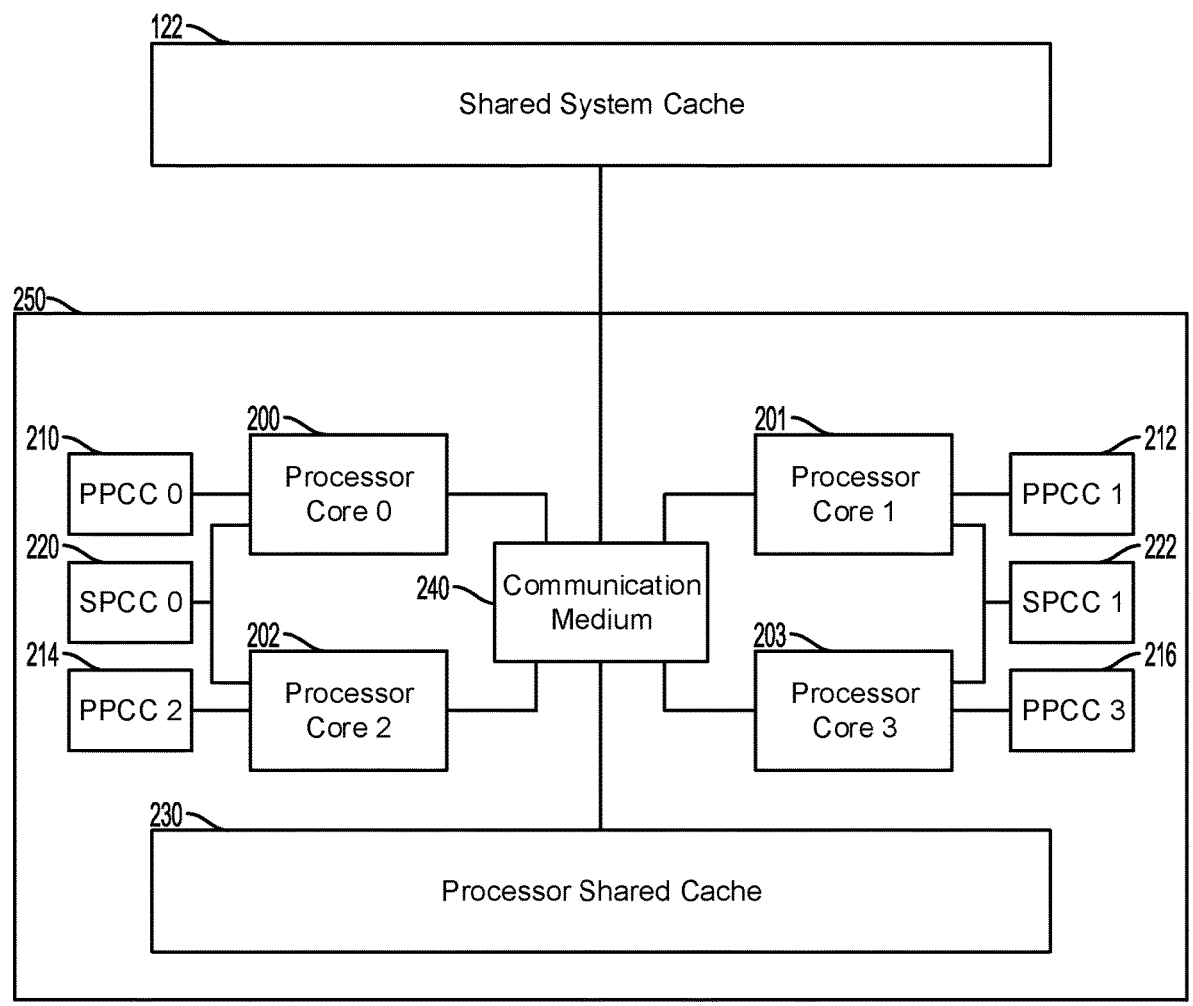
FIG. 2 is a component block diagram of a processing device 250 suitable for use with various embodiments.

FIG. 2 illustrates components of a processing device 250 suitable for implementing various embodiments. With reference to FIG. 1, in various embodiments, the processing device 250 may be similar to the processing devices 102, 104, 106, 108, 110, 112, 114, 116, 118, 120, 124, 128, 132, 134, and the clock controller configured to control the clock 130. The processing device 250 may include multiple processor types, including, for example, a CPU and various hardware accelerators, such as a GPU, a DSP, an APU, subsystem processor, etc. The processing device 250 may also include a custom hardware accelerator, which may include custom processing hardware and/or general purpose hardware configured to implement a specialized set of functions. The processing device 250 may include any number of processor cores 200, 201, 202, 203. A processing device 250 having multiple processor cores 200, 201, 202, 203 may be referred to as a multicore processing device. In various embodiments, processor cores 200, 201, 202, 203 are themselves processing devices.

The processing device 250 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processing device 250 may be configured for the same purpose and have the same or similar performance characteristics. For example, the processing device 250 may be a general purpose processor, and the processor cores 200, 201, 202, 203 may be homogeneous general purpose processor cores. The processing device 250 may be a GPU or a DSP, and the processor cores 200, 201, 202, 203 may be homogeneous graphics processor cores or digital signal processor cores, respectively. The processing device 250 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processing device 250 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 100 of FIG. 1) may include any number of homogeneous or heterogeneous processing device 250. In various embodiments, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processing device 250 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203, to which the private processor core cache 210, 212, 214, 216 is dedicated, for use in execution by the processor cores 200, 201, 202, 203.

Groups of the processor cores 200, 201, 202, 203 of a processing device 250 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated for use in execution by the processor cores 200, 201, 202, 203 in the designated group.

The processing device 250 may be designated a shared processor cache memory 230 that may be dedicated for read and/or write access by the processor cores 200, 201, 202, 203 of the processing device 250. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 14.

Multiple processing devices 250 may be designated a shared system cache memory 122 that may be dedicated for read and/or write access by the processor cores 200, 201, 202, 203 of the multiple processing devices 250. The shared system cache 122 may store data and/or instructions, and make the stored data and/or instructions available to the processor cores 200, 201, 202, 203, for use in execution by the processor cores 200, 201, 202, 203. The shared system cache 122 may also function as a buffer for data and/or instructions input to and/or output from the multiple processing device 250.

A cache memory manager (not shown) may be communicatively connected to a processing device 250 and any single or combination of cache memories 122, 210, 212, 214, 216, 220, 222, 230, and configured to control access to a cache memory 122, 210, 212, 214, 216, 220, 222, 230, and to manage and maintain the cache memory 122, 210, 212, 214, 216, 220, 222, 230. The cache memory manager may be configured to pass and/or deny memory access requests to the cache memory 122, 210, 212, 214, 216, 220, 222, 230, from the processing device 250, pass data and/or instructions to and from the cache memory 122, 210, 212, 214, 216, 220, 222, 230, and/or trigger maintenance and/or coherency operations for the cache memory 122, 210, 212, 214, 216, 220, 222, 230, including an eviction policy. In various embodiments, the cache memory manager may be a hardware component standalone from and/or integral to the processing device 250. In various embodiments, the cache memory manager may be a software component configured to cause a dedicated hardware component and/or the processing device 250 to execute operations for managing the cache memory 122, 210, 212, 214, 216, 220, 222, 230. In various embodiments, any number of cache memory managers may be associated with any number of cache memories 122, 210, 212, 214, 216, 220, 222, 230, including one-to-many, many-to-one, and one-to-one configurations. The terms "cache memory manager" and "cache memory controller" are used interchangeably throughout the descriptions.

In the example illustrated in FIG. 2, the processing device 250 includes four processor cores 200, 201, 202, 203 (i.e., processor core 0, processor core 1, processor core 2, and processor core 3). In the illustrated example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1).

For ease of explanation, descriptions of various embodiments may refer to the four processor cores 200, 201, 202, 203, the four private processor core caches 210, 212, 214,

216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various embodiments to a four-core processor system with four designated private processor core caches and two designated shared processor core caches 220, 222. The SoC 100, or the processing device 250 may individually or in combination include fewer or more than the four processor cores 200, 201, 202, 203 and private processor core caches 210, 212, 214, 216, and two shared processor core caches 220, 222 illustrated and described herein.

In various embodiments, a processor core 200, 201, 202, 203 may access data and/or instructions stored in the shared processor core cache 220, 222, the shared processor cache 230, and/or the shared system cache 122 indirectly through access to data and/or instructions loaded to a higher level cache memory from a lower level cache memory. For example, levels of the various cache memories 122, 210, 212, 214, 216, 220, 222, 230, in descending order from highest level cache memory to lowest level cache memory may be the private processor core cache 210, 212, 214, 216, the shared processor core cache 220, 222, the shared processor cache 230, and the shared system cache 122. A higher level cache memory 210, 212, 214, 216, 220, 222, 230 may be any cache memory of a higher level than a lower level cache memory 122, 220, 222, 230. In various embodiments, data and/or instructions may be loaded to a cache memory 122, 210, 212, 214, 216, 220, 222, 230, from a lower level cache memory 220, 222, 230, 122 and/or other memory (e.g., a persistent storage memory (not shown) or a shared RAM 125 in FIG. 1) as a response to a miss the cache memory 122, 210, 212, 214, 216, 220, 222, 230, for a memory access request, and/or as a response to a prefetch operation speculatively retrieving data and/or instructions for future use by the processor core 200, 201, 202, 203. In various embodiments, the cache memory 122, 210, 212, 214, 216, 220, 222, 230, may be managed using an eviction policy to replace data and/or instructions stored in the cache memory 122, 210, 212, 214, 216, 220, 222, 230, to allow for storing other data and/or instructions. Evicting data and/or instructions may include writing the evicted data and/or instructions evicted from a higher level cache memory 122, 210, 212, 214, 216, 220, 222, 230 to a lower level cache memory 122, 220, 222, 230, and/or other memory.

The processing device 250 may include a communication medium 240, which may be configured to facilitate communication between the components of the processing device 250, and between components of the SoC 100 and the components of the processing device 250. The communication medium 240 may be a physical communication bus, including electrical conduits to transmit and receive electrical signals, a wireless radio frequency communication medium, including radio frequency antennas to transmit and receive radio frequency signals through the air, and/or a light transmission communication medium, including light emitters and sensors to transmit and receive light signals through the air and/or via light transmitting conduits. The communication medium 240 may facilitate direct communication between the components of the processing devices in direct connection with each other via the communication medium 240. The communication medium 240 may facilitate indirect communication between the components of the processing device 250, and between components of the SoC 100 and the components of the processing device 250 that are connected via a common communication medium 240 connecting more than two of the components.

A communication medium controller (not shown) may be configured to control when communication between communication between the components of the processing device 250, and between components of the SoC 100 and the components of the processing device 250, occurs and to direct communications between the components so that they reach the intended destination. The communication medium controller may control the use of the bandwidth of the communication medium 240 by the components by controlling which components may transmit signals on the communication medium 240 at various times. The communication medium controller may receive the signals sent by a first component, including address of a second component as a destination for the signals, and redirect the received signal to the destination address of the second component.

For ease of reference, the terms "processing device," "hardware accelerator," "custom hardware accelerator," "multicore processor," "processor," and "processor core" may be used interchangeably herein. The descriptions of the illustrated computing device and its various components are only meant to be examples and in no way limiting on the scope of the claims. Several of the components of the illustrated example computing device may be variably configured, combined, and separated. Several of the components may be included in greater or fewer numbers, and may be located and connected differently within the SoC or separate from the SoC.

Figure 3:
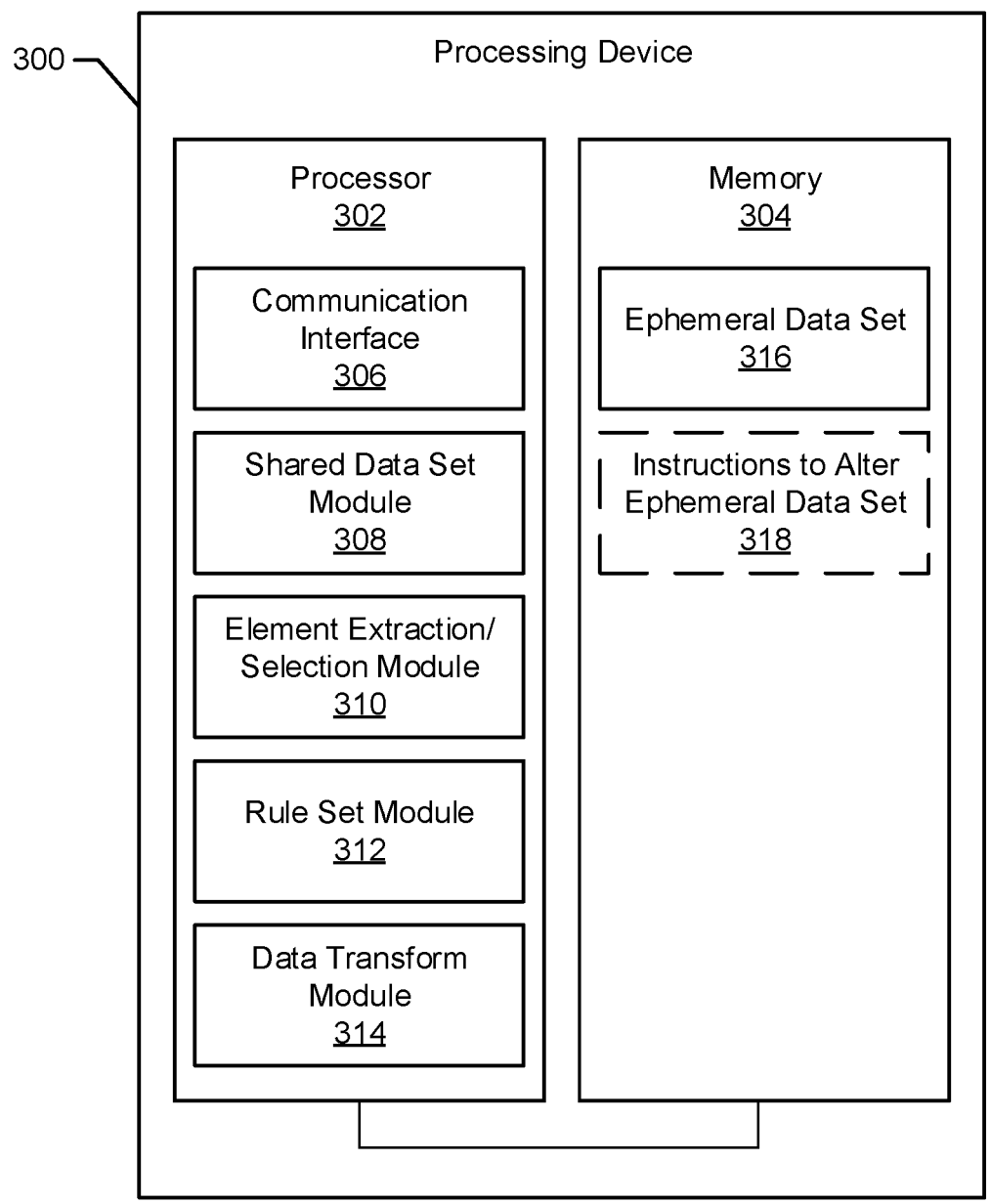
FIG. 3 is a component block diagram of a processing device 300 suitable for use with various embodiments.

FIG. 3 is a component block diagram of a processing device 300 suitable for implementing various embodiments. With reference to FIGS. 1 and 2, in various embodiments, the processing device 300 may be similar to the processing devices 102, 104, 106, 108, 110, 112, 114, 116, 118, 120, 124, 128, 132, 134, the clock controller configured to control the clock 130, 200, 201, 202, 203, 250, the memory managers configured to control caches 122, 210, 212, 214, 216, 220, 222, 230, and communication medium controller configured to control the communication medium 240.

The processing device 300 may include a processor 302 (e.g., processing device 200, 201, 202, 203, 250). The processor 302 may be configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 302 may be coupled to memory 304, which may be a non-transitory computer-readable storage medium that stores processor-executable instructions. The memory 304 may store an operating system, as well as user application software and executable instructions. The memory 304 may also store application data, such as an array data structure. The memory 304 may include one or more caches, read only memory (ROM), random access memory (RAM), electrically erasable programmable ROM (EEPROM), static RAM (SRAM), dynamic RAM (DRAM), or other types of memory. The processor 302 may read and write information to and from the memory 304. The memory 304 may also store instructions associated with one or more protocol stacks. A protocol stack generally includes computer executable instructions to enable communication using a radio access protocol or communication protocol.

The processor 302 may also communicate with and/or execute a variety of modules for units configured to perform a variety of operations, as further described below. For example, the processor 302 may communicate with a communication interface 306, a shared data set module 308, and element extraction/selection module 310, a rule set module 312, and a data transform module 314. The modules/units 306-214 may be implemented on the processing device 300 in software, in hardware, or in a combination of hardware and software, including a firmware chip, system-on-a-chip (SoC), dedicated hardware (i.e., firmware) circuit configured to perform operations of the various embodiments, or a combination of dedicated hardware/firmware and a programmable processor. The processor 302, the memory 304, and the various modules/units 306-214 may communicate over a communication bus or any other communication circuitry or interface.

The communication interface 306 may include a network interface that may enable communications with a communication network (e.g., the communication medium 136, 240). The communication interface 306 may include one or more input/output (I/O) ports through which a wired connection may be provided. The communication interface 306 may also include a radio unit that may enable radio frequency communication. The communication interface 306 may also include a light unit that may enable light frequency communication.

In various embodiments, the shared data set module 308 may receive from the memory 304 information for use as a shared data set. In various embodiments, the shared data set module 308 may receive from the communication interface 306 information for use as a shared data set (e.g., from the communication medium 136, 240). The shared data set module 308 may be configured to alter the shared data set according to instructions from the processor 302.

The element extraction/selection module 310 may be configured to extract and/or select one or more data elements from the shared data set.

The rule set module 312 may be configured to generate a rule set identifying the one or more data elements. The rule set module 312 may also be configured to parse or analyze a rule set received from another computing device so that the element extraction/selection module may use the received rule set to extract and/or select one or more data elements from the shared data set.

The data transform module 314 may be configured to perform one or more data transformations on one or more elements of the shared data set, one or more extracted elements, and/or one or more selected elements. The data transform module 314 may also be configured to perform operations to alter the shared data set.

The memory 304 may be a volatile or non-volatile memory configured to store an ephemeral data set 316. In various embodiments, the memory 304 may be a component dedicated for storage and/or management of the ephemeral data set 316. In various embodiments, the memory 304 may be a partition of a memory component, and the partition may be dedicated for storage and/or management of the ephemeral data set 316. In various embodiments, the ephemeral data set 316 may be preloaded to the memory 304 during manufacturing, testing, and/or initial setup of the processing device 300. In various embodiments, the ephemeral data set 316 may be loaded to the memory 304 by the processor 302 receiving the ephemeral data set 316 from the communication interface 306, for example to update the ephemeral data set 316, particularly to update a corrupted ephemeral data set 316. The memory 304 may be optionally configured to store instructions to alter the ephemeral data set 318. The instructions to alter the ephemeral data set 318 may be selected in response to a trigger to alter the ephemeral data set 316.

Figure 4:
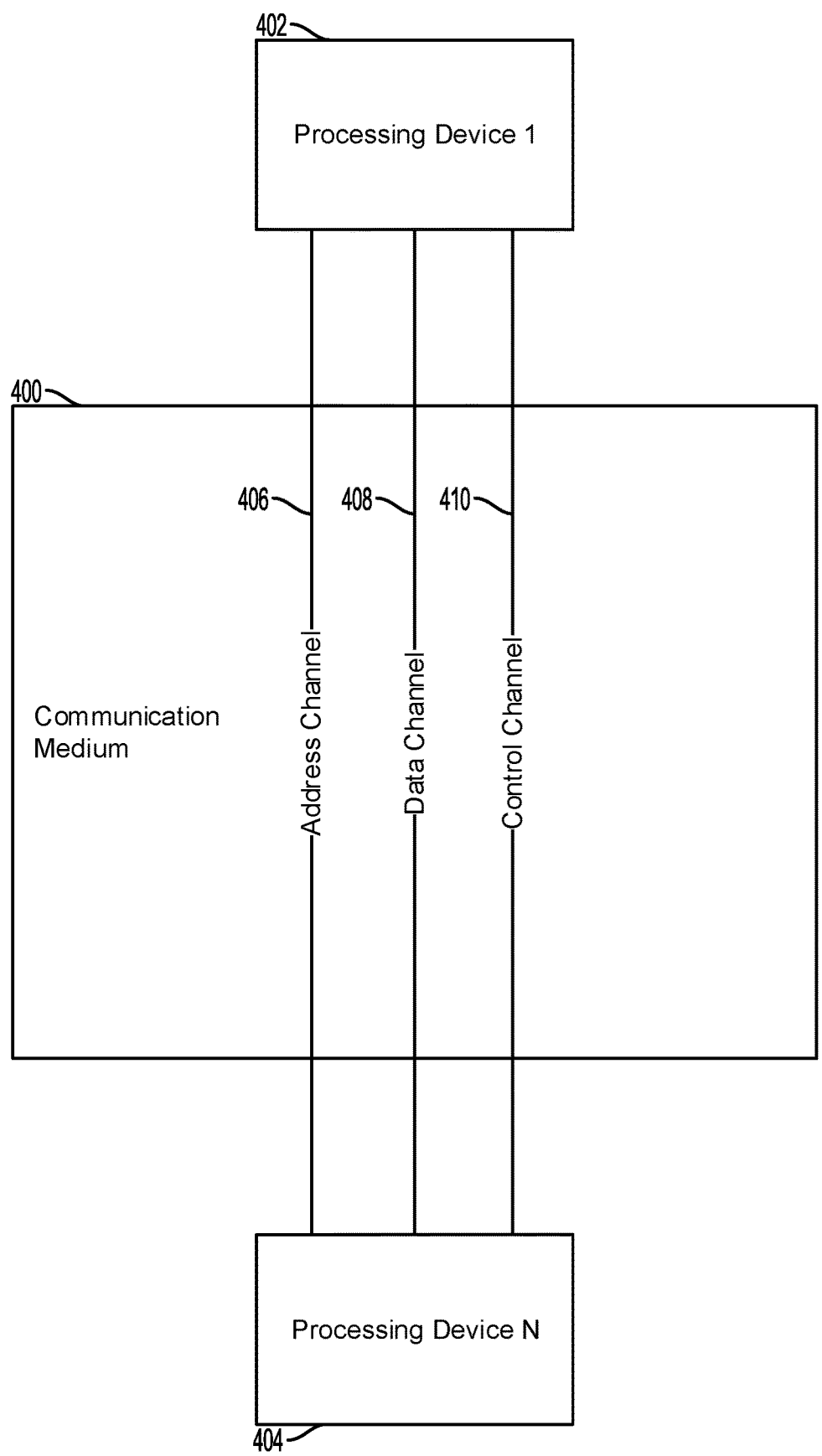
FIG. 4 component block diagram of a plurality of communicatively connected processing devices suitable for use with various embodiments.

FIG. 4 illustrates an example of a plurality of communicatively connected processing devices suitable for use with various embodiments. With reference to FIGS. 1-3, in various embodiments, the processing devices 402, 404 may be similar to the processing devices 102, 104, 106, 108, 110, 112, 114, 116, 118, 120, 124, 128, 132, 134, the clock controller configured to control the clock 130, 200, 201, 202, 203, 250, the memory managers configured to control caches 122, 210, 212, 214, 216, 220, 222, 230, the communication medium controller configured to control the communication medium 240, and 300. The communication medium 400 may be similar to the communication mediums 136 and 240.

In various embodiments, the processing devices 402 (processing device 1) and 404 (processing device N) may communicate using the communication medium 400. Communications across the communication medium 400 may include a destination addresses for the communication, data of the communication, and control signals of the communication. Each element of the communication may be transmitted via the communication medium 400 using any number of channels. The example in FIG. 4 indicates the use of a designated address channel 406 for the destination address of the communication, a data channel 408 for the data of the communication, and a control channel 410 for the control signals of the communication.

In various embodiments, the communications sent between the processing devices 402, 404 may be used to transmit communications for authenticating one of the processing devices 402, 404 to the other processing device 402, 404, such as authenticating a communication recipient processing device 402, 404 to a communication initiator processing device 402, 404. In various embodiments, the communications sent between the processing devices 402, 404 may be used to transmit communications for authenticating each of the processing devices 402, 404 to the other processing device 402, 404, regardless of which processing device 402, 404 initiates the communication. The authentication communication may include the sending of a rule set, configured to generate a result from a shared data set, generated by a processing device 402, 404 to the other processing device 402, 404, which the recipient processing device may use to generate the same result from the shared data set. The result generated by the recipient processing device 402, 404 may be used to authenticate the recipient processing device 402, 404.

Following and/or as part of the authentication of at least one of the processing devices 402, 404, the communication may be used to communication encrypted communications between the processing devices 402, 404. In various embodiments, the result generated from applying the rule set to the shared data set may be used as and/or to derive an encryption key for the communication of encrypted data between the processing devices 402, 404. For example, an encrypted communication from the initiator processing device may be transmitted following an authentication communication but before an authentication process completes. The recipient processing devices 402, 404 may be authenticated by its ability to properly decrypt the encrypted communication. For further example, encrypted communications between the processing devices may be transmitted after authentication of at least one of the processing devices 402, 404.

In various embodiments, any part of a communication other than transmission of the rule set may be encrypted, and successfully deriving the result from the shared data set using the rule set may allow decryption of the other parts of the communication. In various embodiments, an authenticated communication medium controller (e.g., communication medium controller 134) may be configured to decrypt the destination address of an encrypted communication to direct the communication through the communication medium 400 to a destination processing device 402, 404. In various embodiments, an authenticated processing device 402, 404 may be configured to decrypt data and/or a control signal to execute instructions associated with the encrypted communication.

In various embodiments, authentication of a processing device 402, 404, may persist for a designated time, number of transmissions, and/or designated communication session. In various embodiments, a processing device 402, 404, may be authenticated for each communication.

In various embodiments, the communication medium controller may be configured to authenticate multiple processing devices 402, 404, for a communication between the processing devices. The communication medium controller may authenticate the multiple processing devices 402, 404, in response to a request from a first processing device 402, 404, to communicate with the second processing device 402, 404. To authenticate both processing devices, the communication medium controller may generate the rule set and provide it to the processing devices 402, 404. The communication medium controller may receive the results of the application of the rule set to the shared ephemeral data sets by each processing device 402, 404, compare the received results, and authenticate the processing devices 402, 404 in response to a positive comparison result. Similarly, any number of the processing devices 402, 404 may authenticate other processing devices 402, 404 based on receiving a result of the application of the rule set to the shared ephemeral data set by another processing device 402, 404, comparing the result to a result the authenticating processing device 402, 404 generates, and authenticate other processing devices 402, 404 based on a positive comparison result.

Figure 5:
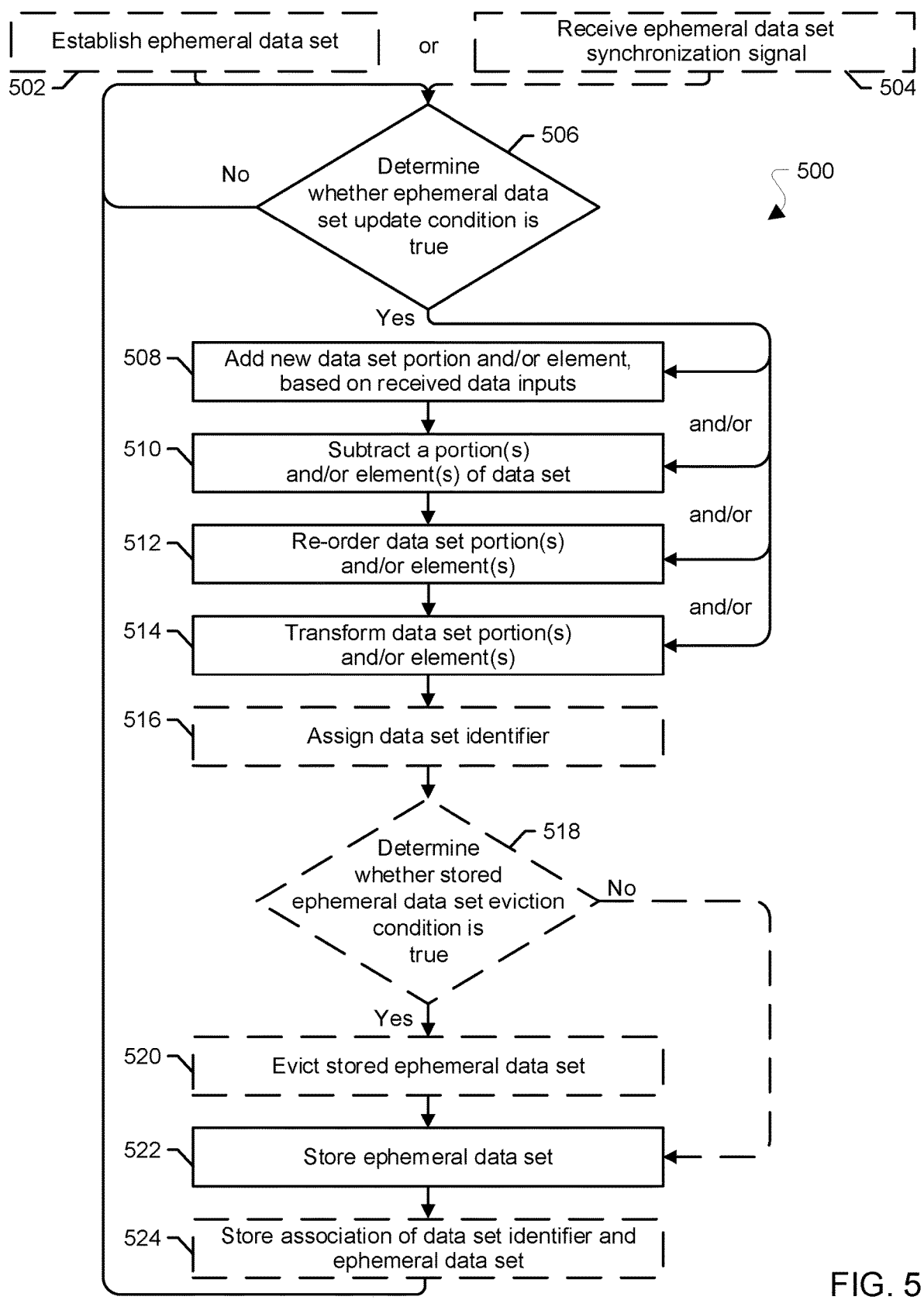
FIG. 5 is a process flow diagram illustrating a method 500 of managing and dynamically altering an ephemeral shared data set according to various embodiments.

FIG. 5 illustrates a method 500 of managing and dynamically altering an ephemeral shared data set. With reference to FIGS. 1-5, the method 500 may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

Various embodiments enhance and improve the verification of processing devices on an SoC by utilizing a dynamically changing shared information context. The information context may include, for example, a dynamically changing ephemeral shared data set. In some embodiments, two processing devices may share a data set by, for example, receiving a data set from a same computing device and/or altering the ephemeral shared data set in the same manner within a given time period. In various embodiments, the two processing devices may include any two processing devices on an SoC. The ephemeral shared data set may be compiled over time, and may be changed by a processing device occasionally, periodically, and/or upon the occurrence of a triggering event. Changing or altering the ephemeral shared data set may include reordering the ephemeral shared data set, adding information to the ephemeral shared data set, subtracting information from the ephemeral shared data set, and/or transforming one or more portions of the ephemeral shared data set. Versions of the ephemeral shared data set may be tracked using version identifiers and stored in association with a version identifier.

In optional 502, the processing device may establish an ephemeral data set. For example, the processing device may receive data inputs and may establish an ephemeral data set based on one or more of the data inputs. The data inputs may include information that the processing device may use to generate, alter, and/or manage an ephemeral data set that may be shared with another processing device. The data inputs may include, for example, may include any number and formation of bytes and/or bits, such as a string of bytes and/or bits, a byte and/or bit array, an n-dimensional byte and/or bit matrix, etc., images, photographs, video, sound recordings (e.g., music, ambient sound recordings, or another such recording), biometric information inputs (e.g., facial recognition scans, iris scans, DNA samples, a voice-print recordings, fingerprints, and the like), or any other such data input, including portions such as a selection of sequential and/or nonsequential bytes and/or bits. The ephemeral data set is further described herein.

In optional block 504, the processing device may receive an ephemeral data set synchronization signal. The synchronization signal may prompt the processing device to alter the ephemeral data set in a synchronized manner with another processing device such that the altered ephemeral data set remains shared by two or more processing devices.

In determination block 506, the processing device may determine whether an ephemeral data set update condition is true. The ephemeral data set update condition may indicate to the processing device whether to update the ephemeral data set. For example, a true, high, or "1" value of the ephemeral data set update condition may indicate to the processing device to update the ephemeral data set, whereas a false, low, or "0" value of the ephemeral data set update condition may indicate to the processing device not to update the ephemeral data set. In some embodiments, the ephemeral data set update condition may be set as part of establishing the data set in optional block 502. In some embodiments, the ephemeral data set update condition may be set as part of receiving the ephemeral data set synchronization signal in optional block 504. In some embodiments, the ephemeral data set update condition may be provided to the processing device as part of a signal, such as the ephemeral data set synchronization signal, and/or retrieved by the processing device from a memory, such as a register, a cache, and/or a RAM.

In response to determining that the ephemeral data set update condition is true (i.e., determination block 506="Yes"), the processing device may perform one or more operations to alter the data set.

In block 508, the processing device may to add a new data set portion and/or a new data element based on the received data inputs.

Additionally or alternatively, the processing device may subtract one or more portions and/or one or more elements of the data set in block 510.

Additionally or alternatively, the processing device may re-order one or more portions and/or one or more elements of the data set in block 512.

Additionally or alternatively, the processing device may perform a transform of one or more portions and/or one or more elements of the data set in block 514.

In optional block 516, the processing device may assign a data set identifier (ID), also referred to as an ephemeral data set ID, to the ephemeral data set. The ephemeral data set ID may be used to identify a version of the ephemeral data set. In some embodiment, the version of the ephemeral data set may be based on an ephemeral data set ID received as part of establishing the data set in optional block 502 or receiving the ephemeral data set synchronization signal in optional block 504. In some embodiment, the version of the ephemeral data set may be based on incrementing a previous ephemeral data set ID. In some embodiments, the version of the ephemeral data set may be based on a binary value configured to indicate to the processing device whether the ephemeral data set is a current ephemeral data set, such as by a true, high, or "1" value, and whether the ephemeral data set is a previous ephemeral data set, as by a false, low, or "0" value.

In optional determination block 518, the processing device may determine whether a stored ephemeral data set eviction condition is true. The stored ephemeral data set eviction condition may indicate to the processing device whether to evict an ephemeral data set that is stored in a memory, such as a cache, a RAM, a storage memory, etc. For example, a true, high, or "1" value of the stored ephemeral data set eviction condition may indicate to the processing device to evict the stored ephemeral data set, whereas a false, low, or "0" value of the stored ephemeral data set eviction condition may indicate to the processing device not to evict the ephemeral data set. In some embodiments, the stored ephemeral data set may be an ephemeral data set from a previous establishing the data set in optional block 502. In some embodiments, the stored ephemeral data set may be an ephemeral data set generated from a previous implementation of establishing the data set in optional block 502. In some embodiments, the stored ephemeral data set may be an ephemeral data set generated from a previous implementation of receiving an ephemeral data set synchronization signal in optional block 504. In some embodiments, the stored ephemeral data set may be an ephemeral data set to which the processing device may perform one or more operations to alter the data set, including: adding a new data set portion and/or a new data element based on the received data inputs in block 508; subtracting one or more portions and/or one or more elements of the data set in block 510; re-ordering one or more portions and/or one or more elements of the data set in block 512; and/or performing a transform of one or more portions and/or one or more elements of the data set in block 514. In some embodiments, the stored ephemeral data set may be stored in association with a respective ephemeral data set ID.

In response to determining that a stored ephemeral data set eviction condition is true (i.e., optional; determination block 518="Yes"), the processing device may evict the stored ephemeral data set from the memory in optional block 520. The processing device may evict the stored ephemeral data set by, for example, invalidating, overwriting, and/or erasing the stored ephemeral data set. In some embodiments, the processing device may flush the stored ephemeral data set and/or the associated ephemeral data set ID to a memory, such as a RAM and/or a storage memory.

Following performing one or more operations to alter the data set in one or more of blocks 508-514, evict the stored ephemeral data set from the memory in optional block 520; assigning an ephemeral data set ID to the ephemeral data set in optional block 516; evicting the stored ephemeral data set from the memory in optional block 520; determining that a stored ephemeral data set eviction condition is true (i.e., optional; determination block 518="Yes"); or determining that a stored ephemeral data set eviction condition is not true (i.e., optional; determination block 518="No"); the processing device may store the ephemeral data set in block 522. The processing device may store the ephemeral data set in a memory, such as a cache, a RAM, a storage memory, etc. In some embodiments, the processing device may store the ephemeral data set to a same location in the memory as the evicted ephemeral data set.

In optional block 524, the processing device may store the ephemeral data set ID in association with the ephemeral data set.

Following storing the ephemeral data set in block 522; storing the ephemeral data set ID in association with the ephemeral data set in optional block 524; or in response to determining that the ephemeral data set update condition is not true (i.e., determination block 506="No"); the processing device may continue to determining whether an ephemeral data set update condition is true in determination block 506.

Transforming an element and/or a portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral data set may include transcoding data elements (e.g., transforming audio data into visual data or text). As another example, transforming an element and/or a portion of the ephemeral data set may include performing one or more mathematical functions to transform the element and/or portion. As another example, transforming an element and/or a portion of the ephemeral data set may include performing one or more bitwise functions (e.g., logical operations, shift operations, arithmetic operations, etc.).

Figure 6:
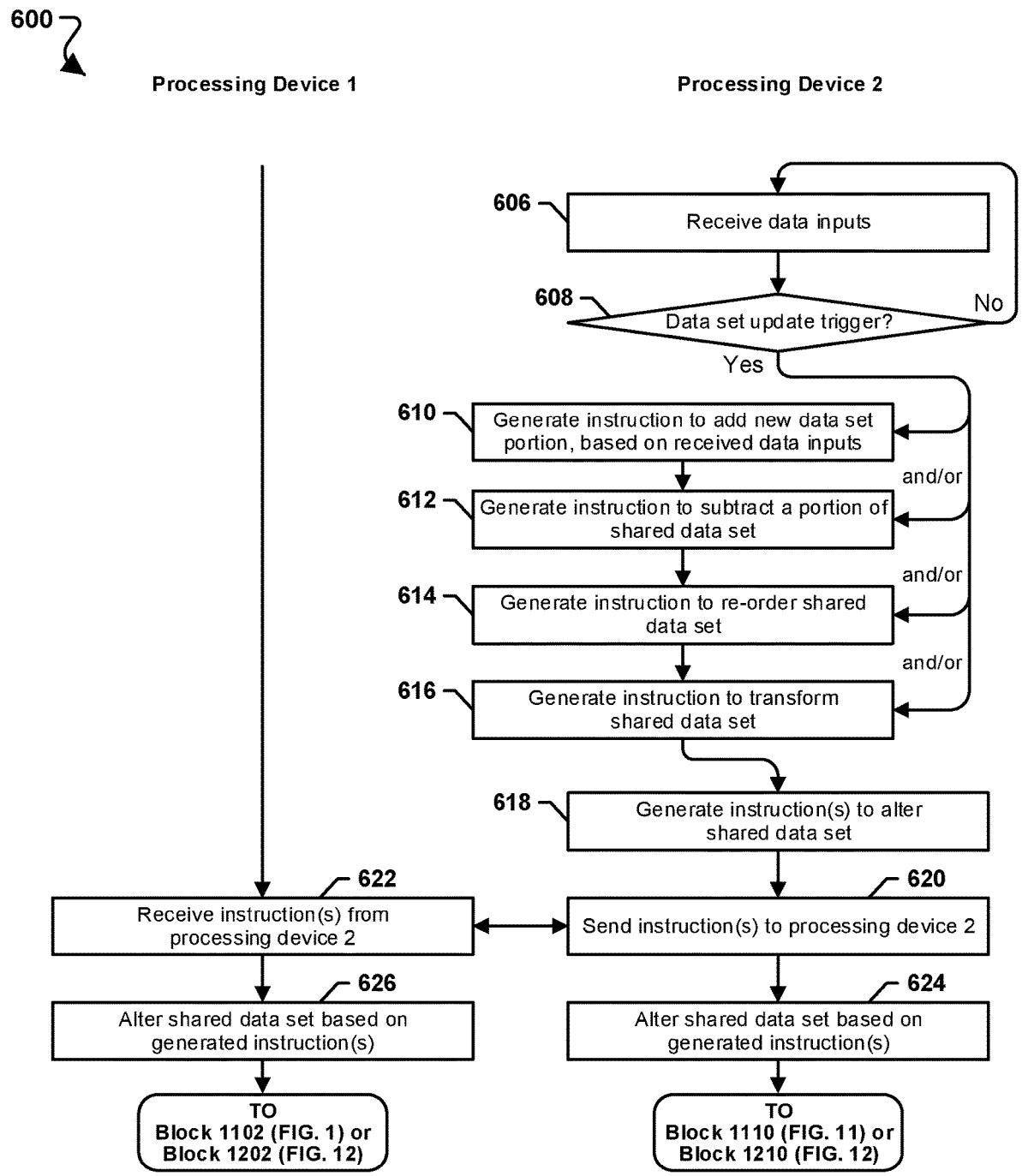
FIG. 6 illustrates a method 600 of dynamically altering an ephemeral shared data set according to various embodiments.

FIG. 6 illustrates a method 600 of dynamically altering an ephemeral shared data set according to some embodiments. With reference to FIGS. 1-6, the method 600 may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

Various embodiments enhance and improve the verification of processing devices on a communication network by utilizing a dynamically changing shared information context. The information context may include, for example, a dynamically changing ephemeral shared data set. In some embodiments, two processing devices may share a data set by, for example, transmitting a data set from one processing device to another processing device. In various embodiments, the two processing devices may include any two processing devices on an SoC. The ephemeral shared data set may be compiled over time, and may be changed by a processing device occasionally, periodically, and/or upon the occurrence of a triggering event. Changing or altering the ephemeral shared data set may include reordering the ephemeral shared data set, adding information to the ephemeral shared data set, subtracting information from the ephemeral shared data set, and/or transforming one or more portions of the ephemeral shared data set.

In block 606, the second processing device (PD2) may receive data inputs. For example, PD2 may receive data inputs over time. The data inputs may include information that the processing device of the computing device may use to generate a data set that may be shared with another processing device. The data inputs may include, for example, any number and formation of bytes and/or bits, such as a stream of bytes and/or bits, a string of bytes and/or bits, a byte and/or bit array, an linked list of bytes and/or bits, an n-dimensional byte and/or bit matrix, etc., images, photographs, video, sound recordings (e.g., music, ambient sound recordings, or another such recording), biometric information inputs (e.g., facial recognition scans, iris scans, DNA samples, a voiceprint recordings, fingerprints, and the like), or any other data input.

In determination block 608, PD2 may determine whether an ephemeral shared data set update trigger has occurred. For example, the processing device may determine whether a period of time has elapsed. As another example, the processing device may determine whether a trigger event has occurred. The trigger event may include, for example, using an ephemeral shared data set in an authentication process, such as extracting element(s) from an ephemeral shared data set, determining a value from the element(s), etc., as further described below. The trigger event may include, for example, a request from one or more processing devices to update the ephemeral shared data set. The trigger event may include, for example, an authorization failure, or an authorization success, of a processing device.

In response to determining that the data set update trigger has not occurred (i.e., determination block 608="No"), PD2 may continue to receive data inputs in block 606.

In response to determining that the data set update trigger has occurred (i.e., determination block 608="Yes"), PD2 may perform one or more operations to dynamically alter the ephemeral shared data set.

For example, in block 610, PD2 may generate an instruction to add a new data set portion based on the received data inputs. In some embodiments, PD2 may generate the new data set portion to be added. In some embodiments, the generated instructions may include instructions enabling the generation of the new data set portion (which may, e.g. be sent to another processing device, as described below).

Additionally or alternatively, PD2 may generate an instruction to subtract a portion of the ephemeral shared data set in block 612.

Additionally or alternatively, PD2 may generate an instruction to re-order the ephemeral shared data set in block 614. For example, reordering the ephemeral shared data set may include placing one or more portions of the ephemeral shared data set into a different time, location, position, or other difference relative to other portions of the ephemeral shared data set.

Additionally or alternatively, PD2 may generate an instruction to transform the ephemeral shared data set in block 616. For example, PD2 may generate an instruction to transform one or more elements and/or one or more portions of the ephemeral shared data set.

Transforming an element and/or a portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral shared data set may include transcoding data elements (e.g., transforming audio data into visual data or text). As another example, transforming an element and/or a portion of the ephemeral shared data set may include performing one or more mathematical functions to transform the element and/or portion. As another example, transforming an element and/or a portion of the ephemeral shared data set may include performing one or more bitwise functions (e.g., logical operations, shift operations, arithmetic operations, etc.).

In block 618, PD2 may generate one or more instructions to alter the ephemeral shared data set. The one or more instructions may be based on the generated new data set portion, the instruction to subtract a portion of the ephemeral shared data set, and/or the instruction to re-order the ephemeral shared data set.

In block 620, PD2 may send the one or more instructions to the first processing device (PD1). In some embodiments, the generated instructions may include a newly generated data set portion (e.g., as may be generated in block 610).

In block 622, PD1 may receive the one or more instructions from PD2.

In block 624, PD2 may alter the ephemeral shared data set based on the generated instruction or instructions.

In block 626, PD1 may alter the ephemeral shared data set based on the generated instruction or instructions.

Figure 11:
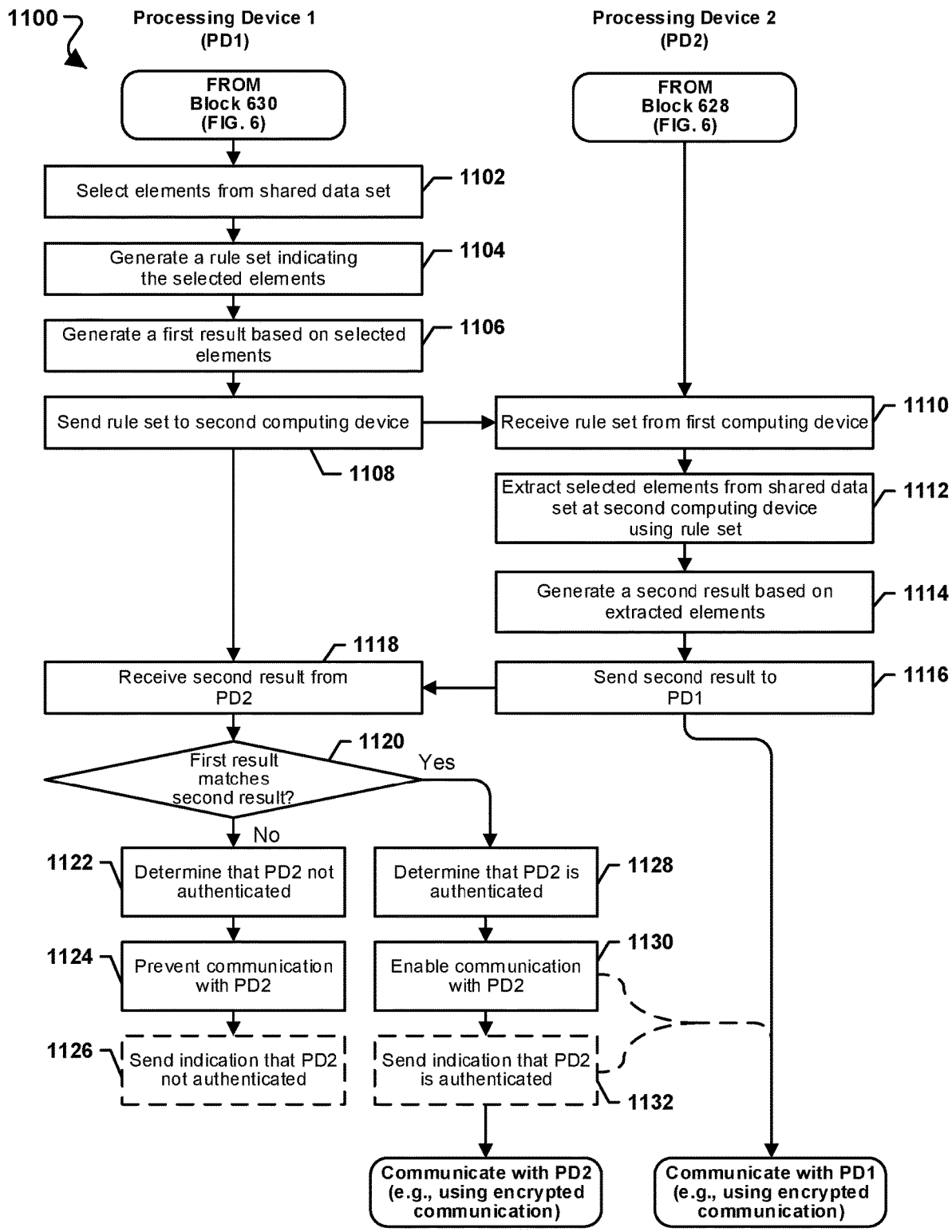
FIG. 11 illustrates a method 1100 of authenticating a second processing device by a first processing device according to various embodiments.
Figure 12:
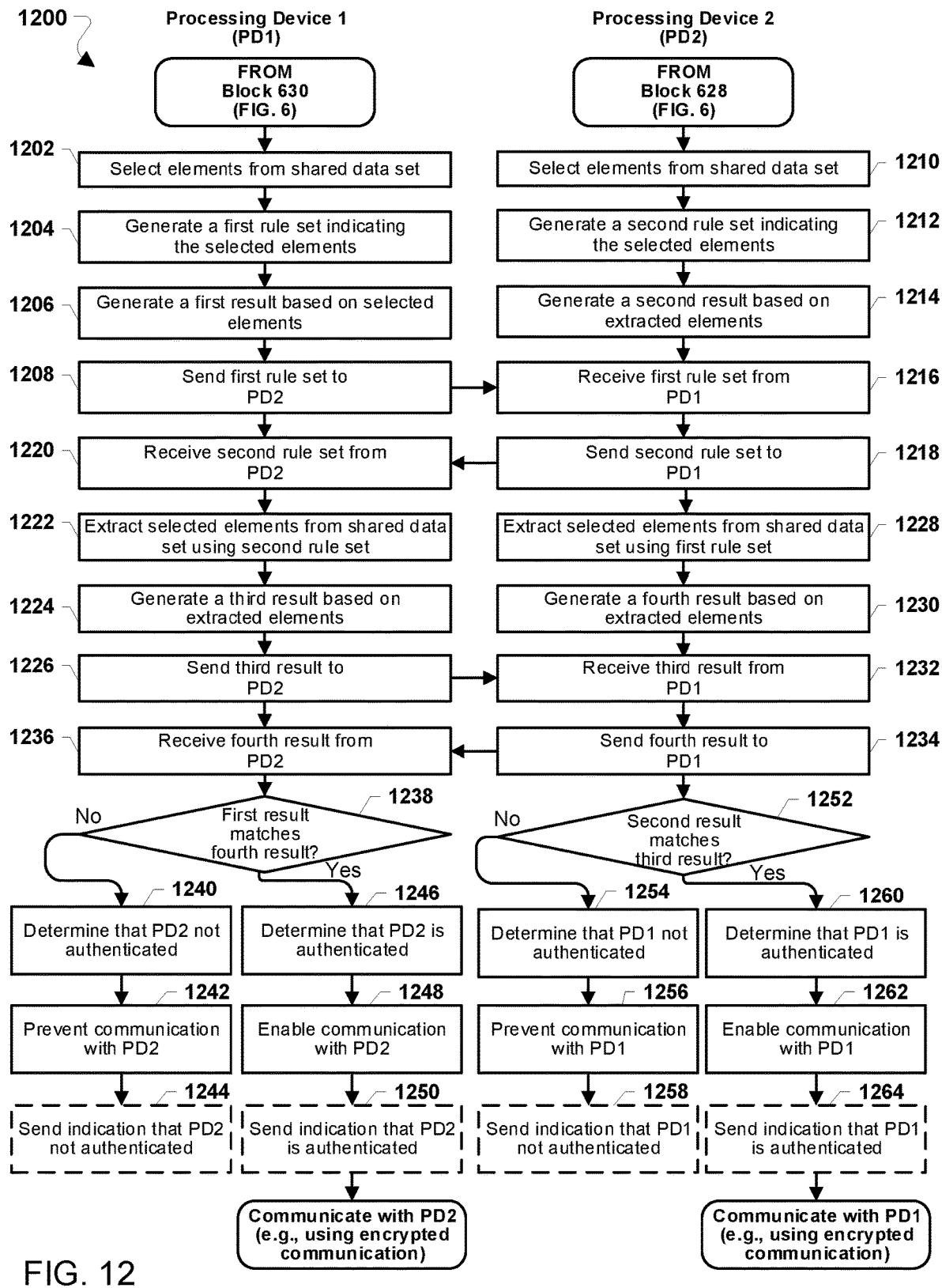
FIG. 12 illustrates a method 1200 of bi-directionally authenticating a first processing device and a second processing device according to various embodiments.

In some embodiments, PD2 may proceed to perform the operations of block 1110 (FIG. 11) or block 1210 (FIG. 12).

In some embodiments, PD1 may proceed to perform the operations of block 1102 (FIG. 11) or block 1202 (FIG. 12).

Figure 7:
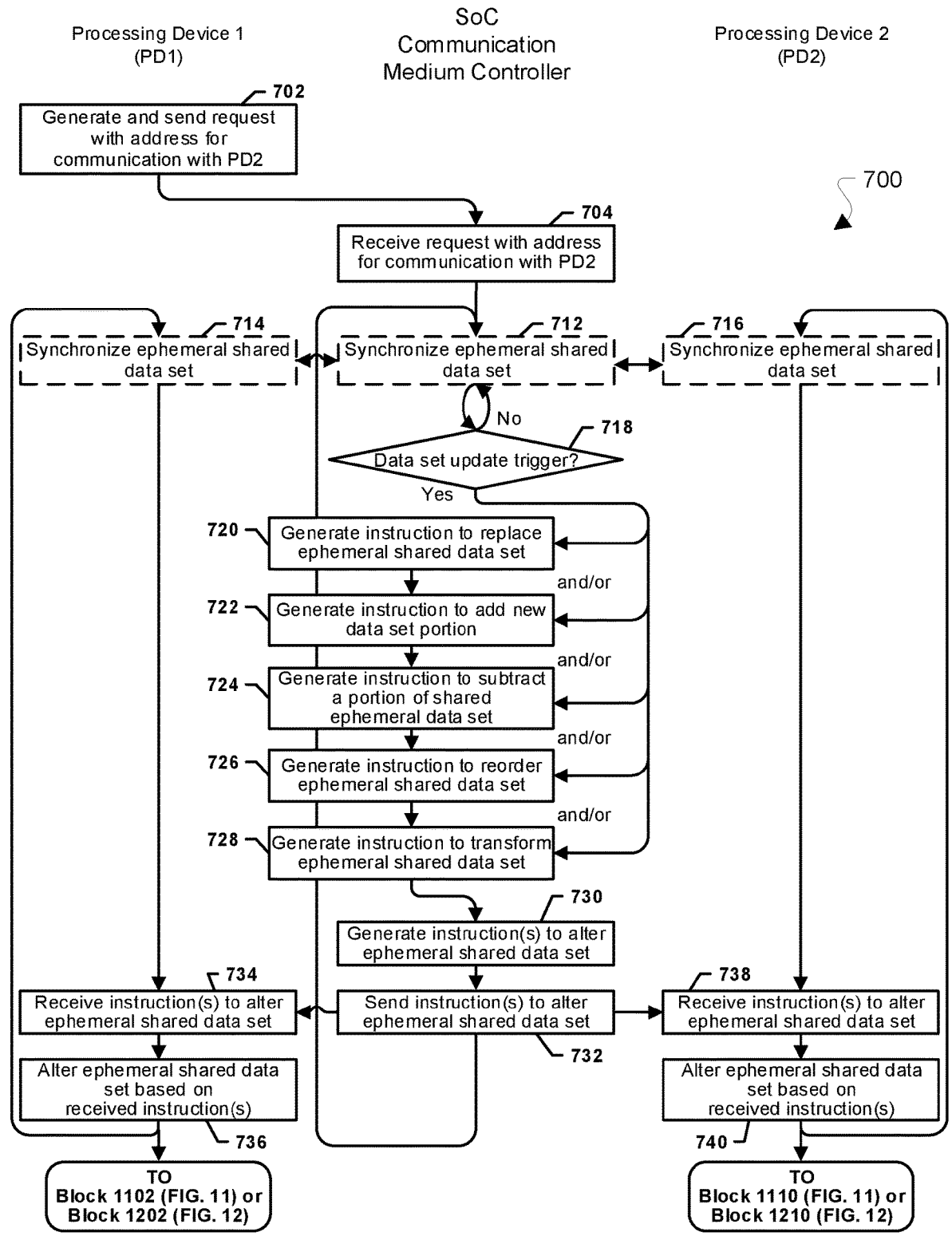
FIG. 7 illustrates a method 700 of managing synchronization of an ephemeral shared data set according to various embodiments.

FIG. 7 illustrates a method 700 of managing synchronization of an ephemeral shared data set according to various embodiments. With reference to FIGS. 1-7, the method 700 may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

In various embodiments, the dynamic (e.g., ephemeral) shared data set may exist in one state for a relatively short period of time, which may be, for example, minutes, or seconds. The relatively short duration and the inherent complexity of any state of the dynamic shared data set reduces by orders of magnitude the possibility of such information being guessed, accessed, or "hacked" and then used as a means of attacking the system.

In block 702, a first processing device (PD1) may generate and send a request with an address for communication with a second processing device (PD2).

In block 704, a communication medium controller may receive the request with the address for communication with PD2.

In optional block 712, the communication medium controller may perform one or more operations to synchronize the ephemeral shared data set. In optional block 714, PD1 may perform one or more operations to synchronize the ephemeral shared data set. In optional block 716, PD2 may perform one or more operations to synchronize the ephemeral shared data set. In various embodiments, the synchronization operations of blocks 712, 714, and 716 may be initiated by the communication medium controller, PD1, or PD2. The synchronization operations of block 712, 714, and 716 may include the transmission and/or exchange of one or more messages indicating the status and/or state, such as a version identifier, of the ephemeral shared data set stored at each of the communication medium controller, PD1, and PD2. The synchronization operations of block 712, 714, and 716 may include performing by the communication medium controller, PD1, and PD2, one or more analyses of their respective stored ephemeral shared data sets, such as a determining a checksum, performing a hash, and the like.

In determination block 718, the communication medium controller may determine whether a data set update trigger has occurred. For example, the communication medium controller may determine whether a period of time has elapsed. As another example, the communication medium controller may determine whether a trigger event has occurred. The trigger event may include, for example, using an ephemeral shared data set in an authentication process, such as extracting element(s) from ephemeral shared data set, determining a value from the element(s), etc., as further described below. In some embodiments, the trigger event may include, for example, using an ephemeral shared data set in an encryption process, as further described below. The trigger event may include, for example, a request from one or more processing devices to update the ephemeral shared data set.

In response to determining that the data set update trigger has not occurred (i.e., determination block 718="No"), the communication medium controller may again perform operations to synchronize the ephemeral shared data set in optional block 712. The PD1 and PD2 may also perform operations to synchronize the ephemeral shared data set in optional block 714 and 716, respectively.

In response to determining that the data set update trigger has occurred (i.e., determination block 718="Yes"), the communication medium controller may perform one or more operations to dynamically alter the ephemeral shared data set.

For example, the communication medium controller may generate an instruction to replace the ephemeral shared data set in block 720. In some embodiments, the communication medium controller may determine the replacement (new) data set. In some embodiments, the replacement data set may include one or more portions of the data set managed by the communication medium controller.

Additionally or alternatively, the communication medium controller may generate an instruction to add a new data set portion in block 722. In some embodiments, the new data set portion may be based on received data inputs (e.g., the data inputs 130). In some embodiments, the communication medium controller may generate the new data set portion to be added. In some embodiments, the generated instructions may include instructions enabling the generation of the new data set portion (which may, e.g. be sent to PD1 and PD2, as described below).

Additionally or alternatively, the communication medium controller may generate an instruction to subtract a portion of the ephemeral shared data set in block 724.

Additionally or alternatively, the communication medium controller may generate an instruction to reorder the ephemeral shared data set in block 726. For example, reordering the ephemeral shared data set may include placing one or more portions of the ephemeral shared data set into a different time, location, position, or other difference relative to other portions of the ephemeral shared data set.

Additionally or alternatively, the communication medium controller may generate an instruction to transform the ephemeral shared data set in block 728. For example, the communication medium controller may generate an instruction to transform one or more elements and/or one or more portions of the ephemeral shared data set. In various embodiments, transforming a portion and/or an element of the ephemeral shared data set portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral shared data set may include transcoding data elements (e.g., transforming audio data into visual data or text). As another example, transforming an element and/or a portion of the ephemeral shared data set may include performing one or more mathematical functions to transform the element and/or portion. As another example, transforming an element and/or a portion of the ephemeral data set may include performing one or more bitwise functions (e.g., logical operations, shift operations, arithmetic operations, etc.).

In block 730, the communication medium controller may generate one or more instructions to alter the ephemeral shared data set. The one or more instructions may be based on the instruction to replace the ephemeral shared data set, the instruction to add a new data set portion (and/or the generated new data set portion), the instruction to subtract a portion of the ephemeral shared data set, the instruction to re-order the ephemeral shared data set, and/or the instruction to transform the ephemeral shared data set.

In block 732, the communication medium controller may send the one or more instructions to alter the ephemeral shared data set to PD1 and PD2.

In block 734, PD1 may receive the one or more instructions to alter the ephemeral shared data set.

In block 736, PD1 may alter its stored copy of the ephemeral shared data set based on the received one or more instructions.

In block 738, PD2 may receive the one or more instructions to alter the ephemeral shared data set.

In block 740, PD2 may alter its stored copy of the ephemeral shared data set based on the received one or more instructions.

The communication medium controller, PD1, and PD2 may then perform operations to synchronize the ephemeral shared data set, in optional block 712, 714, and 716, respectively.

In some embodiments, a processing device (e.g., PD1, PD2) may determine that its ephemeral shared data set is out of synchronization, and the processing device may perform operations to synchronize the ephemeral shared data set stored at the processing device. For example, the processing device may be in a low power, retention, and/or powered off mode. In some embodiments, the communication medium controller may store one or more previous instructions to alter the ephemeral shared data set. In some embodiments, synchronization operations performed by a processing device may include determining that the processing device has not performed one or more instructions to alter its ephemeral shared data set. For example, the processing device may exchange one or more synchronization messages with the communication medium controller when the processing device returns to an operational mode, and based on information in the one or more synchronization messages the processing device may determine that its stored version of the ephemeral shared data set is out of synchronization. In some embodiments, the processing device may request that the communication medium controller send to the processing device the unperformed instructions to alter the ephemeral shared data set. The processing device may then perform the received and as-yet unperformed instructions to alter its version of the ephemeral shared data set, to bring the ephemeral shared data set stored at the processing device into synchronization.

Figure 8:
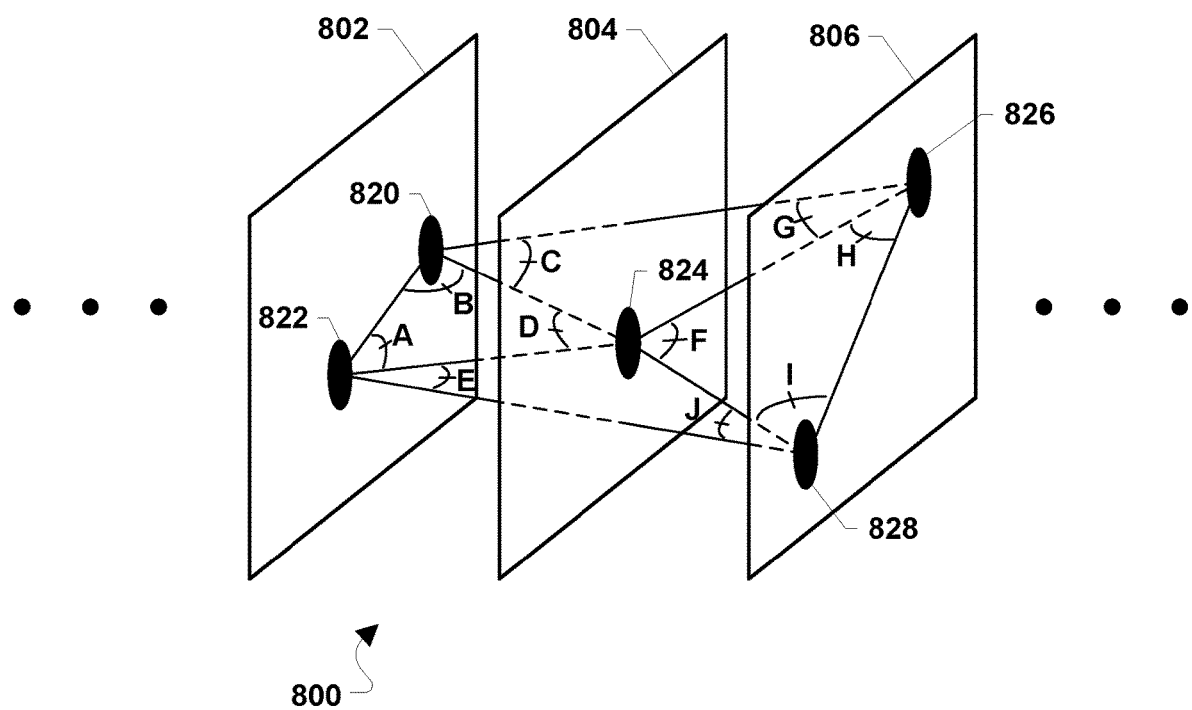
FIG. 8 illustrates relationships among elements of portions of a data set 800 according to various embodiments.

FIG. 8 illustrates one example of a data set 800, according to some embodiments. With reference to FIGS. 1-8, in some embodiments, the data set may include two or more portions. Each portion of the data set may include one or more elements. In some embodiments, the portions of the data set may include a discrete constituent, such as an image, a photograph, video, sound recording, a biometric input, or another such discrete constituent. In various embodiments, the data set, or one or more portions and/or elements of the data set, may be used to generate an ephemeral shared data set that may be stored at two or more processing devices (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

The data set 800 may include one or more portions, such as portions 802, 804, and 806. Each of the portions 802, 804, and 806 may include one or more elements. For example, portion 802 may include elements 820 and 822, portion 804 may include element 824, and portion 806 may include elements 826 and 828. In some embodiments, the portions 802, 804, and 806 may include discrete constituents, such as photographs, sound recordings, fingerprints, biometric data, or other discrete portions.

In some embodiments, the data set 800 may be built up over time. For example, a processing device may receive data inputs and may build up a data set 800 over time using the received data inputs.

In various embodiments, the elements 820-828 may include information that enables the identification or indexing of each element within a portion. For example, an element may include information identifying a location, position, and/or time of the element within its portion, or any other information that allows the indexing or identification of each selected element.

In various embodiments, the portions 802-806 and/or the elements 820-828 may include data from which one or more relationships to at least one other data element may be determined. For example, the 802-806 and/or the elements 820-828 may be associated with a timestamp. As another example, portions and/or elements may be associated with a variety of data, such as a location, a position, a color, a pitch, a frequency, a biometric aspect, or another aspect of the portion and/or element. The relationship between the two or more elements may include a comparative difference between the two or more elements, such as a time difference, a location difference, a positional difference, a color difference, a pitch difference, a frequency difference, a biometric difference, or another difference.

As another example, the elements 820-828 may have different positions or locations within a portion, or between different portions. The elements 820-828 may also be associated with a different time, as well as with different positions or locations, relative to two or more other elements. In some embodiments, three or more elements may define a relationship of one element to two or more other elements. For example, the position/location differences among elements 820, 822, and 824 may define three angles, angle A, angle B, and angle D. Similarly, the relative position/location and/or time differences among elements 820, 822, 824, 826, and 828 may define additional angles, angles C, E, F, G, H, I, and J. In various embodiments, a relationship may be a relative difference in time, space, distance, or another informational difference, within a portion, among or between portions, and/or within the data set 800.

A data set such as the data set 800 may be made up of a wide variety of portions and/or elements. FIGS. 9A-9D illustrate exemplary data sets 900a, 900b, 900c, and 900d. A data set may include one or more of a variety of types of data, and the examples illustrated in FIGS. 9 and 9A-9D are intended to illustrate the variety of data types and not as limitations.

For example, the data set 900a may include fingerprints 902a, 904a, and 905a. The fingerprints 902a-905a may be captured, for example, by a biometric scanning device such as a fingerprint scanner. The fingerprints 902a-906a may be captured over time, such that the fingerprints 902a-906a each constitute a portion of the data set 900a. A processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240) may select elements from the portions (e.g., the fingerprints 902a-906a) of the data set 900a, such as elements 920a-938a. In some embodiments, the elements 920a-938a may include fingerprint minutiae. The elements 920a-938a may include information that enables a processing device to identify or index each element within a portion (e.g., within one of the fingerprints 902a-906a), such as information identifying a location or position of the element within its portion. Further, each portion may be associated with a timestamp or another time element.

The portions (e.g., the fingerprints 902a-906a) and/or the elements 920a-938a may include data from which one or more relationships to at least one other data element may be determined, such as position, location, and/or time information. In some embodiments, the portions and/or elements may include data from which one or more relationships among the elements may be determined. In some embodiments, the relationships may be based on one or more comparative differences between or among the elements.

As another example, the data set 900b may include sound recordings 902b, 904b, and 906b. The sound recordings may be captured, for example, by a microphone or similar device, or the sound recordings may be received electronically by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240) from such a device. The sound recordings 902b-906b may be captured over time, and may include or be associated with time information. Each of the sound recordings 902b-906b may constitute a portion of the data set 900b. Additionally, or alternatively, a single recording (e.g., one of 902b, 904b, or 906b) may be divided into portions, for example, portions of a certain time duration, portions divided by frequency range, portions divided by amplitude ranges, and other divisions.

A processing device may select elements from the portions of the sound recordings 902b-906b, such as elements 920b-930b. The elements 920b-930b may include information that enables the identification or indexing of each element within a sound recording, such as information identifying a location or position of the element within its portion. Each element 920b-930b may be associated with timestamp or another time element and/or other information, such as frequency, a pitch, and amplitude, a rate of attack, a rate of decay, a duration of sustain.

The portions (e.g., the one or more sound recordings 902b) and/or the elements 920b-930b may include data from which one or more relationships to at least one other data element may be determined, such as position, location, and/or time information. In some embodiments, the portions and/or elements may include data from which the processing device may determine one or more relationships among the elements. In some embodiments, the relationships may be based on one or more comparative differences between or among the elements.

Figure 9A:
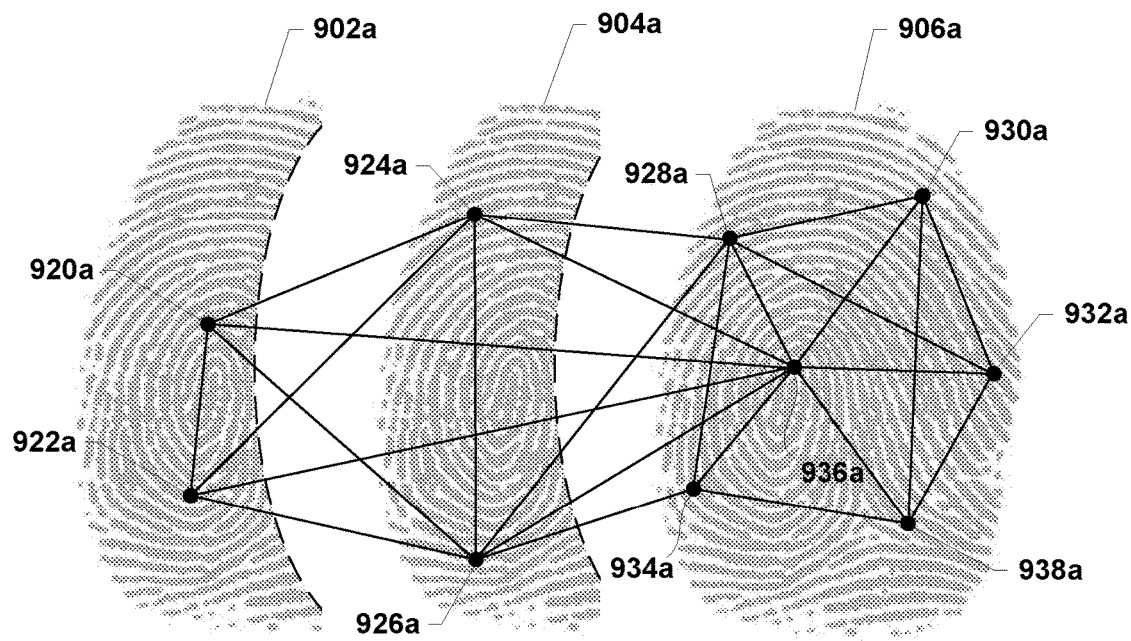
FIGS. 9A-9D illustrate relationships among elements of portions of ephemeral shared data sets 900a-900d according to various embodiments.
Figure 9B:
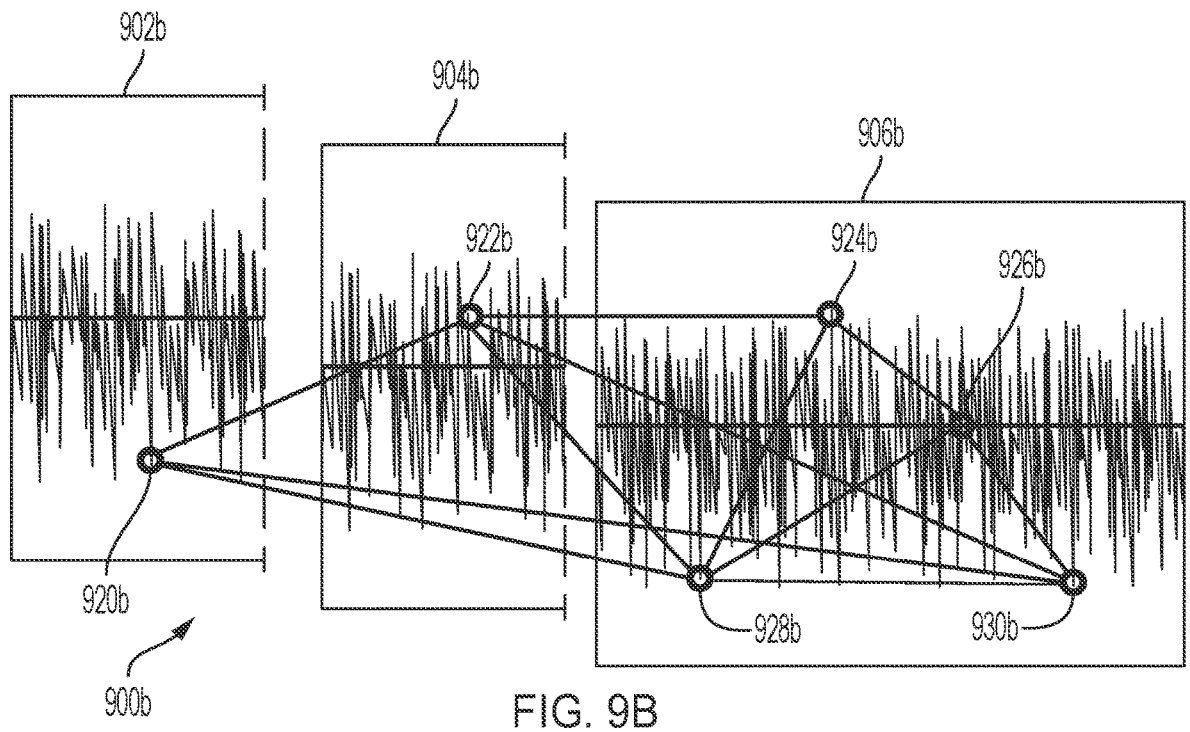
Figure 9C:
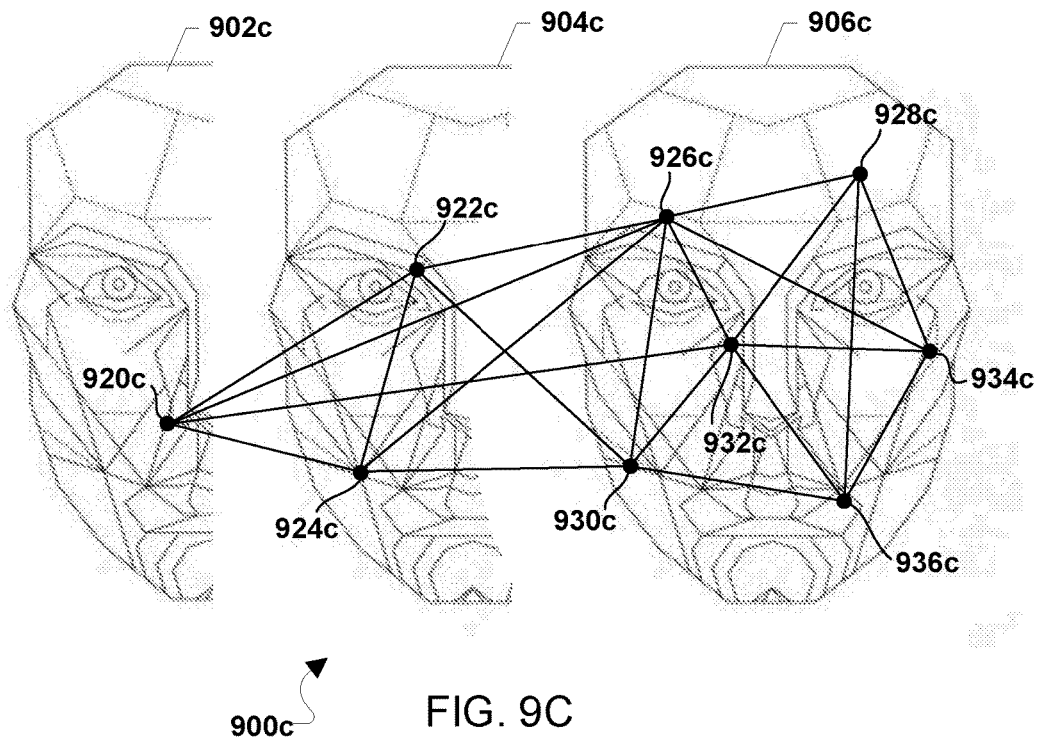
Figure 9D:
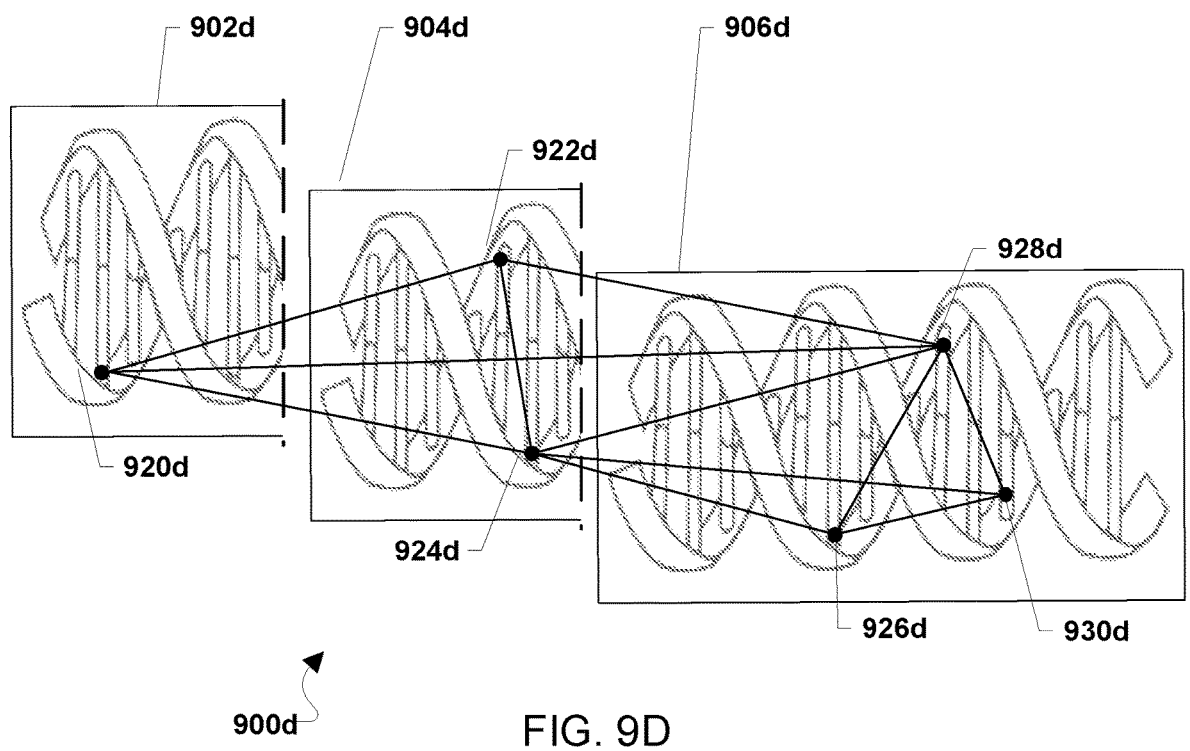

As another example, the data set 900c may include images 902c, 904c, and 906c. The images 902c-906c may be of, for example, a face as illustrated in FIG. 9C, but in various embodiments the images 902a-906c may be any images. The images 902a-906c may be captured, for example, by a camera or another image receiving device. The images 902a-906c may be captured over time, such that the images 902a-906c each constitute a portion of the data set 900a. A processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240) may select elements from the portions (e.g., the images 902a-906c) of the data set 900c, such as elements 920c-936c. For example, the processing device may select the elements 920c-936c using a facial recognition or other similar system. The elements 920c-936c may include information that enables a processing device to identify or index each element within a portion (e.g., within one of the images 902a-906c), such as information identifying a location or position of the element within its portion. Further, each portion may be associated with a timestamp or another time element.

The portions (e.g., the images 902a-906c) and/or the elements 920c-936c may include data from which one or more relationships to at least one other data element may be determined, such as position, location, and/or time information. In some embodiments, the elements 920c-936c may be associated with image information, such as color, tint, hue, grayscale, RGB information, Pantone color number, digital color code (e.g., hypertext markup language color code), saturation, brightness, contrast, or other image information. In some embodiments, the portions and/or elements may include data from which one or more relationships among the elements may be determined. In some embodiments, the relationships may be based on one or more comparative differences between or among the elements. In some embodiments, the comparative differences may include differences in image information, including relative, linear, and/or numerical differences in information indicating color, tint, hue, etc.

As another example, the data set 900d may include one or more biometric data units or constituents, such as DNA samples 902d, 904d, and 906d. Biometric data may be captured by an appropriate scanner or capture device and received by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). The biometric data may be captured over time, and may include or be associated with time information. The data set 900d may include two or more biometric data constituents or units, each of which may constitute a portion of the data set (e.g., two or more discrete biometric samples). Additionally or alternatively, a biometric sample may be divided into portions, which divisions may be determined based on the information available in the biometric sample. For example, the DNA samples 902d, 904d, and 906d may be divided into portions of a certain base-pair length or number, a certain length of the DNA backbone, by type of nucleotide (e.g., adenine, guanine, cytosine, or thymine), by type of base pair (e.g., adenine-thymine, cytosine-guanine), or another division.

A processing device may select elements from the portions of the biometric data unit 900d, such as elements 920d-930d. The elements 920d-930d may include information that enables the identification or indexing of each element within a biometric data, such as information identifying a location or position of the element within its portion, such as a position along the DNA strand 902d. Each element 920d-930d may be associated with timestamp or another time element.

The portions (e.g., the one or more biometric data units 902d) and/or the elements 920d-930d may include data from which one or more relationships to at least one other data element may be determined, such as position, location, and/or time information. In some embodiments, the portions and/or elements may include data from which the processing device may determine one or more relationships among the elements. In some embodiments, the relationships may be based on one or more comparative differences between or among the elements.

Figure 10A:
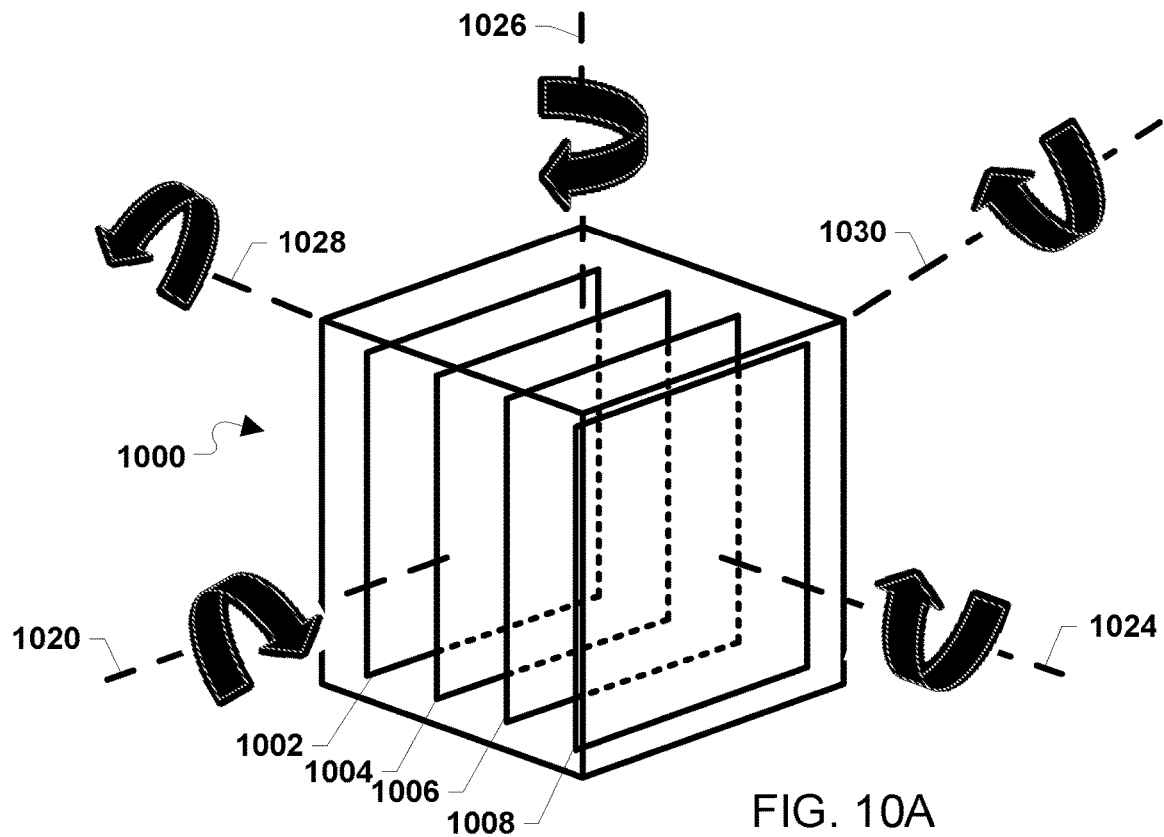
FIGS. 10A-10C illustrate representations of methods of managing an ephemeral shared data set according to various embodiments.
Figure 10B:
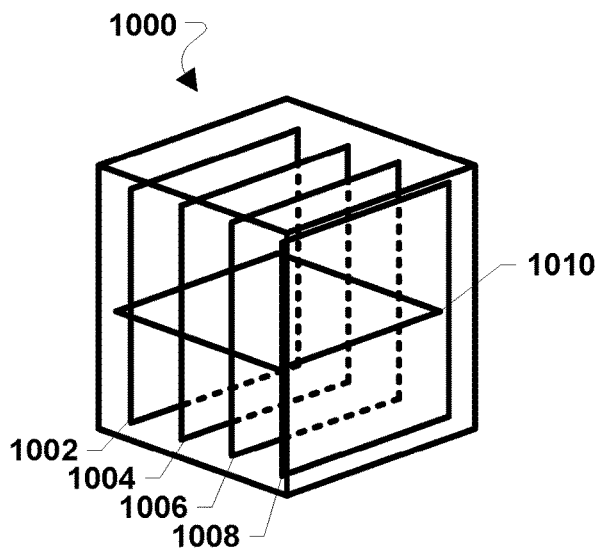
Figure 10C:
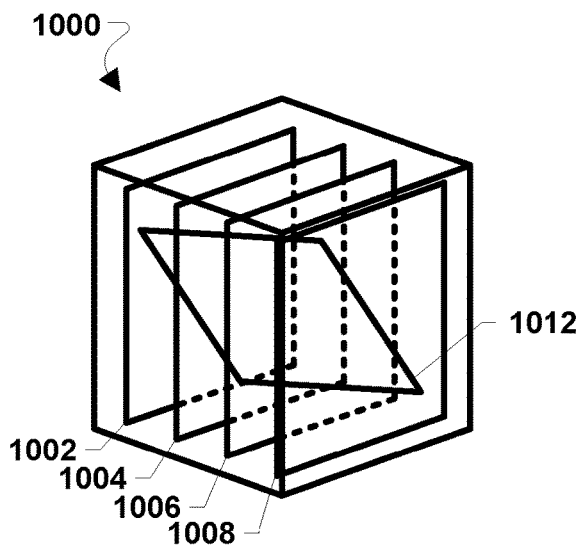

FIGS. 10A-10C illustrate representations of methods of managing a data set according to various embodiments. With reference to FIGS. 1-10C, a data set 1000 may include two or more portions 1002, 1006, 1006, and 1008. The portions 1002-1008 may include data elements (e.g., the elements 820-828, 920a-938a, 920b-930b, 920c-936c, and 920d-930d). Further, the portions 1002, 1006, 1006, and 1008 may be associated with different times (e.g., were obtained at different times, or are associated with different time stamp information). In various embodiments, the data set 1000 may be an N-dimensional matrix of bits, and the portions 1002, 1006, 1006, and 1008 may be selected from the data set 1000. Similarly, the data set may be any number of data structures of any dimensionality and/or any number of data bases. In various embodiments, smaller sized data sets 1000 may be modified or transformed more frequently than a larger sized data set. In some embodiments, small data sets 1000 used in frequent communication may be modified or transformed based on seconds, fractions of a second, numbers of clock edges, etc. In various embodiments, light weight, low overhead, or low resource intensive modifications or transformations, such as bitwise operations, may be used for frequent modification or transformation to avoid impinging on the processing device availability for other processing operations.

A processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240) may perform a transform on the data set 1000 to change one or more values of the data elements in the data set. As one example, the portions 1002, 1006, 1006, and 1008 may be image files. The processing device may rotate the data set 1000, or any of the portions 1002-1008, along one or more axes 1020, 1024, and 1026. The processing device may also rotate the data set 1000 along an edge 1028. The processing device may also rotate the data set 1000 along an axis 1030 extending from a "corner" of the data set to a "center" of the data set. Any of the rotations may alter one or more values of elements of the portions 1002-1008. The rotation(s) may also alter one or more relationships among the values of elements of the portions 1002-1008. By performing a transform on the data set 1000, the processing device may generate a large number of changes to the values of the data elements of each of the portions 1002-1008. The changed values may provide a large number of highly unpredictable values from even a relatively small data set.

In some embodiments, the processing device may add a new portion to, or may modify a portion present in, the data set 1000. In some embodiments, the processing device may add or modify a portion so that relationships between the elements of the added/modify portion and other portions of the data set are irregular and thus difficult to predict. For example, in some embodiments, the processing device may add or modify the portion so that the added/modify portion has a different relative orientation or other relationship to other portions of the data set. For example, the processing device may add portion 1010 to the data set 1000 in an orientation that is, for example, perpendicular to the portions 1002-1008. As another example, the processing device may add portion 1012 to the data set 1000 an orientation that is at an acute angle to the portions 1002-1008. The irregular, unpredictable relationships among data elements of the portions 1002-1012 may provide a large number of highly unpredictable values from even a relatively small data set.

As noted above, transforming an element and/or a portion may include performing one or more operations to alter one or more values of the element and/or portion. For example, transforming an element and/or a portion of an image or a video file may include rotating, flipping, inverting, shifting a position, shifting a color, applying a filter or preset transformation (e.g., as may be available in a photo or video editing software program), or another similar operation. As another example, transforming an element and/or a portion of a music or audio file may include raising or lowering pitches, reversing the content of the file, inverting the content of the audio file (i.e., transforming the content along a selected axis), adding an audio effect such as reverb, distortion, flanging, and the like, or another similar operation. As another example, transforming an element and/or a portion of the ephemeral shared data set may include transcoding data elements (e.g., transforming audio data into visual data or text). As another example, transforming an element and/or a portion of the ephemeral shared data set may include performing one or more mathematical functions to transform the element and/or portion. As another example, transforming an element and/or a portion of the ephemeral shared data set may include changing a size or shape, distorting a share, performing a skew, a stretch, or another dimensional change on an element and/or portion of the data set. As noted above, transforming an element and/or portion of the data set may change not only a value of the element and/or portion, they may also change one or more relationships of the transformed element and/or portion to other elements and/or portions of the data set.

Figure 10D:
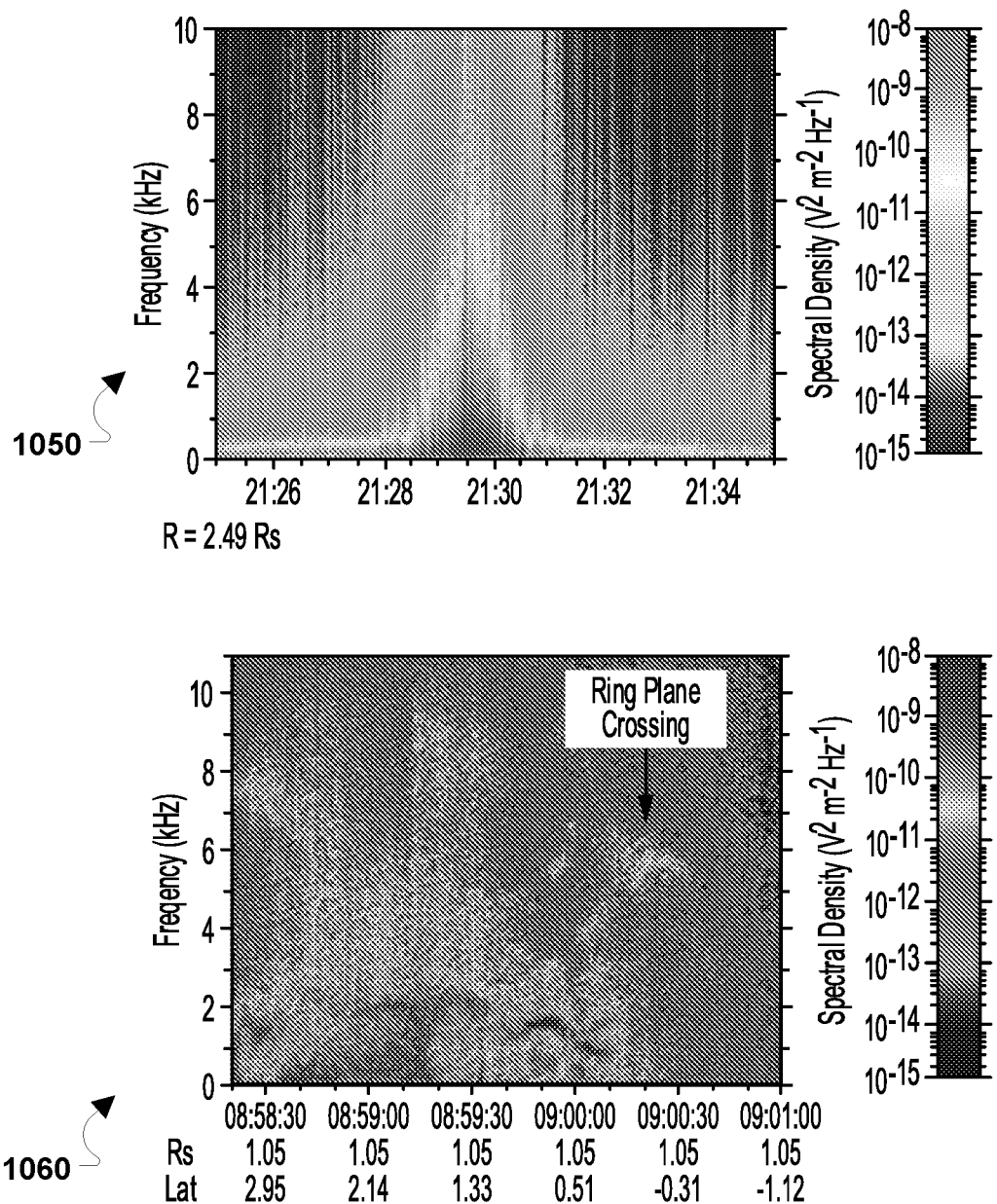
FIG. 10D illustrates a transformation of a first data format or type to a second data format or type.

As another example, transforming an element and/or a portion of a data set (e.g., the data set 1000) may include performing one or more operations to transcode data elements from one data format or type to another data format or type. FIG. 10D illustrates two representations 1050 and 1060 of a transformation of a first data format or type to a second data format or type. Representations 1050 and 1060 illustrate transformations of audio data into visual data, specifically spectrograms of data collected by the NASA Cassini spacecraft as it crossed the plane of Saturn's rings. The spectrograms 1050 and 1060 illustrate a transformation of audio data into visual data. This is merely one example, and in various embodiments, there any data format or type may be transformed into another data format or type.

In various embodiments, performing one or more transformations to the data set 1000 enables the processing device to generate a very large number of unpredictable element values and relationships among data elements from a relatively small number of portions. For example, in a case in which the portions 1002-1012 represent image files, each image file may include a large number of pixels, and each pixel may be associated with a number of different values, such as location information within the image file, color, hue, saturation, black and white value, and other such pixel information. Even without transformation, each image file of a series image files may contain a unique set of information. For example, each image in a series of images captured from a camera aimed at a highway will include a unique selection of vehicles, at different positions on the road, with different environmental conditions (e.g., cloud formations, sunlight, darkness, solar glare, shadows, etc.). The processing device then may perform the transform on one or more of the image files, thereby changing not only the values of the various pixels in the transformed image files, but also numerous relationships among the data elements of the transformed image files and other portions of the data set.

FIG. 11 illustrates a method 1100 of authenticating a first processing device (PD1) to a second processing device (PD2). With reference to FIGS. 1-11, the method 1100 may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

Following the operations of block 620 (FIG. 6), PD1 may select elements from the shared data set in block 1102. For example, PD1 may select elements 820, 822, 824, 826, and 828 from among the portions 802, 804, and 806 of the shared data set 800. As another example, PD1 may select elements from among the shared data sets 900a, 900b, 900c, or 900d. In some embodiments, PD1 may select the elements randomly from the shared data set.

In block 1104, PD1 may generate a rule set indicating the selected elements. In some embodiments, the rule set may identify the selected elements from the shared data set. For example, PD1 may generate a rule set identifying the elements selected from the shared data set.

In some embodiments, PD1 may generate the rule set based on the one or more relationships between or among the selected elements of the shared data set. The relationship between the two or more elements may include a comparative difference between the two or more elements, such as a time difference, a location difference, a positional difference, a color difference, a pitch difference, a frequency difference, or another difference. As another example, the relationships may be defined by comparative differences among three or more elements. For example, the position/location differences among the elements 820, 822, and 824 may define three angles, angle A, angle B, and angle D. Similarly, the relative position/location and/or time differences among elements 820, 822, 524, 826, and 828 may define additional angles, angles C, E, F, G, H, I, and J. In some embodiments, PD1 may generate the rule set based on one or more relationships among the selected elements of, for example, the shared data sets 900a, 900b, 900c, or 900d. In various embodiments, a relationship may be a relative difference in time, space, distance within a portion, or another informational difference. In some embodiments, a relationship may be a logical and/or arithmetic operation result using selected elements of the shared data set. The relationship(s) between or among elements may be determined among and/or between portions of the shared data set.

In some embodiments, PD1 may generate the rule set using a combination of identifiers of the selected elements and one or more relationships among the selected elements. In some embodiments, the rule set may include an identifier of only one of the selected elements and relationships of the one selected elements and the other selected elements. For example, the rule set may include an identifier of the element 820, and information about the relationships of the element 820 to the other selected elements (elements 822-828) sufficient to enable another processing device to identify the other selected elements (elements 822-828) using only the element 820 and the information about the relationships of the element 820 and the other selected elements. In some embodiments, PD1 may generate a rule set using a combination of identifiers of the selected elements and one or more relationships among the selected elements of, for example, the shared data sets 900a, 900b, 900c, or 900d.

In some embodiments, the generated rule set may be formatted as a stream, string, array, matrix, linked list, etc. of information organized according to an organizational logic. The more efficient the organizational logic, the smaller the generated rule set may be, enabling faster generation, transmission, and processing by receiving processing device, thereby decreasing a burden on processors as well as the transport infrastructure.

In block 1106, PD1 may generate a first result based on the selected elements. In some embodiments, the first result may include a stream, string, array, matrix, linked list, etc. of data. In some embodiments, the first result may include a value based on the information in the selected elements of the shared data set. In some embodiments, PD1 may perform a transform of the information of the selected elements, such as generating a hash of values within the information. In some embodiments, PD1 may generate a data of any of various formats based on the information of the selected elements and may perform a transform (e.g., generate a hash) of the information of the selected elements to generate the first result.

In block 1108, PD1 may send the rule set to PD2. In some embodiments, the PD1 may send a verification request including the rule set to PD2.

In block 1110, PD2 may receive the rule set (or verification request) from the PD2.

In block 1112, PD2 may extract the selected elements from the shared data set using the rule set. For example, PD2 may use identifiers of each of the selected elements 820-828 to extract the selected elements from the shared data set stored at the second processing device. As another example, PD2 may use one or more identifiers of one of the selected elements (e.g., one or more of the elements 820-828, or one or more of the elements of the shared data set 900a, 900b, 900c, or 900d) and one or more relationships among the selected elements to extract the selected elements from the shared data set.

In block 1114, PD2 may generate a second result based on the selected elements. In some embodiments, the second result may include a stream, string, array, matrix, linked list, etc. of data. In some embodiments, the second result may include a value based on the information in the selected elements of the shared data set. In some embodiments, PD2 may perform a transform of the information of the selected elements, such as generating a hash of values within the information. In some embodiments, PD2 may generate a data of any of various formats based on the information of the selected elements and may perform a transform (e.g., generate a hash) of the information of the selected elements to generate the first result. In various embodiments, PD2 may use the same method of generating the second result that the PD1 uses to generate the first result.

In block 1116, PD2 may send the second result to the PD1.

In block 1118, PD1 may receive the second result from the PD2.

In determination block 1120, PD1 may determine whether the first result matches the second result. For example, PD1 may determine whether a product of the first result and the second result equals zero. As another example, PD1 may compare the first result and the second result. In response to determining that the first result does not match the second result (i.e., determination block 1120="No"), PD1 may determine that PD2 is not authenticated in block 1122.

In block 1124, PD1 may prevent PD1 from communicating with PD2.

In optional block 1126, PD1 may send an indication that PD2 is not authenticated. For example, PD1 may send the indication to PD2. As another example, PD1 may send the indication to another processing device.

In response to determining that the first result matches the second result (i.e., determination block 1120="Yes"), PD1 may determine that PD2 is authenticated in block 1128.

In block 1130, PD1 may enable communication with PD2.

In optional block 1132, PD1 may send an indication that PD2 is authenticated. For example, PD1 may send the indication to PD2. As another example, PD1 may send the indication to another processing device.

Following the operations of block 1130 or optional block 1132, and block 1116, PD1 and PD2 may communicate, which may in some embodiments use an encrypted communication.

FIG. 12 illustrates a method 1200 of bi-directionally authenticating a first processing device (PD1) and a second processing device (PD2) according to some embodiments. With reference to FIGS. 1-12, the method 1200 may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

In some embodiments, PD1 and PD2 may share two or more data sets. For example, PD1 may generate or compile a first data set, and PD1 may share the first data set with PD2. Similarly, PD2 may generate or compile a second data set, and may share the second data set with PD1. There is no limitation on the number of data sets any processing device may store or share with another processing device (provided that the data sets are shared data sets). Thus, while the operations described below with respect to the method 1200 referred to a shared data set, in some embodiments the operations of the method 1200 may be performed using two (or more) shared data sets.

In block 1202, PD1 may select a first set of elements from a shared data set (e.g., shared with PD2). For example, PD1 may select elements from among the portions of the shared data sets 800 and 900*a*-900*d*.

In block 1204, PD1 may generate a first rule set indicating the selected elements. In some embodiments, the rule set may identify the selected elements from the shared data set. In some embodiments, PD1 may generate the rule set based on the one or more relationships between or among the selected elements of the shared data set. The relationship between the two or more elements may include a comparative difference between the two or more elements. In some embodiments, a relationship may be a logical and/or arithmetic operation result using selected elements of the shared data set. In some embodiments, PD1 or may generate the rule set using a combination of identifiers of the selected elements and one or more relationships among the selected elements. In some embodiments, the rule set may include an identifier of only one of the selected elements and relationships of the one selected elements and the other selected elements.

In block 1206, PD1 may generate a first result based on the selected elements. In some embodiments, the first result may include a stream, string, array, matrix, linked list, etc. of data. In some embodiments, the first result may include a value based on the information in the selected elements of the shared data set. In some embodiments, PD1 may perform a transform of the information of the selected elements, such as generating a hash of values within the information. In some embodiments, PD1 may generate a data of any of various formats based on the information of the selected elements and may perform a transform (e.g., generate a hash) of the information of the selected elements to generate the first result.

In block 1208, PD1 may send the first rule set to PD2.

In block 1210, PD2 may select a second set of elements from a shared data set (e.g., shared with the PD1). For example, PD2 may select elements from among the portions of the shared data sets 500 and 600*a*-600*d*.

In block 1212, PD2 may generate a second rule set indicating the selected elements. In some embodiments, the rule set may identify the selected elements from the shared data set. In some embodiments, PD2 may generate the rule set based on the one or more relationships between or among the selected elements of the shared data set. The relationship between the two or more elements may include a comparative difference between the two or more elements. In some embodiments, a relationship may be a logical and/or arithmetic operation result using selected elements of the shared data set. In some embodiments, PD2 may generate the rule set using a combination of identifiers of the selected elements and one or more relationships among the selected elements. In some embodiments, the rule set may include an identifier of only one of the selected elements and relationships of the one selected elements and the other selected elements.

In block 1214, PD2 may generate a second result based on the selected elements. In some embodiments, the second result may include a stream, string, array, matrix, linked list, etc. of data. In some embodiments, the second result may include a value based on the information in the selected elements of the shared data set. In some embodiments, PD2 may perform a transform of the information of the selected elements, such as generating a hash of values within the information. In some embodiments, PD2 may generate a data of any of various formats based on the information of the selected elements and may perform a transform (e.g., generate a hash) of the information of the selected elements to generate the first result.

In block 1216, PD2 may receive the first rule set from PD1.

In block 1218, PD2 may send the second rule set to PD1.

In block 1220, PD1 may receive the second rule set from PD2.

In block 1222, PD1 may extract the selected elements (i.e., the elements selected by PD2) from the shared data set using the second rule set. For example, PD1 may use identifiers of each of the selected elements to extract the selected elements from the shared data set stored at PD1. As another example, PD1 may use one or more identifiers of one of the selected elements and one or more relationships among the selected elements to extract the selected elements from the shared data set.

In block 1224, PD1 may generate a third result based on the selected elements. In some embodiments, the third result may include a stream, string, array, matrix, linked list, etc. of data. In some embodiments, the third result may include a value based on the information in the selected elements of the shared data set. In some embodiments, PD1 may perform a transform of the information of the selected elements, such as generating a hash of values within the information. In some embodiments, PD1 may generate a data of any of various formats based on the information of the selected elements and may perform a transform (e.g., generate a hash) of the information of the selected elements to generate the third result.

In various embodiments, PD1 may use the same method of generating the third result that the PD2 uses to generate the second result.

In block 1226, PD1 may send the third result to PD2.

In block 1228, PD2 may extract the selected elements (i.e., the elements selected by PD1) from the shared data set using the first rule set. For example, PD2 may use identifiers of each of the selected elements to extract the selected elements from the shared data set stored at PD2. As another example, PD2 may use one or more identifiers of one of the selected elements and one or more relationships among the selected elements to extract the selected elements from the shared data set.

In block 1230, PD2 may generate a fourth result based on the selected elements. In some embodiments, the fourth result may include a stream, string, array, matrix, linked list, etc. of data. In some embodiments, the fourth result may include a value based on the information in the selected elements of the shared data set. In some embodiments, PD2 may perform a transform of the information of the selected elements, such as generating a hash of values of the information. In some embodiments, PD2 may generate a data of any of various formats based on the information of the selected elements and may perform a transform of the information of the selected elements to generate the fourth result. In various embodiments, PD2 may use the same method of generating the fourth result that the PD1 uses to generate the first result.

In block 1232, PD2 may receive the third result from PD1.

In block 1234, PD2 may send the fourth result to the PD1.

In block 1236, PD1 may receive the fourth result from PD2.

In determination block 1238, PD1 may determine whether the first result matches the fourth result. For example, PD1 may determine whether the first result that is generated by PD1 using the selected elements from the shared data set matches the fourth result that is generated by PD2 using the selected elements from the shared data set. In some embodiments, the comparison may include determining whether the difference of the first result and the fourth result equals zero.

In response to determining that the first result does not match the fourth result (i.e., determination block 1238="No"), PD1 may determine that PD2 is not authenticated in block 1240.

In block 1242, PD1 may prevent PD1 from communicating with PD2.

In optional block 1244, PD1 may send an indication that PD2 is not authenticated. For example, PD1 may send the indication to PD2. As another example, PD1 may send the indication to another processing device.

In response to determining that the second result matches the third result (i.e., determination block 1238="Yes"), PD1 may determine that PD2 is authenticated in block 1246.

In block 1248, PD1 may enable communication with PD2.

In optional block 1250, PD1 may send an indication that PD2 is authenticated. For example, PD1 may send the indication to PD2. As another example, PD1 may send the indication to another processing device.

Following the operations of block 1248 or optional block 1250, PD1 may communicate with PD2, which may in some embodiments use an encrypted communication.

In determination block 1252, PD2 may determine whether the second result matches the third result. In response to determining that the second result does not match the third result (i.e., determination block 1252="No"), PD2 may determine that the PD1 is not authenticated in block 1254.

In block 1256, PD2 may prevent the PD2 from communicating with the PD1.

In optional block 1258, PD2 may send an indication that the PD1 is not authenticated. For example, the PD2 may send the indication to the PD1. As another example, the PD2 may send the indication to another processing device.

In response to determining that the second result matches the third result (i.e., determination block 1252="Yes"), PD2 may determine that the PD1 is authenticated in block 1260.

In block 1262, the PD2 may enable communication with PD1.

In optional block 1264, PD2 may send an indication that PD1 is authenticated. For example, the PD2 may send the indication to PD1. As another example, PD2 may send the indication to another processing device.

Following the operations of block 1262 or optional block 1264, PD2 may communicate with PD1, which may in some embodiments use an encrypted communication.

Figure 13A:
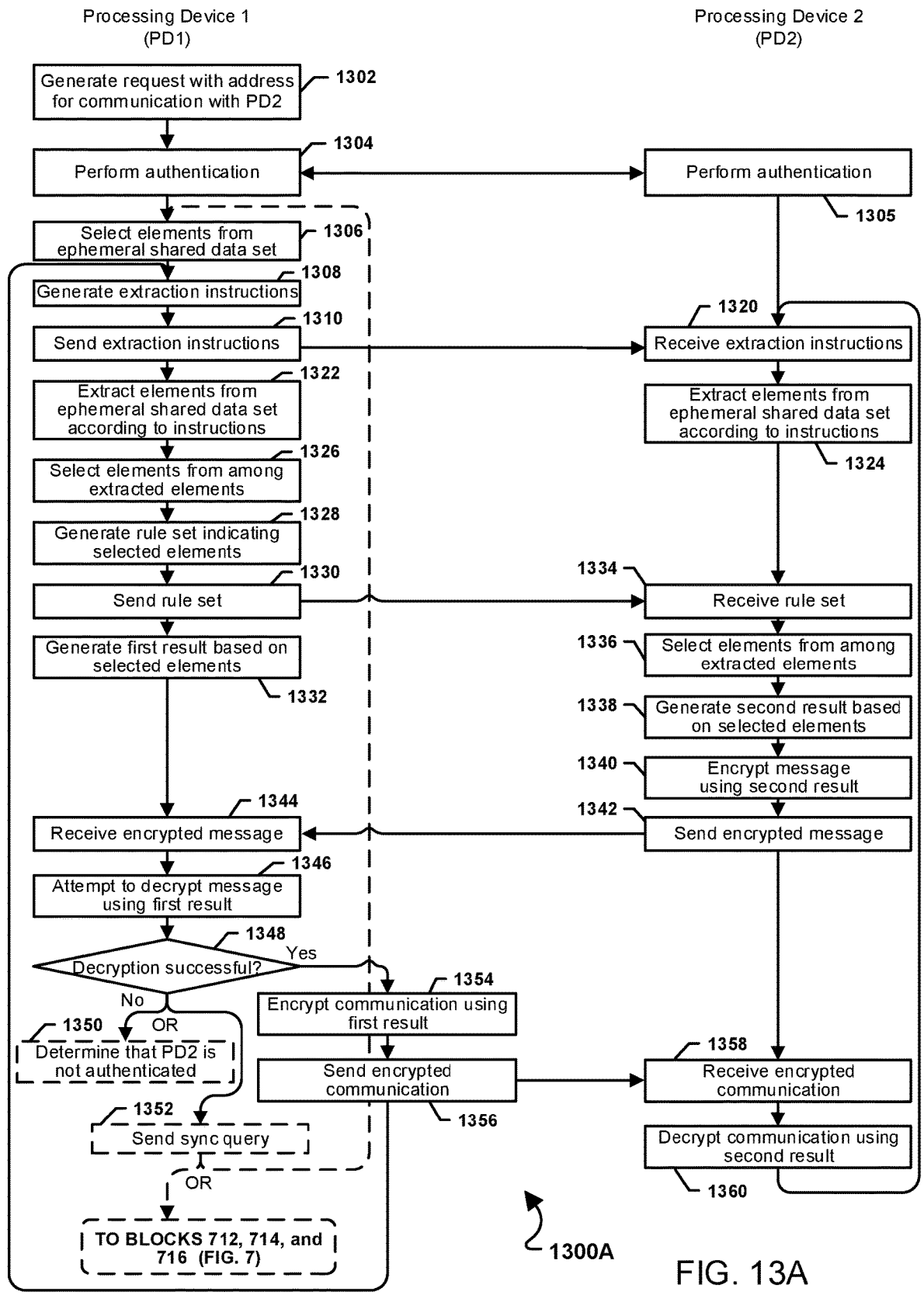
FIG. 13A illustrates a method 1300A for protecting a communication according to various embodiments.

FIG. 13A illustrates a method 1300A for protecting a communication (e.g., between a first processing device (PD1) and a second processing device (PD2)) according to various embodiments. With reference to FIGS. 1-13A, the method 1300A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240).

In block 1302, PD1 may generate a request with an address for communication with PD2. In some embodiments, a request may include a read and/or write request for a memory owned and/or controlled by another processing device, a request to begin a secure communication session with another processing device, a request for coherence and/or maintenance operations for a cache owned and/or controlled by another processing device, a request for workload from another processing device and/or a processing device controlling workload distribution, a request for access to and/or ownership of a processing resource (e.g., a memory location, a processor core, electrical power, etc.) owned and/or controlled by another processing device, etc.

In block 1304, PD1 may perform operations to authenticate PD2. In block 1305, PD2 may perform operations to authenticate PD1. Examples of authentication operations include the methods 1100 and 1200 as described.

In block 1306, PD1 may select elements from a shared data set. The shared data set may be stored such that PD1 and PD2 each may access their own copy of the shared data set. In some embodiments, PD1 may select two or more elements from among the one or more portions of the shared data set. For example, PD1 may select two or more elements from among the shared data sets 800 and 900a-900d and 1000 (e.g., the elements 820-828, 920a-938a, 920b-930b, 920c-936c, and 920d-930d).

In block 1308, PD1 may generate extraction instructions. The extraction instructions may provide instructions to another processing device (e.g., PD2) for extracting data elements from its copy of the shared data set. In some embodiments, the extraction instructions may include a rule set that enables the receiving processing device (e.g., PD2) to identify the element(s) selected by PD1 from the shared data set stored at the receiving processing device. In some embodiments, the extraction instructions may include an instruction to perform a transformation operation on one or more of the extracted elements. In some embodiments, the extraction instructions may include an instruction to perform a transformation operation on one or more portions of the shared data set, or on the entire shared data set, before or after extracting a data element from the shared data set. As the one example, the instruction instructions may include a first instruction to select a first element, a second instruction to perform a specified transformation on the first element, the third instruction to perform a transformation of the shared data set, a fourth instruction to select a second element, a fifth instruction to perform a transformation of the second element, etc.

In some embodiments, the extraction instructions may include a rule set that enables the receiving processing device to extract the elements based on relationships among the elements. For example, PD1 may determine one or more relationships between the selected two or more elements. In some embodiments, the relationship(s) may be based on one or more comparative or relational differences between or among the elements, such as those described above with respect to data sets 800 and 900a-900d. In some embodiments, a relationship may be a logical and/or arithmetic operation result using selected elements of the shared data set.

In various embodiments, the extraction instructions may enable PD1 and PD2 to dynamically generate a unique set of elements (the extracted data elements) that are uniquely shared by PD1 and PD2, based on elements in the shared data set.

In block 1310, PD1 may send the extraction instructions to PD2.

In block 1320, PD2 may receive the extraction instructions from PD1.

In block 1322, PD1 may extract elements from the ephemeral shared data set stored at PD1 according to the instructions. In block 1324, PD2 may extract elements from the ephemeral shared data set stored at PD2 according to the instructions. As used herein an ephemeral shared data set stored at a processing device (e.g., PD1 and PD2) may include the ephemeral shared data set stored to a memory, such as a register, a cache, a RAM, a storage memory, etc., accessible by the processing device.

In some embodiments, the operations of blocks 1322 and 1324 may include performing a transform of the extracted elements. For example, the PD1 and/or PD2 may transform an element of an image or a video file (e.g., include rotating, flipping, inverting, shifting a position, shifting a color, applying a filter or preset transformation, or another similar operation). As another example, PD1 and/or PD2 may transform an element of a music or audio file (e.g., raising or lowering pitches, reversing the content of the file, transforming the content along a selected axis, adding an audio effect such as reverb, distortion, flanging, and the like, or another similar operation). As another example, PD1 and/or PD2 may transcode data elements from one format or data type to another format or data type. As another example, the PD1 and/or PD2 may performing one or more mathematical functions to transform the element. As another example, transforming an element and/or a portion of the ephemeral data set may include performing one or more bitwise functions (e.g., logical operations, shift operations, arithmetic operations, etc.).

In block 1326, PD1 may select one or more elements from among the extracted elements.

In block 1328, PD1 may generate a rule set indicating the selected elements. For example, PD1 may select one or more elements from one or more portions of the shared data set, and may generate the rule set identifying the selected two or more elements. In some embodiments, PD1 may determine one or more relationships between the selected two or more elements, and may generate the rule set based on the determined one or more relationships between the selected two or more elements. In some embodiments, the relationship(s) may be based on one or more comparative or relational differences between or among the elements, such as those described above with respect to shared data sets 800 and 900a-900d. In some embodiments, a relationship may be a logical and/or arithmetic operation result using selected elements of the shared data set. In some embodiments, the rule set may indicate a number system to be used in identifying and selecting elements from the shared data set, such as decimal, octal, hexadecimal, etc. In some embodiments, the rule set may indicate an encryption protocol to be used by PD1 and PD2. In various embodiments, the rule set may indicate two or more encryption protocols to be used, so that the encryption protocol employed by PD1 and pD2 changes over time.

In block 1330, PD1 may send the rule set to PD2.

In block 1332, PD1 may generate a first result based on the selected elements.

In block 1334, PD2 may receive the rule set from PD1.

In block 1336, PD2 may select elements from its extracted elements using the rule set. For example, PD2 may use identifiers of each of the selected elements (e.g., one or more of the elements 820-828, or one or more of the elements of the shared data sets 900a-900d) to select the elements from among the extracted elements from the ephemeral shared data set stored at PD2. As another example, PD2 may use one or more identifiers of one of the elements and one or more relationships among the selected elements to select the elements from among the extracted elements.

In block 1338, PD2 may generate a second result based on the selected elements. In some embodiments, the second result may include a stream, string, array, matrix, linked list, etc. of data. In some embodiments, the second result may include a value based on the information in the selected elements of the shared data set. In some embodiments, PD2 may perform a transform of the information of the selected elements, such as generating a hash of values within the information. In some embodiments, PD2 may generate a data of any of various formats based on the information of the selected elements and may perform a transform (e.g., generate a hash) of the information of the selected elements to generate the first result. In various embodiments, PD2 may use the same method of generating the second result that PD1 uses to generate the first result.

In block 1340, PD2 may encrypt a message using the second result. For example, PD2 may use an encryption method such as MD5, SHA2, SHA256, BLAKE2, and the like, together with the second result to encrypt the message. In some embodiments, the message may serve as a test message to enable PD1 to determine whether the second result generated by PD2 matches the first result generated by PD1.

In block 1342, PD2 may send the encrypted message to PD1.

In block 1344, PD1 may receive the encrypted message.

In block 1346, PD1 may attempt to decrypt the message using the first result. For example, PD1 may initiate a decryption process of the message. In various embodiments, PD1 may use decryption format such as MD5, SHA2, SHA256, BLAKE2, and the like to attempt the decryption of the message.

In determination block 1348, PD1 may determine whether the decryption of the message from PD2 was successful. In some embodiments, a successful decryption of the encrypted message from PD2 may indicate that the first result and the second result match.

In response to determining that the decryption was not successful (i.e., determination block 1348="No"), in some embodiments PD1 may determine that PD2 is not authenticated in optional block 1350.

In response to determining that the decryption was not successful (i.e., determination block 1348="No"), in some embodiments PD1 may send a synchronization query (e.g., to PD2 and/or to a medium communication controller) in optional block 1352.

In some embodiments, following the sending of the synchronization query, PD1 may again select elements from the ephemeral shared data set in block 1312.

In some embodiments, following the sending of the synchronization query, PD1 and PD2 (and optionally the medium communication controller) may perform operations to synchronize the shared data set, in optional block 712, 714, and 716 (FIG. 7), respectively.

In response to determining that the decryption was successful (i.e., determination block 1348="Yes"), PD1 may encrypt a communication using the first result in block 1354. For example, PD1 may encrypt the communication for which PD1 generated the request in block 1302.

In block 1356, PD1 may send the encrypted communication to PD2. In some embodiments, PD1 may proceed to perform the operations of block 1308.

In block 1358, PD2 may receive the encrypted communication from PD1.

In block 1360, PD2 may decrypt the communication using the second result. In some embodiments, PD2 may again receive extraction instructions from PD1 in block 1320.

The method 1300A is not limited to the sending of a communication from PD1 to PD2, and in various embodiments PD2 may perform the operations described above with respect to PD1, and vice versa. In some embodiments, PD1 and PD2 may perform their respective operations of the method 1300A so that PD1 may send an encrypted communication to PD2, and may subsequently switch roles, so that PD2 may send an encrypted communication to PD1.

In various embodiments, the ephemeral shared data set may exist in one state for a relatively short period of time, which may be, for example, minutes, or seconds.

In various embodiments, the dynamic value may be usable to encrypt and decrypt only one communication. This contrasts with the effective duration of certificates from a conventional certifying authority (such as PKI certificates), which may have a duration of up to decades in some cases. The relatively short useful duration and the inherent complexity of the ephemeral shared data set and the dynamic value reduces by orders of magnitude the possibility of such information being guessed, accessed, or "hacked" and then used as a means of attacking the system.

Figure 13B:
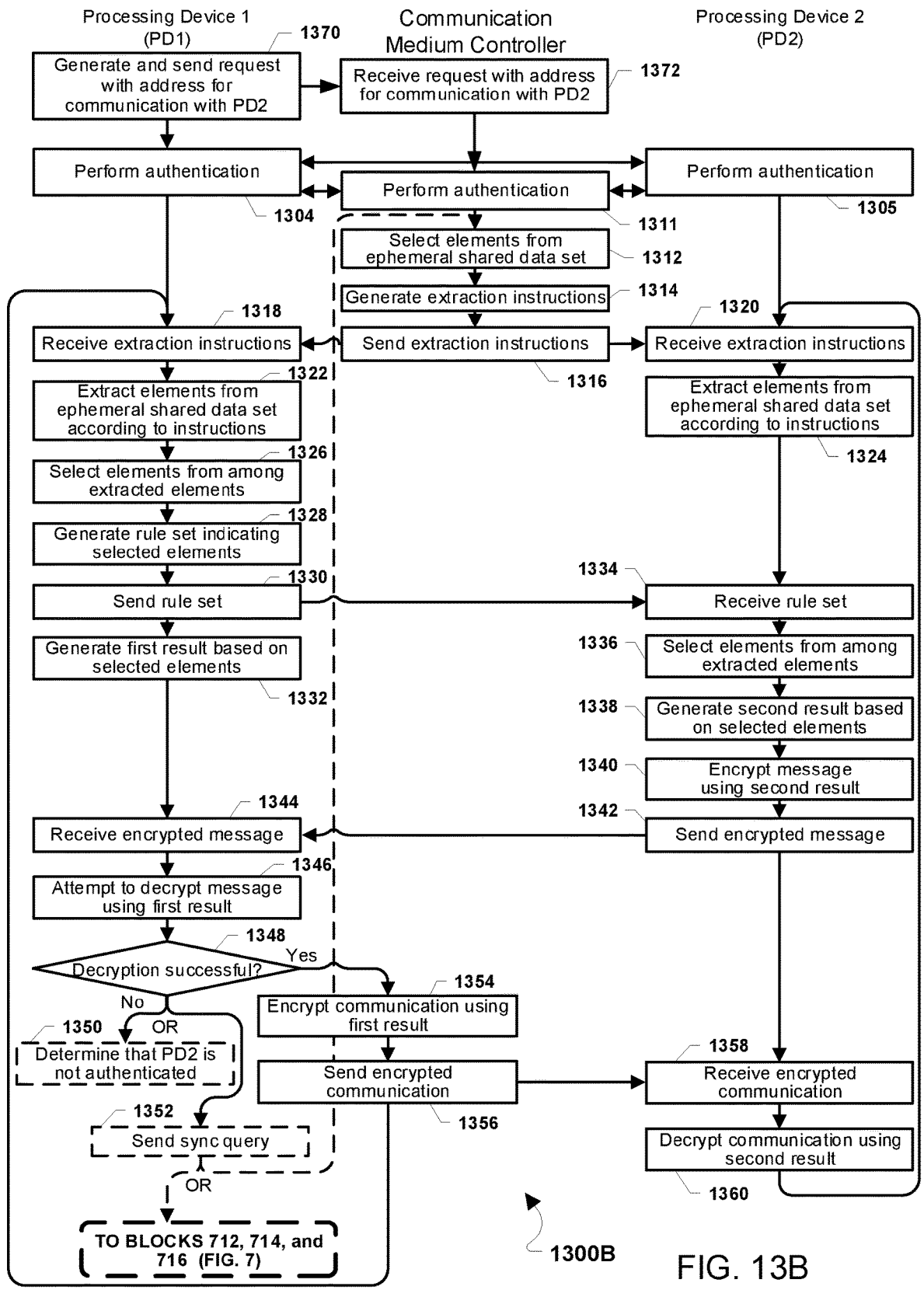
FIG. 13B illustrates a method 1300B for protecting a communication according to various embodiments

FIG. 13B illustrates a method 1300B for protecting a communication (e.g., between a first processing device (PD1) and a second processing device (PD2)) according to various embodiments. With reference to FIGS. 1-13B, the method 1300A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1302-1310 and 1320-1360, PD1 and PD2 may perform operations of like-numbered blocks of the method 1300A as described. The method 1300B is similar to the method 1300A, however in the method 1300B a communication medium controller performs various operations as further described below.

In block 1370, PD1 may generate and send a request with address for communication with PD2. In some embodiments, the PD1 may generate a request to transmit to and/or receive from PD2 data and/or instructions. The request may include an address of PD2 on an SoC (e.g., SoC 100 in FIG. 1) and/or on a communication medium (e.g., communication medium 136 in FIG. 1), which may be used to route the request to PD2. The PD1 may transmit the request for communication with PD2 with the address of PD2 to a communication medium controller (e.g., communication medium controller 134 in FIG. 2).

In block 1372, the communication medium controller may receive the request for communication with PD2. The communication medium controller may control whether to allow the request for communication, when to transmit the request for communication to PD2, and route the request for communication to PD2. The communication medium controller may use the address to identify PD2 and the location of PD2 on the SoC and/or the communication medium.

In block 1311, the communication medium controller may perform operations to authenticate PD1 and PD2. Examples of authentication operations include the methods 1100 and 1200 as described.

In block 1312, the communication medium controller may select elements from a shared data set. The shared data set may be stored at the communication medium controller, and at PD1 and PD2 so that each of PD1 and PD2 has (or may access) a copy of the shared data set. As used herein an ephemeral shared data set stored at a processing device (e.g., PD1 and PD2) may include the ephemeral shared data set stored to a memory, such as a register, a cache, a RAM, a storage memory, etc., accessible by the processing device. In some embodiments, the communication medium controller may select two or more elements from among the one or more portions of the shared data set. For example, the communication medium controller may select two or more elements from among the shared data sets 800 and 900a-900d and 1000 (e.g., the elements 820-828, 920a-938a, 920b-930b, 920c-936c, and 920d-930d).

In block 1314, the communication medium controller may generate extraction instructions. The extraction instructions may provide instructions to another processing device (e.g., PD1, PD2) for extracting data elements from a shared data set. In some embodiments, the extraction instructions may include a rule set that enables the receiving processing device (e.g., PD1, PD2) to identify the element(s) selected by the communication medium controller from the shared data set stored at the receiving processing device. In some embodiments, the extraction instructions may include an instruction to perform a transformation operation on one or more of the extracted elements. In some embodiments, the extraction instructions may include an instruction to perform a transformation operation on one or more portions of the shared data set, or on the entire shared data set, before or after extracting a data element from the shared data set. As the one example, the instruction instructions may include a first instruction to select a first element, a second instruction to perform a specified transformation on the first element, the third instruction to perform a transformation of the shared data set, a fourth instruction to select a second element, a fifth instruction to perform a transformation of the second element, etc.

In some embodiments, the extraction instructions may include a rule set that enables the receiving processing device (e.g., PD1, PD2) to extract the elements based on relationships among the elements. For example, the communication medium controller may determine one or more relationships between the selected two or more elements. In some embodiments, the relationship(s) may be based on one or more comparative or relational differences between or among the elements, such as those described above with respect to data sets 800 and 900a-900d. In some embodiments, a relationship may be a logical and/or arithmetic operation result using selected elements of the shared data set.

In various embodiments, the extraction instructions may enable PD1 and PD2 to dynamically generate a unique set of elements (the extracted data elements) that are uniquely shared by PD1 and PD2, based on elements in the shared data set.

In block 1316, the communication medium controller may send the extraction instructions to PD1 and PD2. In block 1318, PD1 may receive the extraction instructions from the communication medium controller. In block 1320, PD2 may receive the extraction instructions from the communication medium controller.

Figure 14A:
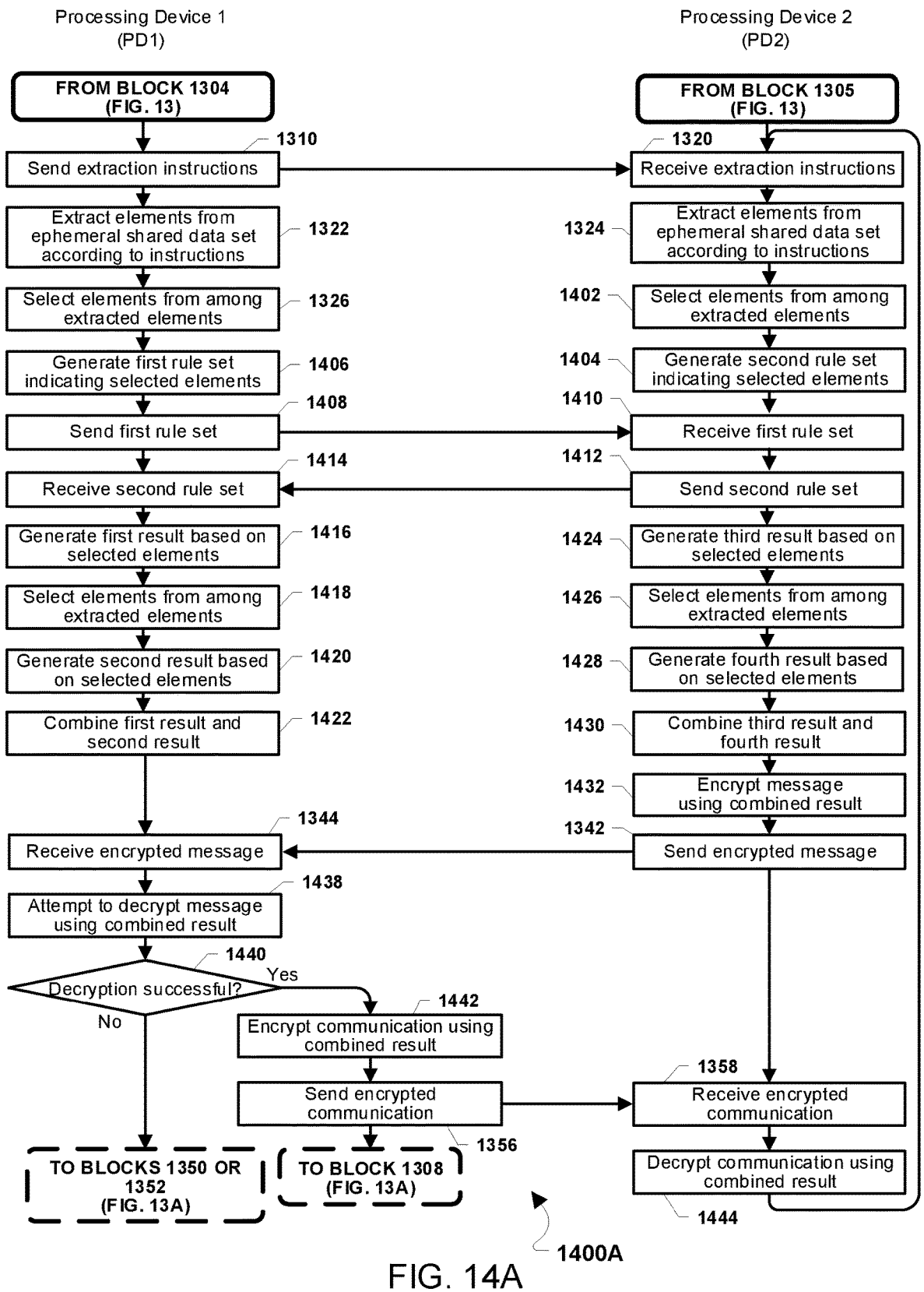
FIG. 14A illustrates a method 1400A for protecting a communication according to various embodiments.

FIG. 14A illustrates a method 1400A for protecting a communication (e.g., between a first processing device (PD1) and a second processing device (PD2)) according to various embodiments. With reference to FIGS. 1-14A, the method 1400A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1310-1326, 1344, 1346, and 1358, PD1 and PD2 may perform operations of like-numbered blocks of the method 1300A as described.

In block 1402, PD2 may select one or more elements from among the extracted elements.

In block 1404, PD2 may generate a second rule set indicating the selected elements. For example, PD2 may select one or more elements from one or more portions of the shared data set, and may generate the second rule set identifying the selected two or more elements. In some embodiments, PD2 may determine one or more relationships between the selected two or more elements, and may generate the second rule set based on the determined one or more relationships between the selected two or more elements. In some embodiments, the relationship(s) may be based on one or more comparative or relational differences between or among the elements, such as those described above with respect to shared data sets 800 and 900a-900d. In some embodiments, a relationship may be a logical and/or arithmetic operation result using selected elements of the shared data set.

In block 1406, PD1 may generate a first rule set indicating the selected elements. In some embodiments, the first rule set may indicate elements selected by PD1 in the operations of block 1326.

In various embodiments, the first rule set may include instructions for combining a result generated using the first rule set and a result generated using the second rule set. Similarly, in various embodiments, the second rule set may include instructions for combining the result generated using the first rule set and the result generated using the second rule set.

In block 1408, PD1 may send the first rule set to PD2.
In block 1410, PD2 may receive the first rule set.
In block 1412, PD2 may send the second rule set to PD1.
In block 1414, PD1 may receive the second rule set.
In block 1416, PD1 may generate a first result based on the selected elements.

In block 1418, PD1 may select elements from its extracted elements using the second rule set. For example, PD1 may use identifiers of each of the selected elements (e.g., one or more of the elements 820-828, or one or more of the elements of the shared data sets 900a-900d) to select the elements from among the extracted elements from the shared data set stored at PD1. As another example, PD1 may use one or more identifiers of one of the elements and one or more relationships among the selected elements to select the elements from among the extracted elements.

In block 1420, PD1 may generate a second result based on the selected elements.

In some embodiments, each of the first result and second result may include a stream, string, array, matrix, linked list, etc. of data. In some embodiments, the first result and second result may each include a value based on the information in the selected elements of the shared data set. In some embodiments, PD1 may perform a transform of the information of the selected elements, such as generating a hash of values within the information. In some embodiments, PD1 may generate a data of any of various formats based on the information of the selected elements and may perform a transform (e.g., generate a hash) of the information of the selected elements to generate each of the first result and the second result.

In block 1422, PD1 may combine the first result and the second result. In some embodiments, PD1 may combine the first result and the second result according to instructions in the first rule set. In some embodiments, PD1 may combine the first result and the second result according to instructions in the second rule set.

In block 1424, PD2 may generate a third result based on the selected elements. In some embodiments, PD2 may generate the third result based on the elements selected by PD2 from among the extracted elements (e.g., in the operations of block 1402).

In block 1426, PD2 may select elements from its extracted elements using the first rule set received from PD1

In block 1428, PD2 may generate a fourth result based on the selected elements.

In some embodiments, each of the third result and the fourth result may include a stream, string, array, matrix, linked list, etc. of data. In some embodiments, the third result and the fourth result may each include a value based on the information in the selected elements of the shared data set. In some embodiments, PD2 may perform a transform of the information of the selected elements, such as generating a hash of values within the information. In some embodiments, PD2 may generate a data of any of various formats based on the information of the selected elements and may perform a transform (e.g., generate a hash) of the information of the selected elements to generate each of the third result and the fourth result.

In block 1430, PD2 may combine the third result and the fourth result. In some embodiments, PD2 may combine the third result and the fourth result according to instructions in the first rule set. In some embodiments, PD2 may combine the first result and the second result according to instructions in the second rule set.

In block 1432, PD2 may encrypt a message using the combined result. In some embodiments, the message may serve as a test message to enable PD1 to determine whether the combined result generated by PD2 matches the combined result generated by the PD1.

In block 842, PD2 may send the encrypted message to PD1.

In block 844, PD1 may receive the encrypted message.

In block 1438, PD1 may attempt to decrypt the message using the combined result (i.e., the combined result generated by PD1 in the operations of block 1422).

In determination block 1440, PD1 may determine whether the decryption of the message from PD2 was successful. In some embodiments, a successful decryption of the encrypted message from PD2 may indicate that the combined result determined by PD1 and the combined result determined by PD2 match.

In response to determining that the decryption was not successful (i.e., determination block 1440="No"), PD1 may perform the operations of blocks 1350 or 1352 (FIG. 13A).

In response to determining that the decryption was successful (i.e., determination block 1440="Yes"), PD1 may encrypt the communication using the combined result in block 1442. For example, PD1 may encrypt the communication for which PD1 generated the request in block 1302 (FIG. 13A). As another example, PD1 may encrypt the communication for which PD1 sent the request to the communication medium controller in block 1370 (FIG. 13B).

The method 1400A is not limited to the sending of a communication from PD1 to PD2, and in various embodiments PD2 may perform the operations described above with respect to PD1, and vice versa. In some embodiments, PD1 to PD2 may perform their respective operations of the method 1400A so that PD1 may send an encrypted communication to PD2, and may subsequently switch roles, so that PD2 may send an encrypted communication to PD1.

Figure 14B:
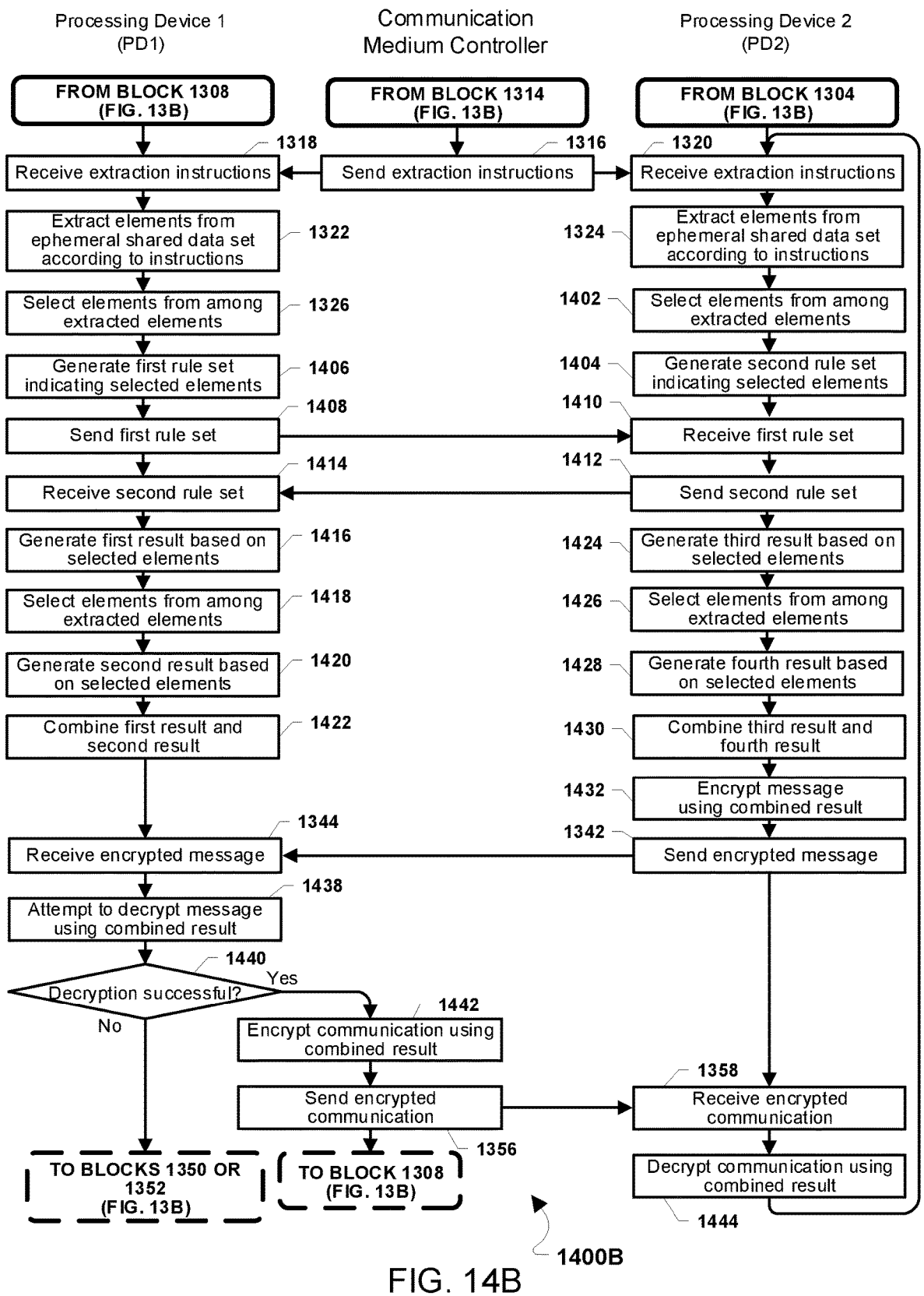
FIG. 14B illustrates a method 1400B for protecting a communication according to various embodiments

FIG. 14B illustrates a method 1400B for protecting a communication (e.g., between a first processing device (PD1) and a second processing device (PD2)) according to various embodiments. With reference to FIGS. 1-14B, the method 1400B may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1318-1358 and 1402-1444, PD1 and PD2 may perform operations of like-numbered blocks of the methods 1300A and 1400A as described.

Following the operations of block 1314, by which the communication medium controller may generate extraction instructions, the communication medium controller may send the extraction instructions to PD1 and PD2 in block 1316.

In block 1318, PD1 may receive the extraction instructions from the communication medium controller. In block 1320, PD2 may receive the extraction instructions from the communication medium controller.

Figure 15A:
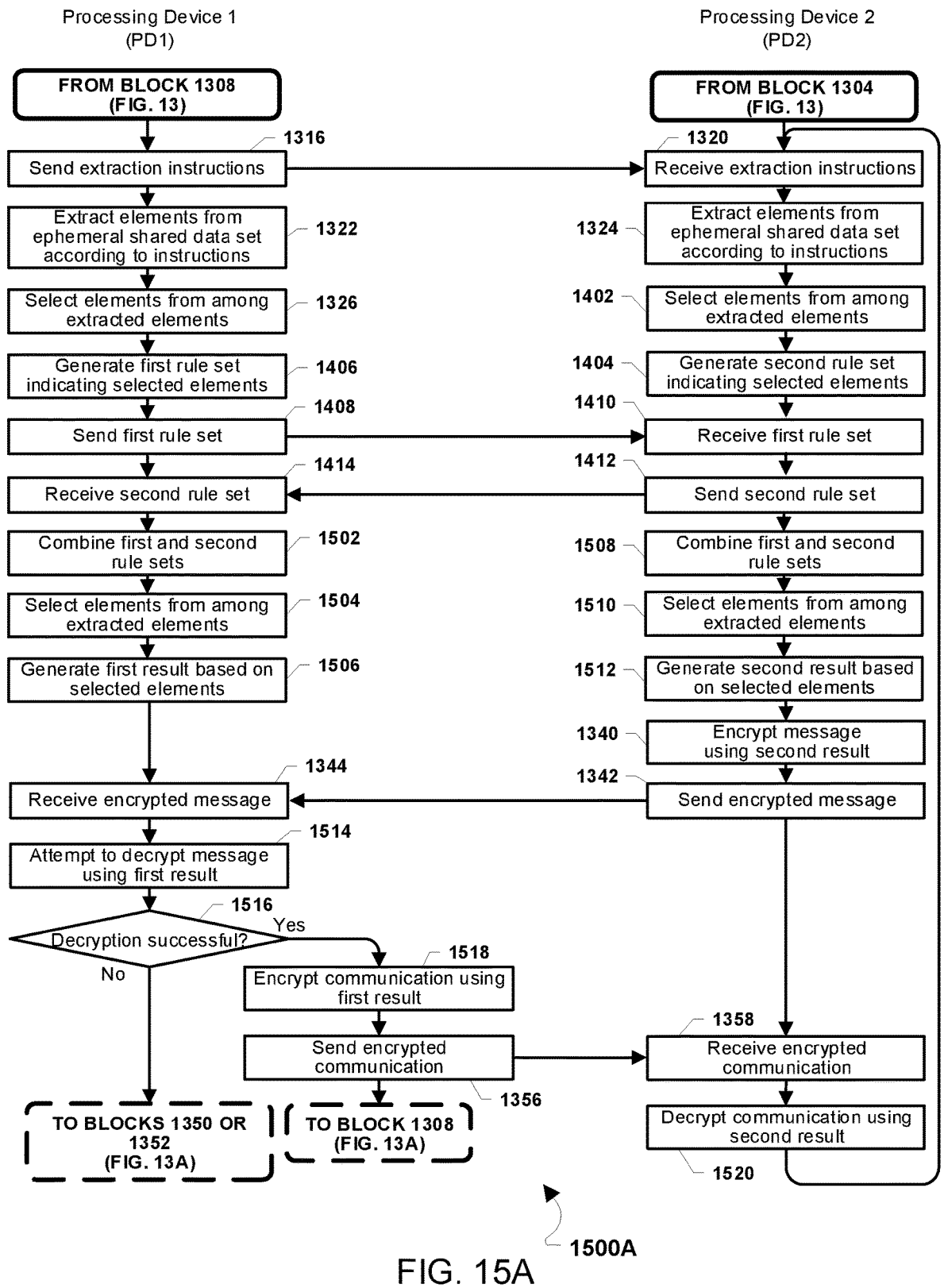
FIG. 15A illustrates a method 1500A for protecting a communication according to various embodiments.

FIG. 15A illustrates a method 1500A for protecting a communication (e.g., between a first processing device (PD1) and a second processing device (PD2)) according to various embodiments. With reference to FIGS. 1-15A, the method 1500A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1316-1358 and 1402-1414, PD1 and PD2 may perform operations of like-numbered blocks of the methods 1300A and 1400A.

In block 1502, PD1 may combine the first and second rule sets to generate a combined rule set. In some embodiments, the first rule set may include instructions for combining the first and second rule set. In some embodiments, the second rule set may include instructions for combining the first and second rule set.

In block 1504, PD1 may select elements from its extracted elements using the combined rule set. For example, PD1 may use identifiers of each of the selected elements (e.g., one or more of the elements 820-828, or one or more of the elements of the shared data sets 900a-900d) to select the elements from among the extracted elements from the shared data set stored at PD1. As another example, PD1 may use one or more identifiers of one of the elements and one or more relationships among the selected elements to select the elements from among the extracted elements.

In block 1506, PD1 may generate a first result based on the selected elements.

In block 1508, PD2 may combine the first and second rule sets to generate a combined rule set. In some embodiments, the first rule set may include instructions for combining the first and second rule set. In some embodiments, the second rule set may include instructions for combining the first and second rule set.

In block 1510, PD2 may select elements from its extracted elements using the combined rule set. For example, PD2 may use identifiers of each of the selected elements (e.g., one or more of the elements 820-828, or one or more of the elements of the shared data sets 900a-900d) to select the elements from among the extracted elements from the shared data set stored at PD2. As another example, PD2 may use one or more identifiers of one of the elements and one or more relationships among the selected elements to select the elements from among the extracted elements.

In block 1512, PD2 may generate a second result based on the selected elements.

In block 1514, PD1 may attempt to decrypt the message (from PD2) using the first result.

In determination block 1516, PD1 may determine whether the decryption of the message from PD2 was successful. In some embodiments, a successful decryption of the encrypted message from PD2 may indicate that the first result and the second result match.

In response to determining that the decryption was successful (i.e., determination block 1516="Yes"), PD1 may encrypt the communication using the first result in block 1518. For example, PD1 may encrypt the communication for which PD1 generated the request in block 1302 (FIG. 13A). As another example, PD1 may encrypt the communication for which PD1 sent the request to the communication medium controller in block 1370 (FIG. 13B).

In block 1520, PD2 may decrypt the communication using the second result.

In response to determining that the decryption was not successful (i.e., determination block 1516="No"), PD1 may perform the operations of block 1350 or block 1352 (FIG. 13A) as described.

The method 1500A is not limited to the sending of a communication from PD1 to PD2, and in various embodiments the PD2 may perform the operations described above with respect to the PD1, and vice versa. In some embodiments, PD1 and PD2 may perform their respective operations of the method 1500A so that PD1 may send an encrypted communication to PD2, and may subsequently switch roles, so that PD2 may send an encrypted communication to PD1.

Figure 15B:
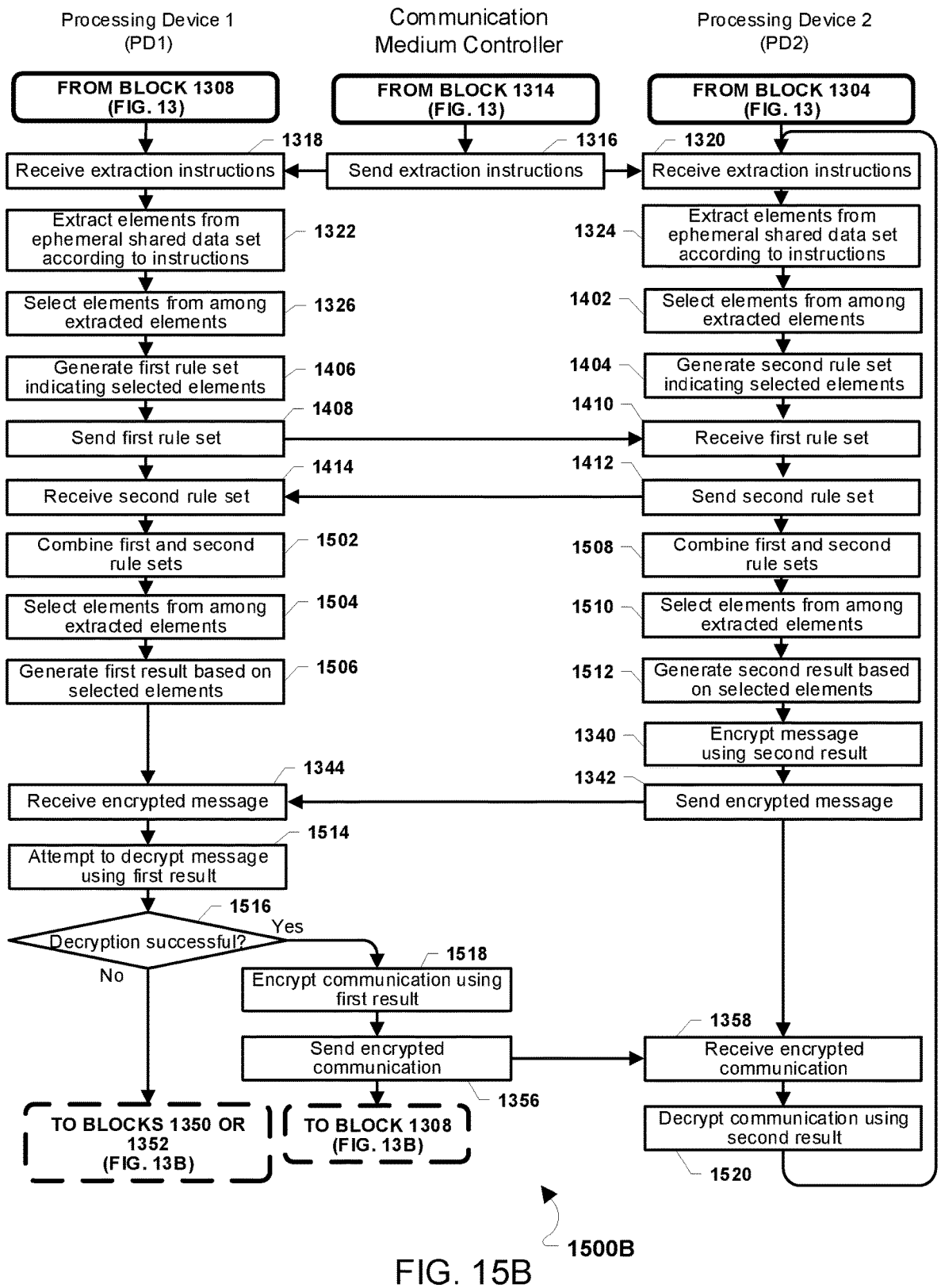
FIG. 15B illustrates a method 1500B for protecting a communication according to various embodiments.

FIG. 15B illustrates a method 1500B for protecting a communication (e.g., between a first processing device (PD1) and a second processing device (PD2)) according to various embodiments. With reference to FIGS. 1-15B, the method 1400B may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1318-1358, 1402-1444, and 1502-1520, PD1 and PD2 may perform operations of like-numbered blocks of the methods 1300A, 1400A, and 1500A as described.

Following the operations of block 1314, by which the communication medium controller may generate extraction instructions, the communication medium controller may send the extraction instructions to PD1 and PD2 in block 1316. In block 1318, PD1 may receive the extraction instructions from the communication medium controller. In block 1320, PD2 may receive the extraction instructions from the communication medium controller.

Figure 16A:
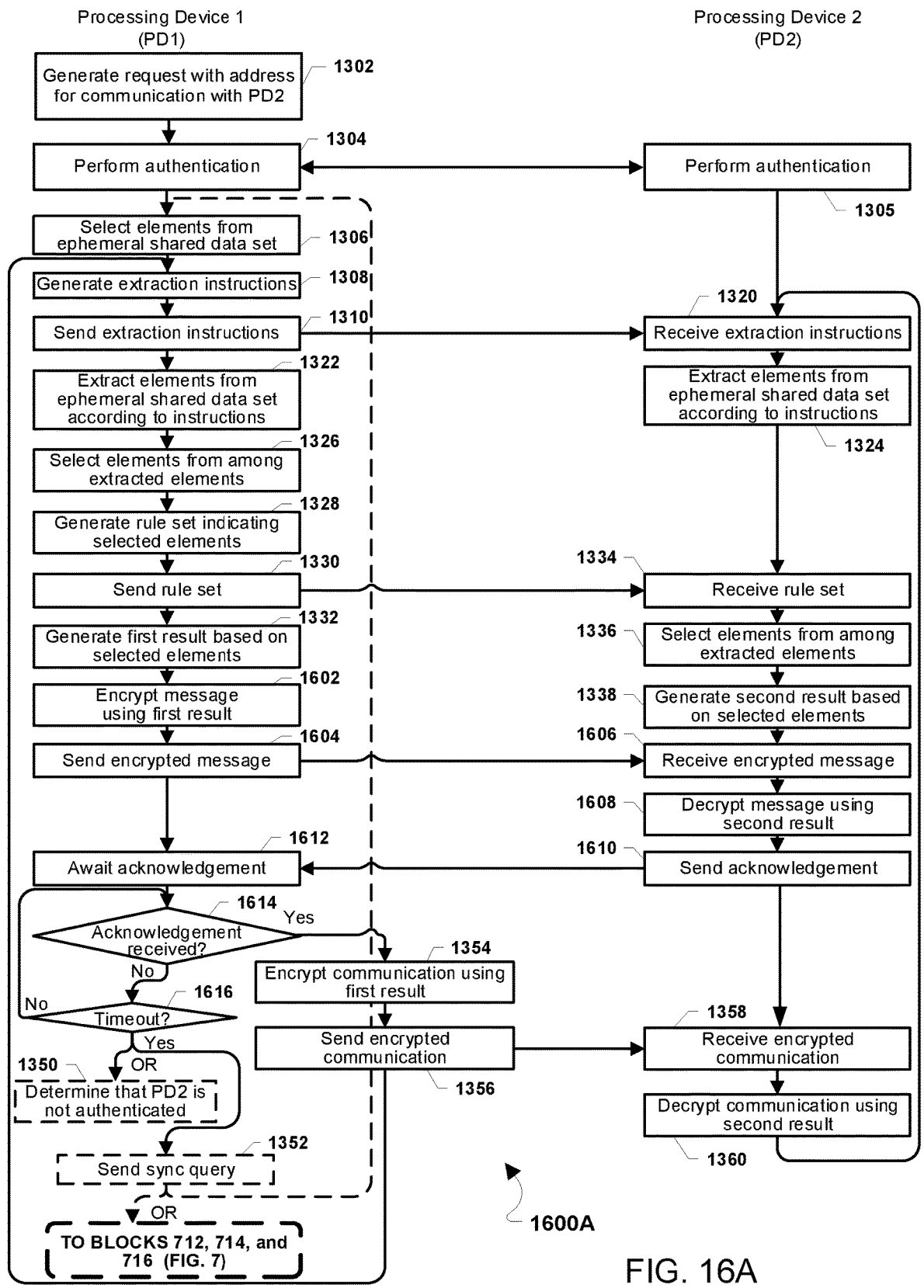
FIG. 16A illustrates a method 1600A for protecting a communication according to various embodiments.

FIG. 16A illustrates a method 1600A for protecting a communication (e.g., between a first processing device (PD1) and a second processing device (PD2)) according to various embodiments. With reference to FIGS. 1-16A, the method 1600A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1302-1360, PD1 and PD2 may perform operations of like-numbered blocks of the methods 1300A as described. In various embodiments, the method 1600A may be useful in implementations including one or more devices having limited processing and/or memory resources. One example of such devices includes IoT devices or other similar devices.

In block 1602, PD1 may encrypt a message using the first result. For example, PD1 may use an encryption method such as MD5, SHA2, SHA256, BLAKE2, and the like, together with the first result to encrypt the message.

In block 1604, PD1 may send the encrypted message to PD2.

In block 1606, PD2 may receive the encrypted message from PD1.

In block 1608, PD2 may decrypt the message using the second result. For example, PD2 may initiate a decryption process of the message. In some embodiments, PD2 may attempt to decrypt the message using the second result. In various embodiments, PD2 may use decryption format such as MD5, SHA2, SHA256, BLAKE2, and the like to attempt the decryption of the message.

In block 1610, PD2 may send an acknowledgment message to PD1. In some embodiments, the acknowledgment message may serve to indicate to PD1 that PD2 has successfully decrypted the encrypted message using the second result.

In block 1612, PD1 may await the acknowledgment message from PD2. For example, PD1, having sent the encrypted message in block 1604, may expect to receive the acknowledgment message from PD2.

In determination block 1614, PD1 may determine whether the acknowledgment message has been received from PD2.

In response to determining that the acknowledgment message has been received (i.e., determination block 1614="Yes"), PD1 may perform the operations of block 1354 (FIG. 13A).

In response to determining that the acknowledgment message has not been received (i.e., determination block 1614="No"), PD1 may determine whether a timeout period has elapsed in determination block 1616. In some embodiments, PD1 may wait for the acknowledgment message from PD2 for a period of time (e.g., a timeout period).

In response to determining that the timeout period has not elapsed (i.e., determination block 1616="No"), PD1 may again determine whether the acknowledgment message has been received in determination block 1614.

In response to determining that the timeout period has elapsed (i.e., determination block 1616="Yes"), PD1 may perform the operations of block 1350 or block 1352 (FIG. 13A).

Figure 16B:
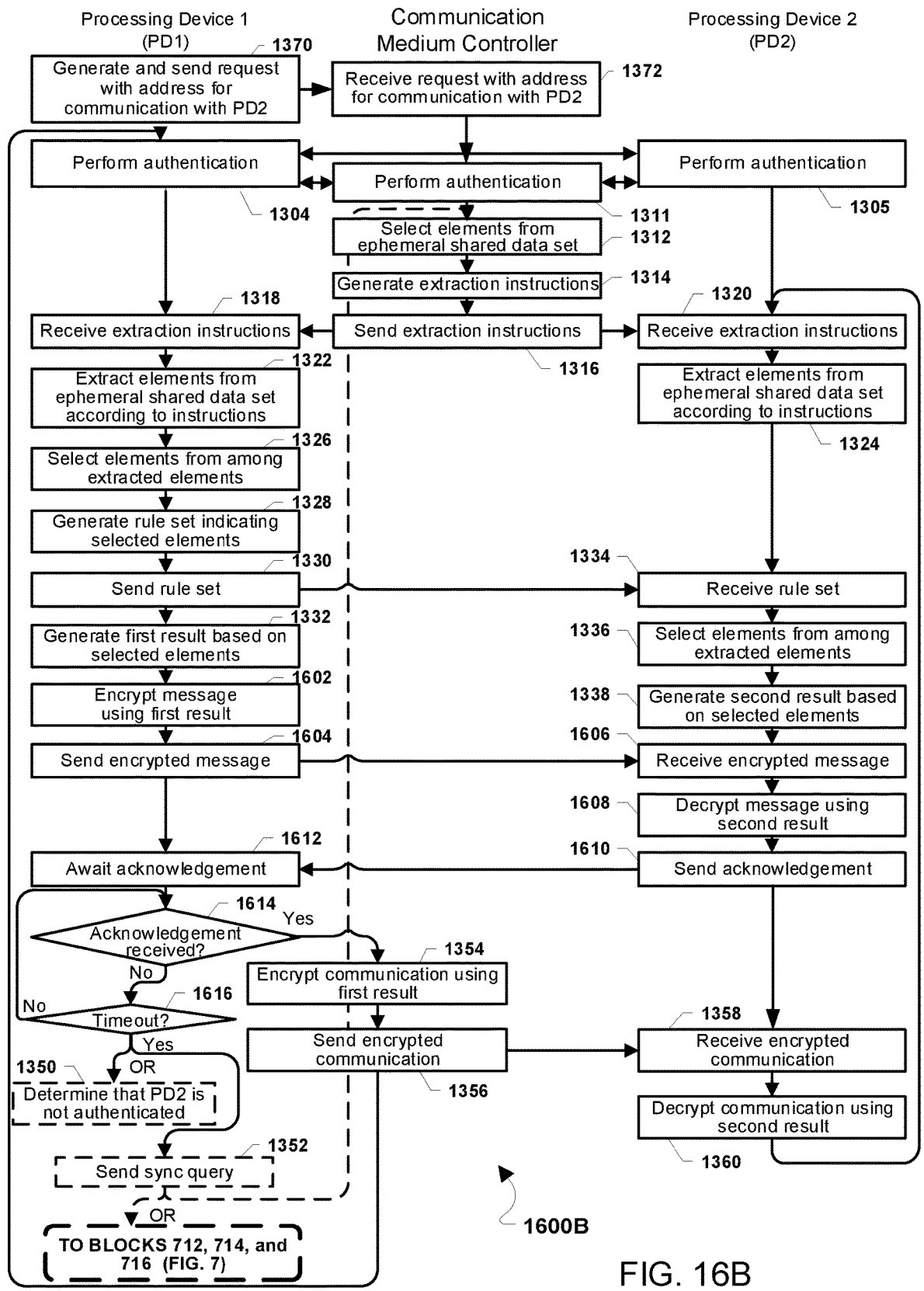
FIG. 16B illustrates a method 1600B for protecting a communication according to various embodiments.

FIG. 16B illustrates a method 1600B for protecting a communication (e.g., between a first processing device (PD1) and a second processing device (PD2)) according to various embodiments. With reference to FIGS. 1-16B, the method 1300A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1302-1310, 1320-1372, and 1602-1616, PD1 and PD2 may perform operations of like-numbered blocks of the methods 1300A and 1600A as described.

In blocks 1304, 1305, and 1311, PD1, PD2, and the communication medium controller may each perform operations to authenticate the other processing devices (e.g., PD1, PD2, and the communication medium controller, respectively). Examples of authentication operations include the methods 1100 and 1200 as described.

As described, in block 1312, the communication medium controller may select elements from a shared data set. In block 1314, the communication medium controller may generate extraction instructions. In block 1316, the communication medium controller may send the extraction instructions to PD1 and PD2. In block 1318, PD1 may receive the extraction instructions from the communication medium controller. In block 1320, PD2 may receive the extraction instructions from the communication medium controller.

The communication medium controller, PD1, and PD2 may proceed to perform the operations of blocks 1322-1360 and 1602-1616, as described.

Figure 17A:
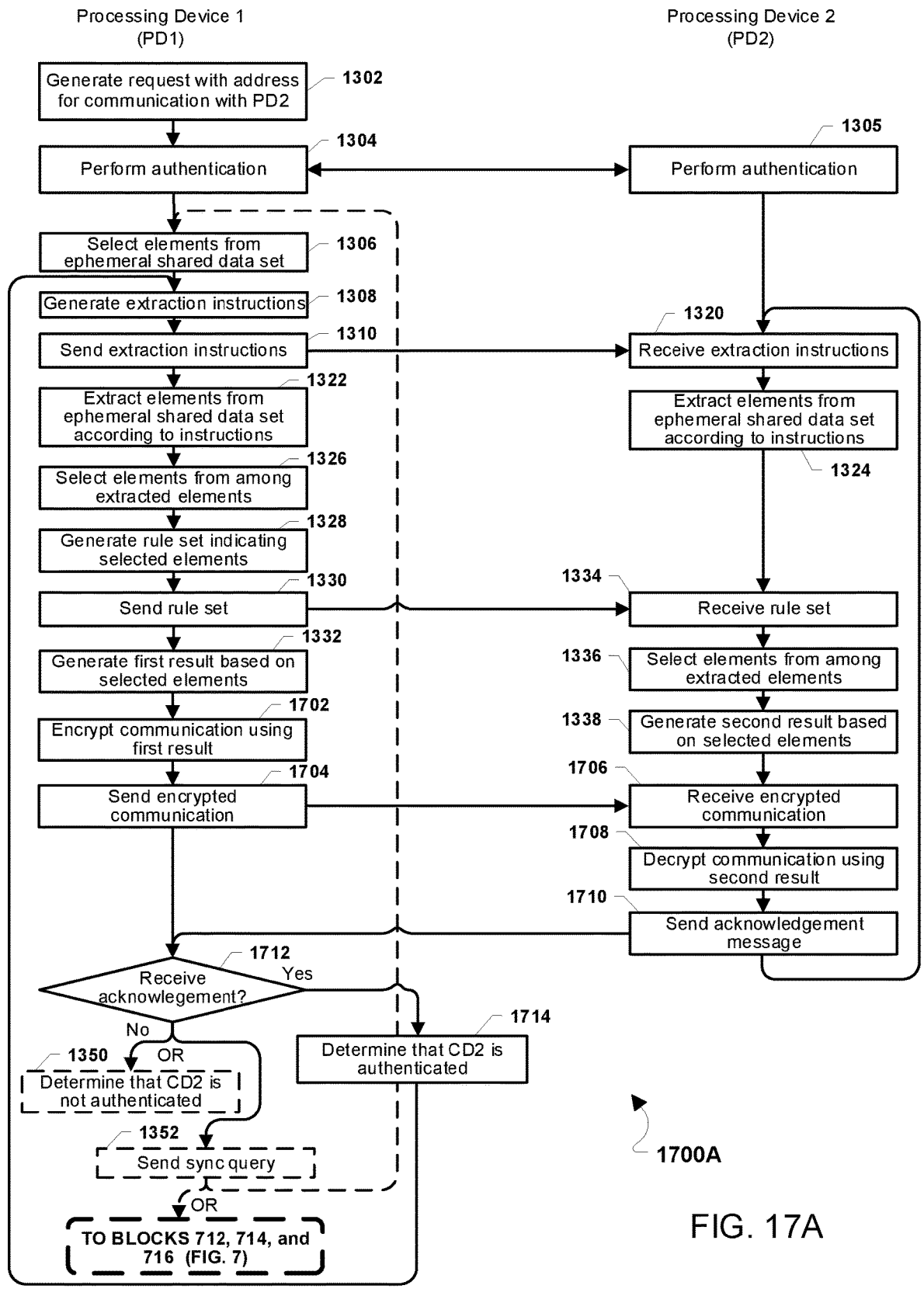
FIG. 17A illustrates a method 1700A for protecting a communication according to various embodiments.
Figure 17B:
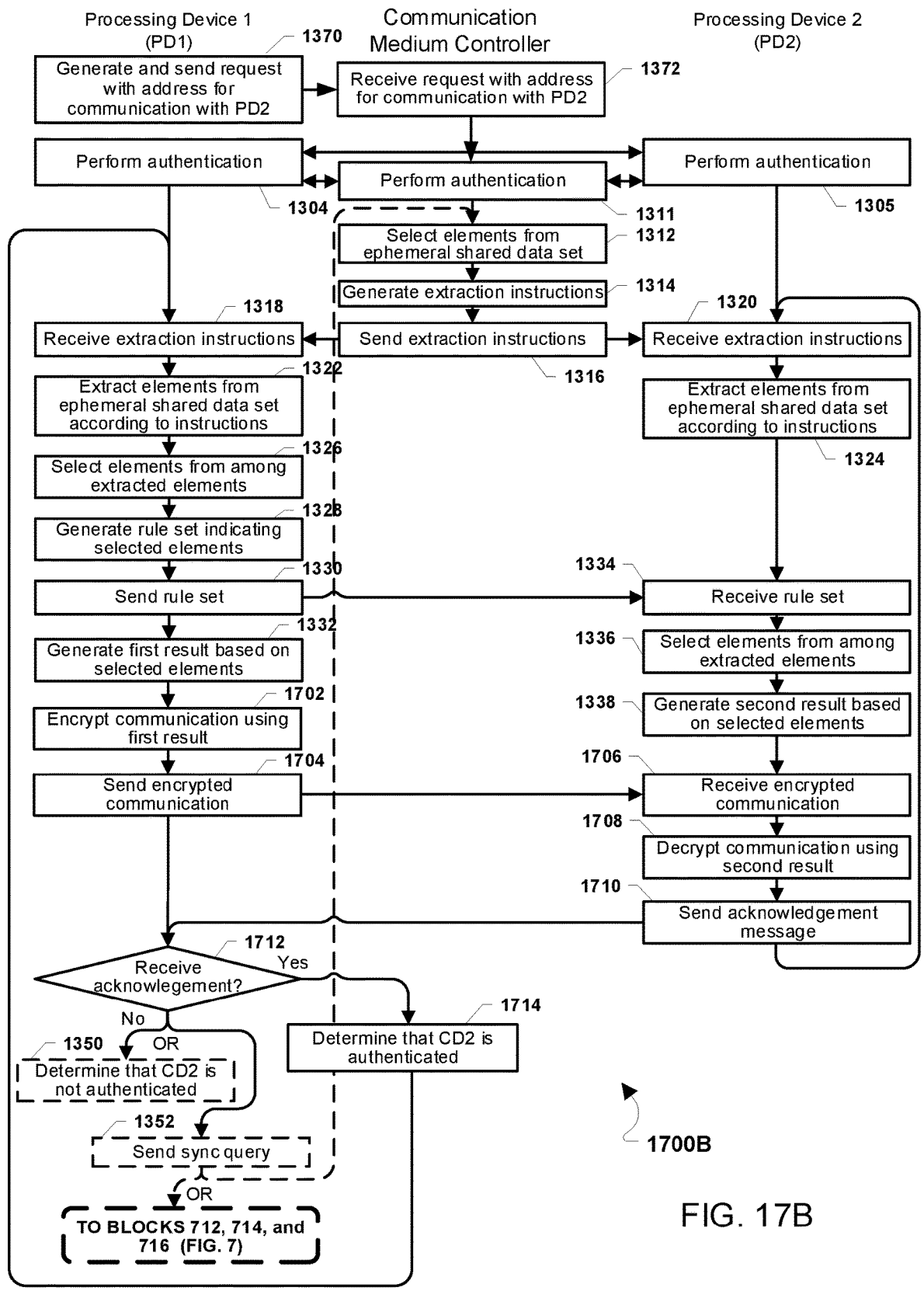
FIG. 17B illustrates a method 1700B for protecting a communication according to various embodiments.

FIG. 17A illustrates a method 1700A for protecting a communication (e.g., between a first processing device (PD1) and a second processing device (PD2)) according to various embodiments. With reference to FIGS. 1-17A, the method 1700A may be implemented by a processing device (e.g., the processing devices 102, 104, 106, 108, 110, 112, 114, 116, 118, 120, 124, 128, 132, 134, 200, 201, 202, 203, 250, 300, 402, 404, the clock controller configured to control the clock 130, the memory managers configured to control caches 122, 210, 212, 214, 216, 220, 222, 230, and the communication medium controller configured to control the communication medium 240). In blocks 1302-1352, PD1 and PD2 may perform operations of like-numbered blocks of the methods 1300A as described.

In some embodiments, the operations of the method 1700A may be employed in an IoT system. For example, PD1 and PD2 may each be a component of an IoT device. In some embodiments, the operations of PD2 described in the method 1700A are relatively simplified (e.g., as compared to operations described above with respect to the methods 1300A) to facilitate the performance by an IoT device or another similar device with relatively limited processing power and/or memory.

In block 1702, the PD1 may encrypt a message using the first result. For example, PD1 may use an encryption method such as MD5, SHA2, SHA256, BLAKE2, and the like, together with the second result to encrypt the message. In some embodiments, the message may serve as a test message to enable PD1 to determine whether the second result generated by PD2 matches the first result generated by PD1. In some embodiments, PD1 may generate a relatively short message, for example, in the case where PD2 is a processing device with relatively limited processing power and/or memory.

In block 1704, PD1 may send the encrypted message to PD2.

In block 1706, PD2 may receive the encrypted message.

In block 1708, PD2 may attempt to decrypt the message using the first result. For example, PD2 may initiate a decryption process of the message. In various embodiments, PD2 may use decryption format such as MD5, SHA2, SHA256, BLAKE2, and the like to attempt the decryption of the message.

In block 1710, PD2 may send an acknowledgement message to PD1.

In determination block 1712, PD1 may determine whether an acknowledgement message is received (e.g., the acknowledgement message sent by CD2 in block 1710).

In response to determining that the acknowledgment message is received (i.e., determination block 1712="Yes"), PD1 may determine that PD2 is authenticated in block 1714. PD1 may then perform the operations of block 808.

In response to determining that the acknowledgment message is not received (i.e., determination block 1712="No"), PD1 may perform the operations of optional blocks 1350 or 1352.

Figure 18:
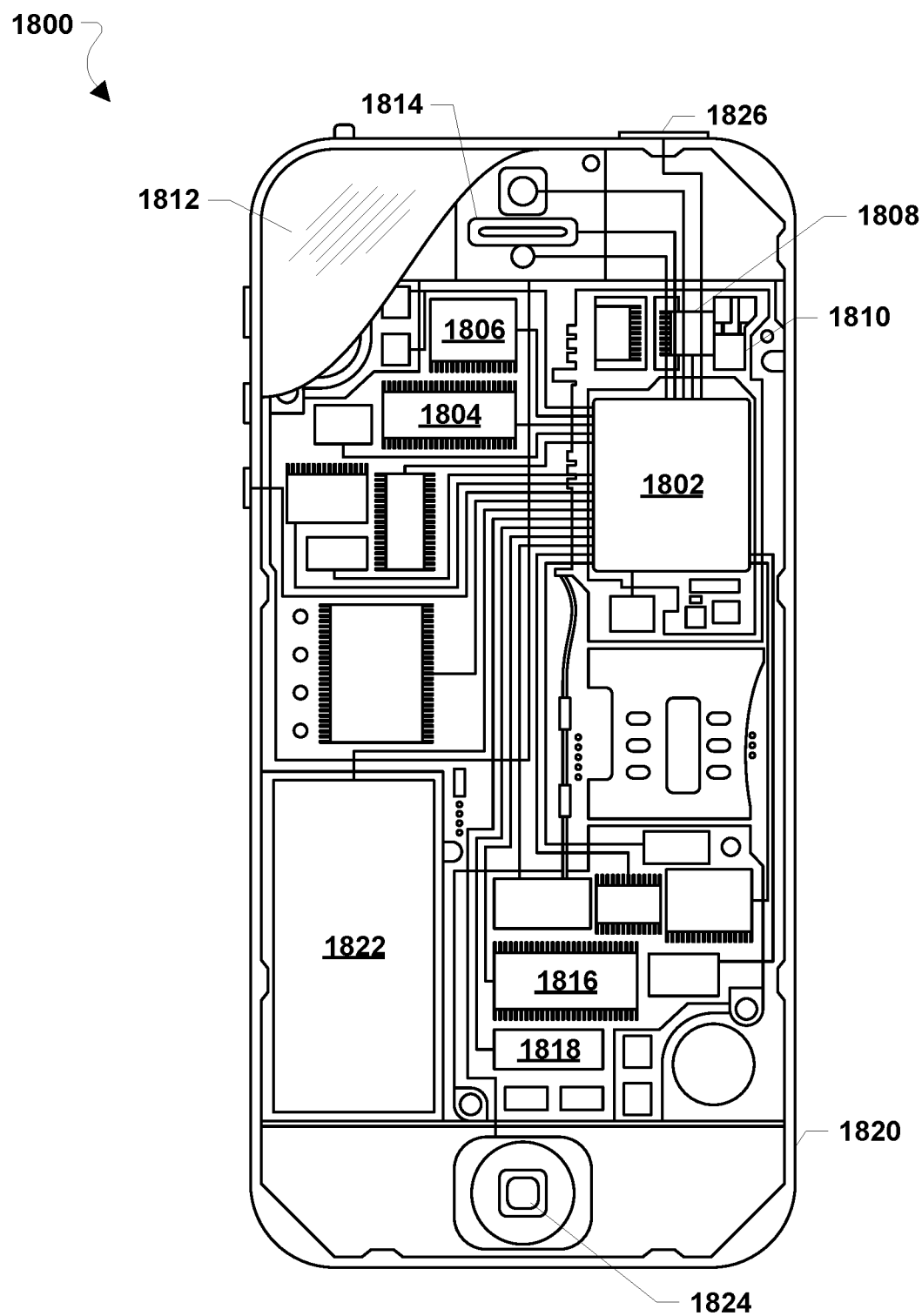
FIG. 18 is a component block diagram of a mobile wireless computing device suitable for implementing various embodiments.

FIG. 18 is a component block diagram of a mobile wireless communication device 1800 suitable for implementing various embodiments. With reference to FIGS. 1-18, the mobile wireless communication device 1800 may include a processor 1802 coupled to a touchscreen controller 1806 and an internal memory 1804. The processor 1802 may be one or more multi-core integrated circuits designated for general or specific processing tasks. The internal memory 1804 may be volatile or non-volatile memory, and may also be secure and/or encrypted memory, or unsecure and/or unencrypted memory, or any combination thereof. The touchscreen controller 1806 and the processor 1802 may also be coupled to a touchscreen panel 1812, such as a resistive-sensing touchscreen, capacitive-sensing touchscreen, infrared sensing touchscreen, etc. Additionally, the display of the mobile wireless communication device 1800 need not have touch screen capability.

The mobile wireless communication device 1800 may have two or more radio signal transceivers 1808 (e.g., Bluetooth, Zigbee, Wi-Fi, radio frequency (RF), etc.) and antennae 1810, for sending and receiving communications, coupled to each other and/or to the processor 1802. The transceivers 1808 and antennae 1810 may be used with the above-mentioned circuitry to implement the various wireless transmission protocol stacks and interfaces. The mobile wireless communication device 1800 may include one or more cellular network wireless modem chip(s) 1816 coupled to the processor and antennae 1810 that enables communication via two or more cellular networks via two or more radio access technologies.

The mobile wireless communication device 1800 may include a peripheral wireless device connection interface 1818 coupled to the processor 1802. The peripheral wireless device connection interface 1818 may be singularly configured to accept one type of connection, or may be configured to accept various types of physical and communication connections, common or proprietary, such as USB, FireWire, Thunderbolt, or PCIe. The peripheral wireless device connection interface 1818 may also be coupled to a similarly configured peripheral wireless device connection port (not shown).

The mobile wireless communication device 1800 may also include speakers 1810 for providing audio outputs. The mobile wireless communication device 1800 may also include a housing 1820, constructed of a plastic, metal, or a combination of materials, for containing all or some of the components discussed herein. The mobile wireless communication device 1800 may include a power source 1822 coupled to the processor 1802, such as a disposable or rechargeable battery. The rechargeable battery may also be coupled to the peripheral wireless device connection port to receive a charging current from a source external to the mobile wireless communication device 1800. The mobile wireless communication device 1800 may also include a physical button 1824 for receiving user inputs. The mobile wireless communication device 1800 may also include a power button 1826 for turning the mobile wireless communication device 1800 on and off.

Figure 19:
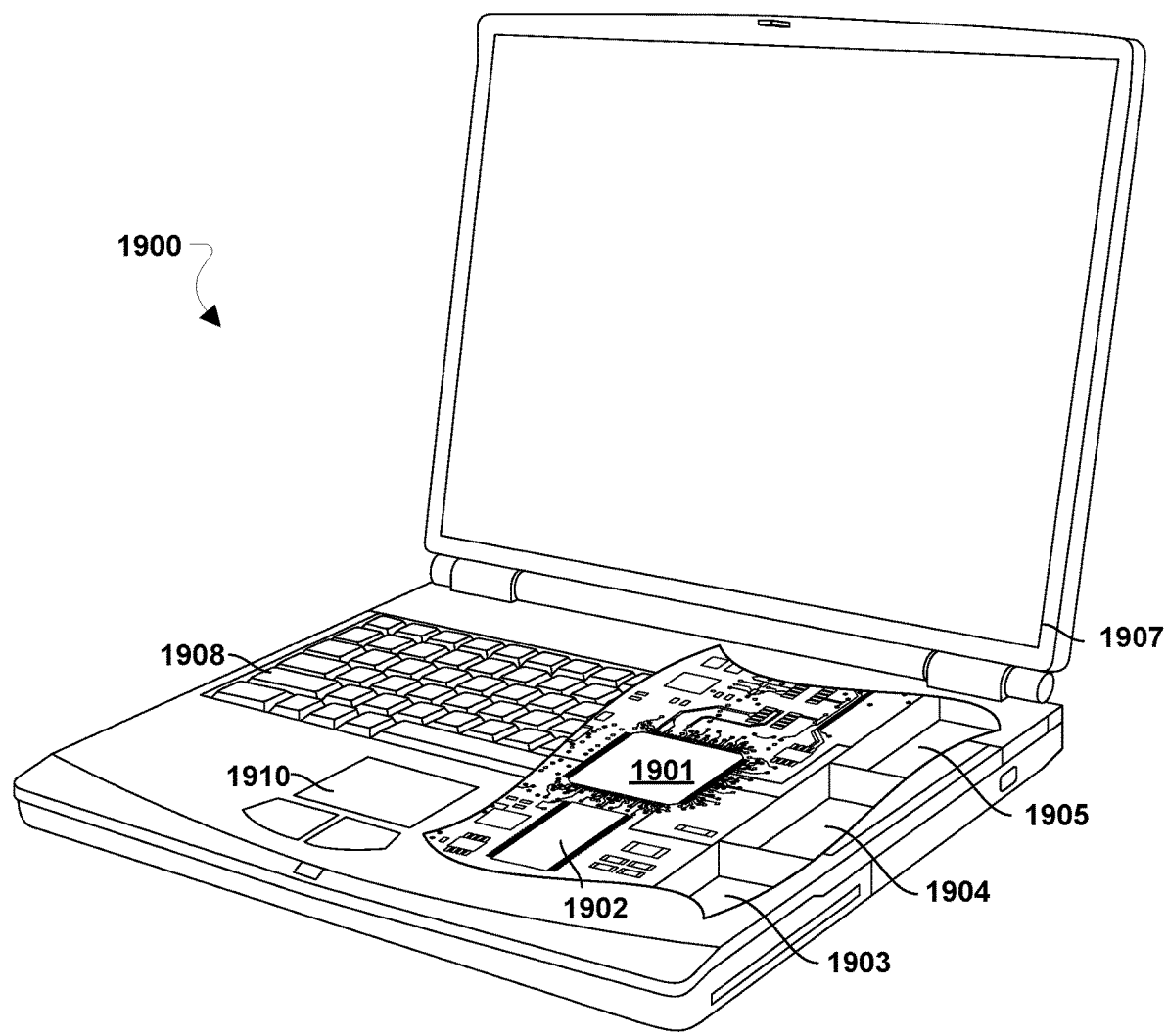
FIG. 19 is a component block diagram of a portable wireless communication device suitable for implementing various embodiments.

Other forms of computing devices may also benefit from the various aspects. Such computing devices typically include the components illustrated in FIG. 19, which illustrates an example laptop computer 1900. With reference to FIGS. 1-19, the computer 1900 generally includes a processor 1901 coupled to volatile memory 1902 and a large capacity nonvolatile memory, such as a disk drive 1903. The computer 1900 may also include a compact disc (CD) and/or DVD drive 1904 coupled to the processor 1901. The computer 1900 may also include a number of connector ports coupled to the processor 1901 for establishing data connections or receiving external memory devices, such as a network connection circuit 1905 for coupling the processor 1901 to a network. The computer 1900 may also include a display 1907, a keyboard 1908, a pointing device such as a trackpad 1910, and other similar devices.

Figure 20:
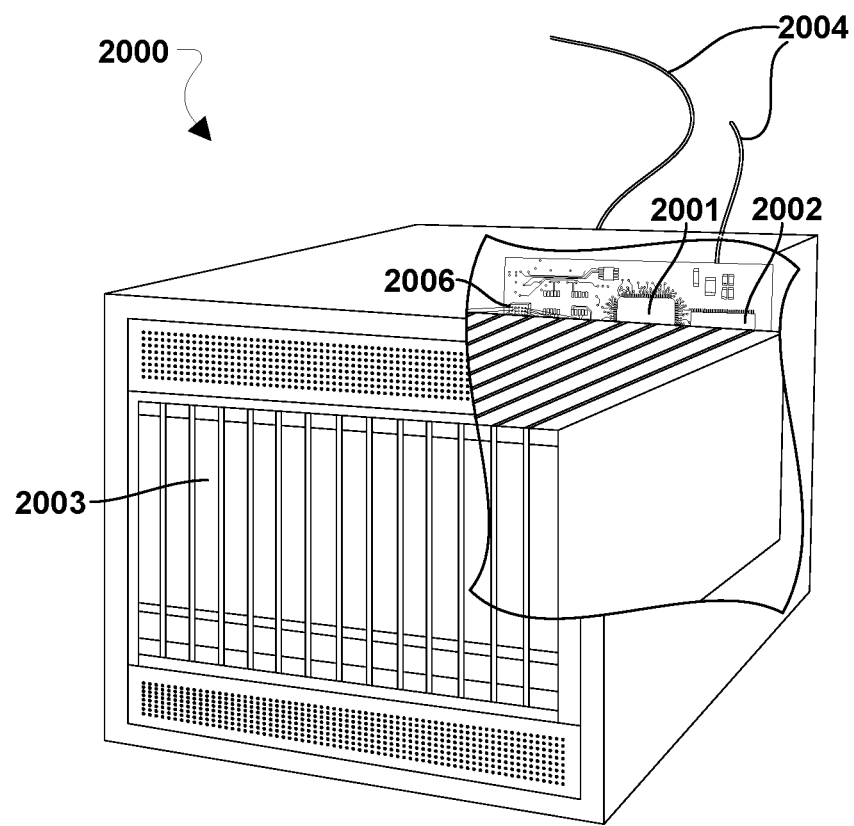
FIG. 20 is a component block diagram of a server device suitable for implementing various embodiments.

Various embodiments may employ a computing device as a network element of a communication network. Such network elements may typically include at least the components illustrated in FIG. 20, which illustrates an example network element, server device 2000. With reference to FIGS. 1-20, the server device 2000 may typically include a processor 2001 coupled to volatile memory 2002 and a large capacity nonvolatile memory, such as a disk drive 2003. The server device 2000 may also include a peripheral memory access device such as a floppy disc drive, compact disc (CD) or digital video disc (DVD) drive 2006 coupled to the processor 2001. The server device 2000 may also include network access ports 2004 (or interfaces) coupled to the processor 2001 for establishing data connections with a network, such as the Internet and/or a local area network coupled to other system computers and servers. Similarly, the server device 2000 may include additional access ports, such as USB, Firewire, Thunderbolt, and the like for coupling to peripherals, external memory, or other devices.

The processors 1802, 1901, 2001 may be any programmable microprocessor, microcomputer or multiple processor chip or chips that can be configured by software instructions (applications) to perform a variety of functions, including the functions of the various aspects described below. In some mobile devices, multiple processors 1802 may be provided, such as one processor dedicated to wireless communication functions and one processor dedicated to running other applications. Typically, software applications may be stored in the internal memory 1804, 1902, 2002 before they are accessed and loaded into the processor 1802, 1901, 2001. The processor 1802, 1901, 2001 may include internal memory sufficient to store the application software instructions.

Various embodiments enhance and improve the security function of any communication network, electronic communication system, or device by improving the security of communications by utilizing a dynamically changing shared information context. Various embodiments also enhance and improve the security of communications on a communication network or in a device by utilizing a dynamically generated result based on the dynamically changing shared information context. The information context may include, for example, a dynamically changing shared data set. Various embodiments also improve the security function of any communication network, communication system, or device by using a dynamic shared data set and a dynamically generated value based on the dynamic shared data set, without relying on easily compromised static identification information (such as a shared secret) that may be vulnerable to unauthorized access and copying. Various embodiments employ the dynamically-changing shared data and the dynamically generated value to protect communications in a manner that does not rely on the paradigm of shared secrets and static information.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 700, 1100, 1200, 1300A, 1300B, 1400A, 1400B, 1500A, 1500B, 1600A, 1600B, 1700A, and 1700B may be substituted for or combined with one or more operations of the methods 500, 600, 700, 1100, 1200, 1300A, 1300B, 1400A, 1400B, 1500A, 1500B, 1600A, 1600B, 1700A, and 1700B.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art, the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A system on a chip (SoC), comprising:
    a first memory configured to store a first ephemeral shared data set;
    a first processing device coupled to the first memory;
    a second memory configured to store a second ephemeral shared data set, wherein the first ephemeral shared data set is equal to the second ephemeral shared data set; and
    a second processing device coupled to the second memory and coupled to the first processing device,
    wherein the first processing device is configured with the processor-executable instructions to perform operations comprising:
        selecting first elements from the first ephemeral shared data set;
        generating a first rule set indicating the first elements;
        sending the first rule set to the second processing device; and
        generating a first result based on the first elements,
    wherein the second processing device is configured with processor-executable instructions to perform operations comprising:
        receiving the first rule set from the first processing device;
        extracting second elements from the second ephemeral shared data set based on the first rule set;
        generating a second result based on the second elements; and
        sending the second result to the first processing device;
    wherein the first processing device is configured with processor-executable instructions to perform operations further comprising:
        receiving the second result from the second processing device; and
        authenticating the second processing device based on a comparison of the first result and the second result.

2. The SoC of claim 1, wherein the first processing device is configured with processor-executable instructions to perform operations further comprising enabling communication with the second processing device in response to authenticating the second processing device.

3. The SoC of claim 1, wherein:
    the second processing device is configured with processor-executable instructions to perform operations further comprising:
        selecting third elements from the second ephemeral shared data set;
        generating a second rule set indicating the third elements;
        sending the second rule set to the first processing device; and
        generating a third result based on the second elements;
    the first processing device is configured with processor-executable instructions to perform operations further comprising:
        receiving the second rule set from the second processing device;
        extracting fourth elements from the first ephemeral shared data set based on the second rule set;
        generating a fourth result based on the second elements; and
        sending the fourth result to the second processing device;
    wherein the second processing device is configured with processor-executable instructions to perform operations further comprising:
        receiving the fourth result from the first processing device; and
        authenticating the first processing device based on a comparison of the third result and fourth result.

4. A method for authenticating a processing device on a system on a chip (SoC), comprising:
    selecting, by a first processing device of the SoC, first elements from a first ephemeral shared data set;
    generating, by the first processing device, a first rule set indicating the first elements;
    sending, by the first processing device, the first rule set to a second processing device of the SoC;
    generating, by the first processing device, a first result based on the first elements;
    receiving, by the second processing device, the first rule set from the first processing device;
    extracting, by the second processing device, second elements from a second ephemeral shared data set based on the first rule set;
    generating, by the second processing device, a second result based on the second elements;
    sending, by the second processing device, the second result to the first processing device;
    receiving, by the first processing device, the second result from the second processing device; and authenticating the second processing device, by the first processing device, based on a comparison of the first result and the second result.

5. The method of claim 4, further comprising enabling communication, by the first processing device, with the second processing device in response to authenticating the second processing device.

6. The method of claim 4, further comprising:
selecting, by the second processing device, third elements from the second ephemeral shared data set;
generating, by the second processing device, a second rule set indicating the third elements;
sending, by the second processing device, the second rule set to the first processing device; and
generating, by the second processing device, a third result based on the second elements;
receiving, by the first processing device, the second rule set from the second processing device;
extracting, by the first processing device, fourth elements from the first ephemeral shared data set based on the second rule set;
generating, by the first processing device, a fourth result based on the second elements; and
sending, by the first processing device, the fourth result to the second processing device;
receiving, by the second processing device, the fourth result from the first processing device; and
authenticating the first processing device, by the second processing device, based on a comparison of the third result and the fourth result.

7. A system on a chip (SoC), comprising:
a first memory configured to store a first ephemeral shared data set; and
a first processing device coupled to the first memory, wherein the first processing device is configured with processor-executable instructions to perform operations comprising:
selecting first elements from an ephemeral shared data set stored in the first memory, wherein the ephemeral shared data set is also stored in a second memory associated with a second processing device;
generating a first rule set indicating the first elements;
sending the first rule set to the second processing device;
generating a result based on elements from the ephemeral shared data set stored in the first memory; and
performing encrypted communication with the second processing device using the result.

8. The SoC of claim 7, further comprising the second processing device coupled to the second memory and coupled to the first processing device, wherein:
the first processing device is configured with processor-executable instructions to perform operations such that:
generating a result based on elements from the ephemeral shared data set stored in the first memory comprises generating a first result based on the first elements; and
performing encrypted communication with the second processing device using the result comprises:
receiving an encrypted first message from the second processing device;
attempting to decrypt the encrypted first message using the first result; and
determining whether the attempted decryption of the first encrypted message was successful; and the second processing device is configured with processor-executable instructions to perform operations comprising:
receiving the first rule set from the first processing device;
selecting second elements from the ephemeral shared data set stored in the second memory based on the first rule set;
generating a second result based on the second elements;
encrypting a first message using the second result; and
sending the encrypted first message to the first processing device.

9. The SoC of claim 8, wherein:
the first processing device is configured with processor-executable instructions to perform operations further comprising:
sending extraction instructions for extracting elements from the ephemeral data set to the second processing device; and
extracting third elements from the ephemeral shared data set stored in the first memory, wherein selecting first elements from an ephemeral shared data set stored in the first memory comprises selecting the first elements from the third elements; and
the second processing device is configured with processor-executable instructions to perform operations further comprising:
receiving the extraction instructions from the first processing device; and
extracting fourth elements from the ephemeral shared data set stored in the second memory, wherein selecting second elements from the ephemeral shared data set stored in the second memory based on the first rule set comprises selecting the second elements from the fourth elements.

10. The SoC of claim 8, wherein:
the second processing device is configured with processor-executable instructions to preform operations further comprising:
selecting third elements from an ephemeral shared data set stored in the second memory;
generating a second rule set indicating the third elements;
sending the second rule set to the first processing device;
generating a third result based on the third elements; and
combining the second result and the third result producing a first combined result, wherein encrypting a first message using the second result comprises encrypting the first message using the first combined result; and
the first processing device is configured with processor-executable instructions to perform operations further comprising:
receiving the second rule set from the second processing device;
selecting the fourth elements from the ephemeral shared data set stored in the first memory based on the second rule set;
generating a fourth result based on the fourth elements; and
combining the first result and the fourth result producing a second combined result, wherein attempting to decrypt the encrypted first message using the first result comprises attempting to decrypt the encrypted first message using the second combined result.

11. The SoC of claim 7, further comprising the second processing device coupled to the second memory and coupled to the first processing device, wherein:
the second processing device is configured with processor-executable instructions to perform operations comprising:
selecting second elements from an ephemeral shared data set stored in the second memory;
generating a second rule set indicating the second elements;
sending the second rule set to the first processing device;
receiving the first rule set from the first processing device;
combining the first rule set and the second rule set producing a first combined rule set;
selecting third elements from the ephemeral shared data set stored in the second memory based on the first combined rule set;
generating a first result based on the third elements;
encrypting a first message using the first result; and
sending an encrypted first message to the first processing device and
the first processing device is configured with processor-executable instructions to perform operations further comprising:
receiving the second rule set from the second processing device;
combining the first rule set and the second rule set producing a second combined rule set; and
selecting fourth elements from the ephemeral shared data set stored in the first memory based on the second combined rule set, wherein generating a result based on elements from the ephemeral shared data set stored in the first memory comprises generating a second result based on the fourth elements; and
the first processing device is configured with processor-executable instructions to perform operations such that performing encrypted communication with the second processing device using the result comprises:
receiving the encrypted first message from the second processing device;
attempting to decrypt the encrypted first message using the second result; and
determining whether the attempted decryption of the first encrypted message was successful.

12. The SoC of claim 7, further comprising the second processing device coupled to the second memory and coupled to the first processing device, wherein:
the first processing device is configured with processor-executable instructions to perform operations such that:
generating a result based on elements from the ephemeral shared data set stored in the first memory comprises generating a first result based on the first elements; and
performing encrypted communication with the second processing device using the result comprises:
encrypting a first message using the first result;
sending the encrypted first message to the second processing device; and
determining whether an acknowledgment of the encrypted first message is received from the second processing device; and the second processing device is configured with processor-executable instructions to perform operations comprising:
receiving the first rule set from the first processing device;
selecting second elements from the ephemeral shared data set stored in the second memory based on the first rule set;
generating a second result based on the second elements;
receiving the encrypted first message from the first processing device;
attempting to decrypt the encrypted first message using the second result;
determining whether the attempted decryption of the first encrypted message was successful; and
sending the acknowledgement of the encrypted first message to the second processing device in response to successful decryption of the first encrypted communication.

13. The SoC of claim 7, further comprising the second processing device coupled to the second memory and coupled to the first processing device, wherein:
the first processing device is configured with processor-executable instructions to perform operations such that:
generating a result based on elements form the ephemeral shared data set stored in the first memory comprises generating a first result based on the first elements; and
performing encrypted communication with the second processing device using the result comprises:
encrypting a first communication using the first result;
sending the encrypted first communication to the second processing device; and
determining whether an acknowledgement of the encrypted first communication is received from the second processing device; and
the second processing device is configured with processor-executable instructions to perform operations comprising:
receiving the first rule set from the first processing device;
selecting second elements from the ephemeral shared data set stored in the second memory based on the first rule set;
generating a second result based on the second elements;
receiving the encrypted first communication from the first processing device;
attempting to decrypt the encrypted first communication using the second result;
determining whether the attempted decryption of the first encrypted communication was successful; and
sending the acknowledgment of the encrypted first communication to the second processing device in response to the successful decryption of the first encrypted communication.

14. A method for encrypting communication between a processing device on a system on a chip (SoC), comprising:
selecting, by a first processing device of the SoC, first elements from an ephemeral shared data set stored in a first memory coupled to the first processing device, wherein the ephemeral shared data set is also stored in a second memory coupled to a second processing device of the SoC;
generating, the first processing device, a first rule set indicating the first elements;

sending, by the first processing device, the first rule set to the second processing device;
generating, by the first processing device, a result based on elements from the ephemeral shared data set stored in the first memory; and
performing, by the first processing device, encrypted communication with the second processing device using the result.

15. The method of claim 14, wherein generating a result based on elements from the ephemeral shared data set stored in the first memory comprises generating, by the first processing device, a first result based on the first elements; the method further comprising:
receiving, by the second processing device, the first rule set from the first processing device;
selecting, by the second processing device, second elements from the ephemeral shared data set stored in the second memory based on the first rule set;
generating, by the second processing device, a second result based on the second elements;
encrypting, by the second processing device, a first message using the second result;
sending, by the second processing device, the encrypted first message to the first processing device; and
wherein performing encrypted communication with the second processing device using the result comprises:
receiving, by the first processing device, an encrypted first message from the second processing device;
attempting, by the first processing device, to decrypt the encrypted first message using the first result; and
determining, by the first processing device, whether the attempted decryption of the first encrypted message was successful.

16. The method of claim 15, further comprising:
sending, by the first processing device, extraction instructions for extracting elements from the ephemeral data set to the second processing device:
extracting, by the first processing device, third elements from the ephemeral shared data set stored in the first memory, wherein selecting first elements from an ephemeral shared data set stored in the first memory comprises selecting the first elements from the third elements;
receiving, by the second processing device, the extraction instructions from the first processing device; and
extracting, by the second processing device, fourth elements from the ephemeral shared data set stored in the second memory, wherein selecting second elements from the ephemeral shared data set stored in the second memory based on the first rule set comprises selecting the second elements from the fourth elements.

17. The method of claim 15, wherein:
selecting, by the second processing device, third elements from an ephemeral shared data set stored in the second memory generating, by the second processing device, a second rule set indicating the third elements;
sending, by the second processing device, the second rule set to the first processing device;
generating, by the second processing device, a third result based on the third elements; and
combining, by the second processing device, the second result and the third result producing a first combined result, wherein encrypting a first message using the second result comprises encrypting the first message using the first combined result;
receiving, by the first processing device, the second rule set from the second processing device;
selecting, by the first processing device, fourth elements from the ephemeral shared data set stored in the first memory based on the second rule set;
generating, by the first processing device, a fourth result based on the fourth elements;
combining, by the first processing device, the first result and the fourth result producing a second combined result, wherein attempting to decrypt the encrypted first message using the first result comprises attempting to decrypt the encrypted first message using the second combined result.

18. The method of claim 14, further comprising:
selecting, by the second processing device, second elements from an ephemeral shared data set stored in the second memory;
generating, by the second processing device, a second rule set indicating the second elements;
sending, by the second processing device, the second rule set to the first processing device;
receiving, by the second processing device, the first rule set from the first processing device;
combining, by the second processing device, the first rule set and the second rule set producing a first combined rule set;
selecting, by the second processing device, third elements from the ephemeral shared data set stored in the second memory based on the first combined rule set;
generating, by the second processing device, a first result based on the third elements;
encrypting, by the second processing device, a first message using the first result;
sending, by the second processing device, an encrypted first message to the first processing device and
receiving, by the first processing device, the second rule set from the second processing device;
combining; by the first processing device, the first rule set and the second rule set producing a second combined rule set;
selecting, by the first processing device, fourth elements from the ephemeral shared data set stored in the first memory based on the second combined rule set, wherein generating a result based on elements from the ephemeral shared data set stored in the first memory comprises generating a second result based on fourth elements; and
wherein performing encrypted communication with the second processing device using the result comprises:
receiving, by the first processing device, the encrypted first message from the second processing device;
attempting, by the first processing device, to decrypt the encrypted first message using the second result; and
determining, by the first processing device, whether the attempted decryption of the first encrypted message was successful.

19. The method of claim 14,
wherein generating a result based on elements from the ephemeral shared data set stored in the first memory comprises generating, by the first processing device, a first result based on the first elements;
wherein performing encrypted communication with the second processing device using the result comprises:

encrypting, by the first processing device, a first message using the first result; and sending, by the first processing device, the encrypted first message to the second processing device;

the method further comprising:

receiving, by the second processing device, the first rule set from the first processing device;

selecting, by the second processing device, second elements from the ephemeral shared data set stored in the second memory based on the first rule set;

generating, by the second processing device, a second result based on second elements;

receiving, by the second processing device, the encrypted first message from the first processing device;

attempting, by the second processing device, to decrypt the encrypted first message using the second result;

determining, by the second processing device, whether the attempted decryption of the first encrypted message was successful; and sending, by the second processing device, an acknowledgement of the encrypted first message to the second processing device in response to successful decryption of the first encrypted communication; and wherein performing encrypted communication with the second processing device using the result further comprises determining, by the first processing device, whether the acknowledgement of the encrypted first message is received from the second processing device.

20. The method of claim 14, wherein generating a result based on the elements from the ephemeral shared data set stored in the first memory comprises generating, by the first processing device, a first result based on the first elements;

wherein performing encrypted communication with the second processing device using the result comprises:

encrypting, by the first processing device, a first communication using the first result; and sending, by the first processing device, the encrypted first communication to the second processing device:

the method further comprising:

receiving, by the second processing device, the first rule set from the first processing device:

selecting, by the second processing device, second elements from the ephemeral shared data set stored in the second memory based on the first rule set;

generating, by the second processing device, a second result based on the second elements;

receiving, by the second processing device, the encrypted first communication from the first processing device;

attempting, by the second processing device, to decrypt the encrypted first communication using the second result;

determining, by the second processing device, whether the attempted decryption of the first encrypted communication was successful; and sending, by the second processing device, an acknowledgement of the encrypted first communication to the second processing device in response to successful decryption of the first encrypted communication; and wherein performing encrypted communication with the second processing device using the result further comprises determining, by the first processing device, whether the acknowledgement of the encrypted first communication is received from the second processing device.

* * * * *